United States Patent
Nonomura et al.

(10) Patent No.: US 7,306,834 B2
(45) Date of Patent: Dec. 11, 2007

(54) HEAT INSULATING CONTAINER

(75) Inventors: Akira Nonomura, Tochigi (JP); Masaaki Suzuki, Tochigi (JP); Atsushi Sato, Tochigi (JP); Tadashi Nakata, Tochigi (JP); Shinji Kodama, Tochigi (JP); Shingo Odajima, Tochigi (JP); Mitsuyuki Kubo, Tochigi (JP)

(73) Assignee: Kao Corporation, Tokyo (JP)

( * ) Notice: Subject to any disclaimer, the term of this patent is extended or adjusted under 35 U.S.C. 154(b) by 517 days.

(21) Appl. No.: 10/258,522

(22) PCT Filed: Apr. 26, 2001

(86) PCT No.: PCT/JP01/03611

§ 371 (c)(1),
(2), (4) Date: Mar. 17, 2003

(87) PCT Pub. No.: WO01/81183

PCT Pub. Date: Nov. 1, 2001

(65) Prior Publication Data

US 2004/0013830 A1 Jan. 22, 2004

(30) Foreign Application Priority Data

| Apr. 26, 2000 | (JP) | ............................. 2000-126626 |
| Aug. 9, 2000 | (JP) | ............................. 2000-241920 |
| Aug. 9, 2000 | (JP) | ............................. 2000-241921 |
| Dec. 28, 2000 | (JP) | ............................. 2000-402938 |

(51) Int. Cl.
*B29D 27/00* (2006.01)
*B29D 23/00* (2006.01)
*B32B 1/08* (2006.01)
*B32B 27/10* (2006.01)

(52) U.S. Cl. ..................... 428/34.2; 428/213; 428/218; 428/220

(58) Field of Classification Search ............... 428/34.2, 428/34.1, 35.6, 35.7, 36.1, 36.2, 36.4, 36.5, 428/212, 213, 218, 220
See application file for complete search history.

(56) References Cited

U.S. PATENT DOCUMENTS 3,235,445 A 2/1966 Hugentobler

FOREIGN PATENT DOCUMENTS

JP 50-98976 8/1975

(Continued)

OTHER PUBLICATIONS

Japanese Office Action (with English translation) dated Jan. 13, 2004 of Japanese Patent Application No. 2001-128386.

(Continued)

*Primary Examiner*—Michael C. Miggins
(74) *Attorney, Agent, or Firm*—Oblon, Spivak, McClelland, Maier & Neustadt, P.C.

(57) ABSTRACT

A heat-insulating container having a first fiber layer (111) with a prescribed density and a second fiber layer (112) which is formed inside the first fiber layer (111) and has a lower density than the first fiber layer (111). The first fiber layer (111) is 0.2 to 1 mm thick, and the second fiber layer (112) is 0.4 to 3 mm thick, with the total thickness of the first fiber layer (111) and the second fiber layer (112) being 0.6 to 4 mm.

9 Claims, 24 Drawing Sheets

FOREIGN PATENT DOCUMENTS

| | | |
|---|---|---|
| JP | 3-137300 | 6/1991 |
| JP | 4-7406 | 1/1992 |
| JP | 4-62609 | 5/1992 |
| JP | 5-7614 | 2/1993 |
| JP | 5-10222 | 2/1993 |
| JP | 05-263400 | 10/1993 |
| JP | 6-329143 | 11/1994 |
| JP | 81729/1994 | 11/1994 |
| JP | 8-232200 | 9/1996 |
| JP | 9-164621 | 6/1997 |
| JP | 10-077600 | 3/1998 |
| JP | 10-096200 | 4/1998 |
| JP | 11-301753 | 11/1999 |
| JP | 11-321840 | 11/1999 |
| JP | 2000-62773 | 2/2000 |
| JP | 2000-109123 | 4/2000 |
| JP | 2002-254532 | 9/2002 |

OTHER PUBLICATIONS

Japanese Office Action (with English translation) dated Jan. 13, 2004 of Japanese Patent Application No. 2001-128387.

Japanese Registered Utility Model No. 3065471, Issued on Feb. 2, 2000.

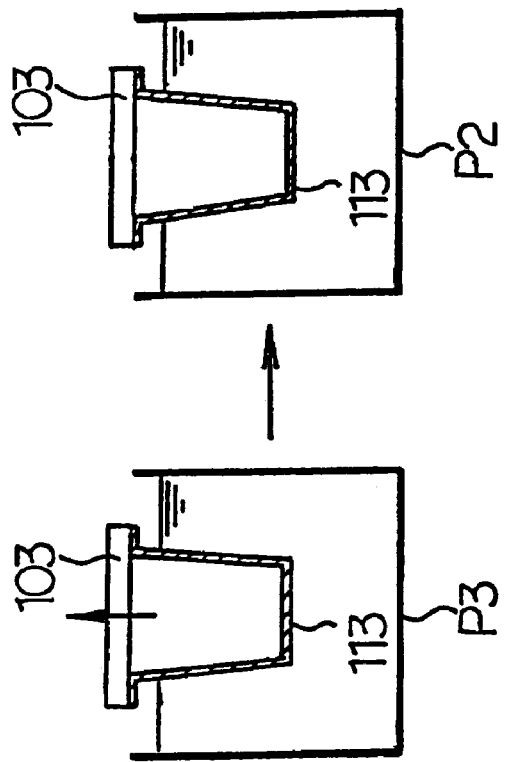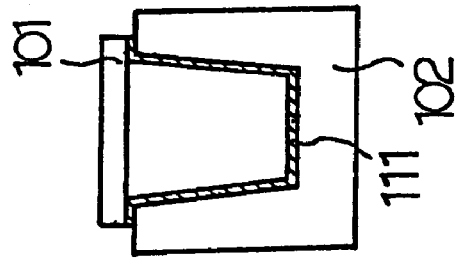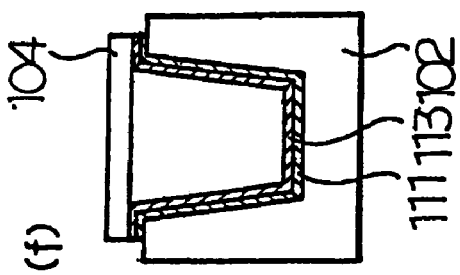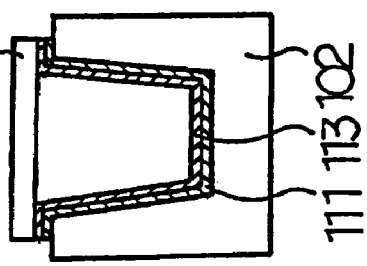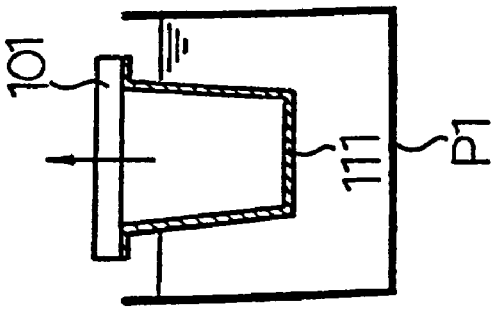

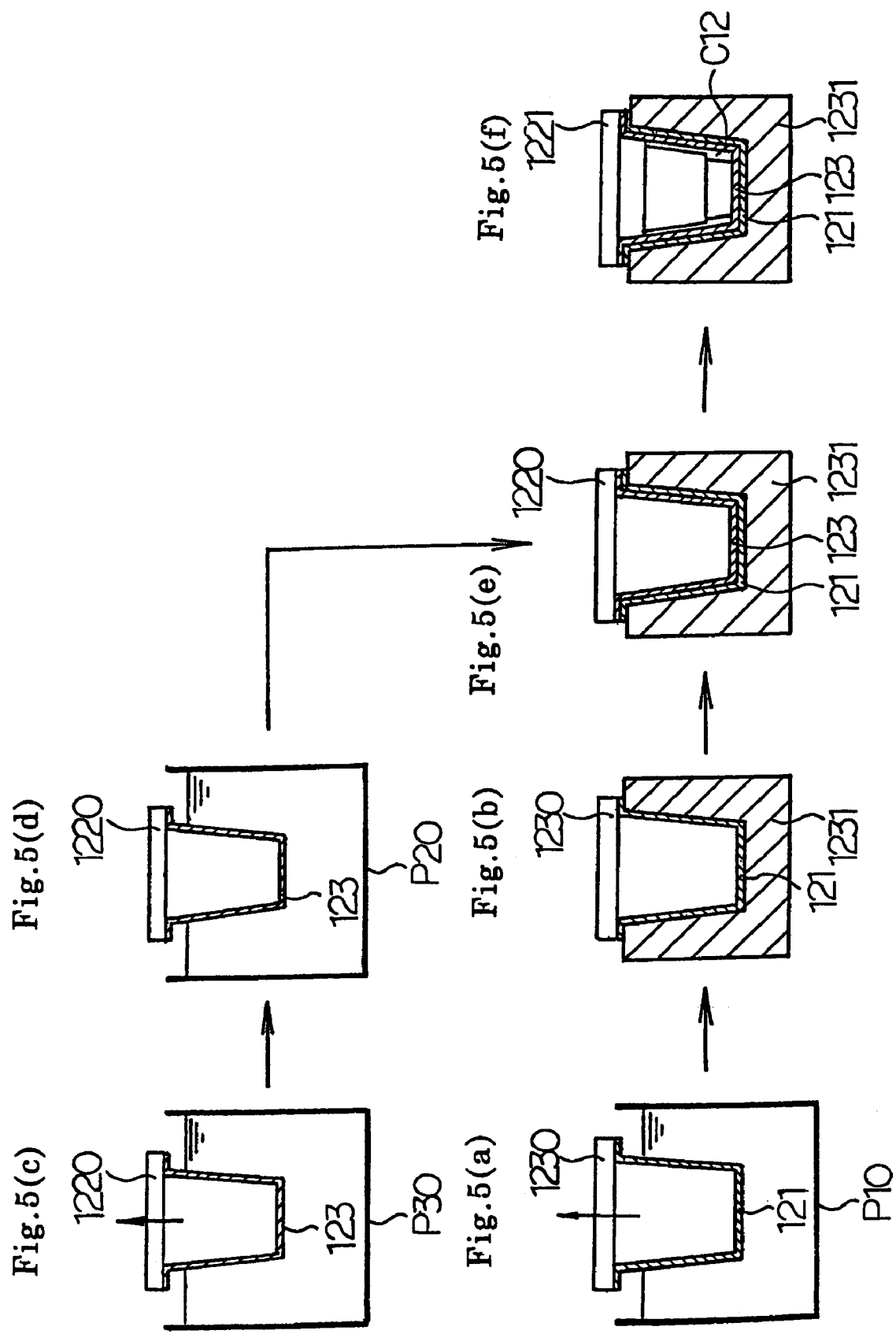

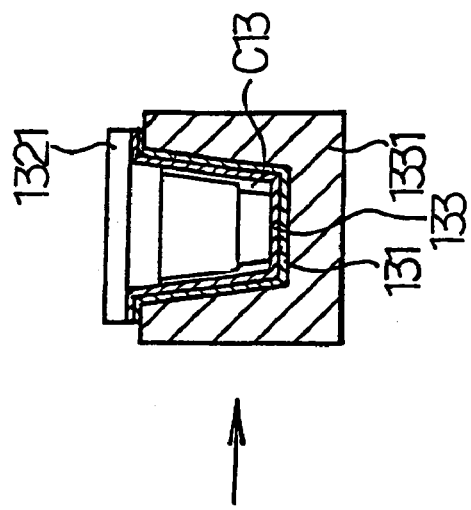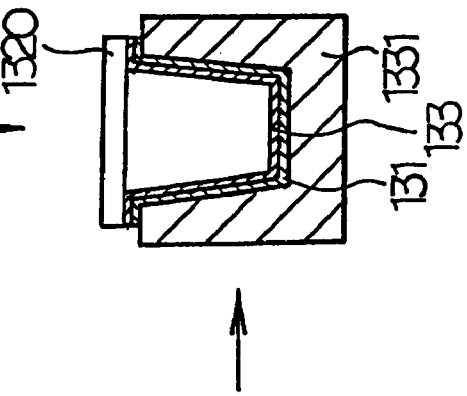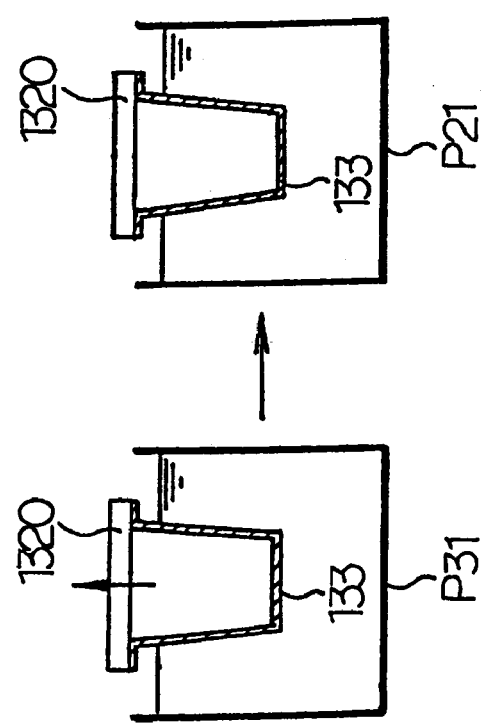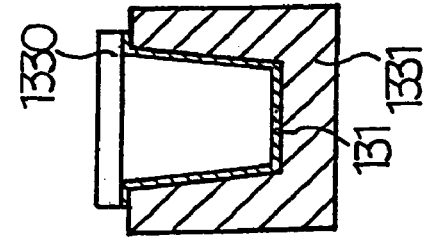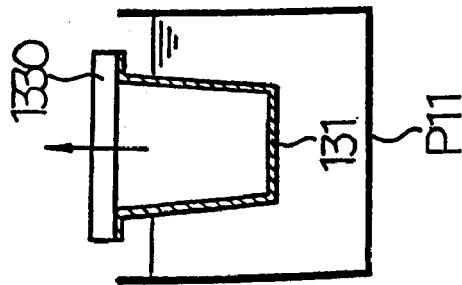

HEAT INSULATING CONTAINER

TECHNICAL FIELD

The present invention relates to a heat insulating container and a method and an apparatus for producing the same. More particularly, it relates to a thin-walled and yet highly heat-insulating container and a method and an apparatus for producing the same.

BACKGROUND OF THE INVENTION

Known techniques pertinent to pulp moldings having a layered structure and containing a blowing agent or a softening agent include the technique disclosed in JP-A-10-77600. This technique features use of a blowing agent or a softening agent to make a layer containing the same soft. Contemplated predominantly for use as a cushioning material, the product obtained is too weak as a packaging material, and the technique is unfit for application to thin-walled and highly heat-insulating containers. On the other hand, the technique described in JP-A-5-263400 is known for providing a foamable cellulose material by using a blowing agent. This technique is also contemplated for application as a cushioning material so that the product is too weak for use as a packaging material and unfit for application to thin-walled and highly heat-insulating containers. Further, the products obtained by these techniques have a coarse surface which, when provided with a coating, only results in uneven coating. Furthermore, the resulting pulp moldings have so poor dimensional accuracy that they are unapplicable to packaging materials involving screwing, fitting, and the like. In addition, they easily produce paper dust due to low surface layer strength.

Accordingly, a first object of the present invention is to provide a thin-walled and highly heat-insulating container and a method of producing the same.

JP-A-10-96200 is also known as a conventional technique relating to pulp molded articles having a layered structure containing a blowing agent, in which a wet pulp molded article containing a blowing agent is placed in a drying mold having a prescribed clearance, and the blowing agent is expanded to fill the clearance. The resulting molded article has improved surface smoothness. Nevertheless, because it is a cushioning material made from a pulp slurry containing a heat expandable micro-encapsulated blowing agent, the surface is not printable, has small surface strength (scratch resistance), easily produces paper dust, and is not smooth enough to be laminated with a resin film layer. Therefore, it is unfit for application to food and drink containers, particularly those in which hot water is poured, such as cups for instant noodles.

The container of Japanese Utility Model 3065471 is also known as a conventional technique relevant to paper-made heat-insulating containers. The container is composed of an inner container sheathed with an outer container having ribs which provide a gap between the inner container and the outer container to thereby achieve heat insulation.

Although the container exhibits heat insulation owing to the gap, the inner container and the outer container are not sufficiently integral with each other due to the limited joint area therebetween, which makes the whole container poor in shape retention. Particularly when it is used as a container in which hot water is poured, the paper-made inner container itself is easily deformed by the heat and the weight of hot water. For such application, the inner container must have a thick and strong wall, which, of necessity, results in an increased weight. Therefore, the container is unfit for such application.

Additionally, it has been desired for a heat-insulating container to have necessary heat insulating properties and strength in necessary portions according to its shape, etc.

Accordingly, a second object of the present invention is to provide a heat-insulating container having heat-insulating properties and strength in desired portions according to its shape, etc. and a method of producing the same.

Further, known techniques relating to a heat-insulating pulp molded container having an inner layer, an outer layer, and a heat-insulating layer between the inner layer and the outer layer include the heat-insulating container disclosed in JP-A-11-301753. The disclosed, pulp-molded heat-insulating container has a gap serving as a heat-insulating layer between pulp-molded inner and outer layers. Since the heat-insulating layer is an air gap, the container cannot assure desired mechanical strength without increasing the strength of the inner and the outer layers by increasing the basis weight, the density, etc. of the inner and the outer layers, which necessarily results in an increase of weight of the whole container.

JP-A-2000-109123 teaches a container comprising an inner material and an outer material both comprising a paper-made base material and an intermediate layer comprising a pulp-containing foamed layer interposed therebetween via an adhesive.

However, because the pulp-containing blowing agent achieves only a low expansion ratio, it should be used in a large quantity for obtaining desired heat insulating properties, which leads to a high cost. Besides, if the thickness of the base materials is reduced in an attempt to reduce the weight of the container, the adhesive would percolate in the base materials to cause color change or swelling of the base materials. Hence, it is not allowed to apply the adhesive in amounts enough to secure sufficient adhesion between the base materials and the intermediate layer. As a result, the base materials and the intermediate layer tend to separate easily.

Accordingly, a third object of the present invention is to provide a thin and lightweight heat-insulating container which has high buckling strength as well as heat insulating properties.

Known apparatus for producing pulp molded articles include the apparatus of U.S. Pat. No. 3,235,445. The apparatus is of rotary type in which molded articles are continuously manufactured through three steps in rotation of papermaking, compression of a pulp layer, and removal of the pulp layer.

In general, a papermaking step for producing pulp molded articles is carried out by use of a papermaking screen (a silk screen is used in the disclosed apparatus), and a papermaking screen is damaged easily through repeated use. Therefore, the above-described apparatus must be suspended each time the papermaking screen is repaired or renewed, which is unfavorable as an apparatus for manufacturing heat-insulating containers at reduced cost by increasing production efficiency.

Accordingly, a forth object of the present invention is to provide an apparatus for producing a heat-insulating container which is capable of providing heat-insulating containers at high production efficiency.

DISCLOSURE OF THE INVENTION

The present inventors have found that a thin-walled and highly heat-insulating container which meets the first object of the invention can be obtained by forming a multilayer fiber structure with different densities.

Completed based on the above finding, the present invention provides a heat-insulating container having at least a first fiber layer with a prescribed density which is made mainly of pulp by papermaking and a second fiber layer which is formed inside the first fiber layer and has a lower density than the first fiber layer, wherein the first fiber layer has a thickness of 0.2 to 1 mm, the second fiber layer has a thickness of 0.4 to 3 mm, the total thickness of the first fiber layer and the second fiber layer is 0.6 to 4 mm, and the density of the body of the container varies in the vertical direction thereof.

The present invention also provides a heat-insulating container having at least a first fiber layer having a prescribed density which is made mainly of pulp by papermaking, a second fiber layer which is formed inside the first fiber layer and made of a material containing a blowing agent and has a lower density than the first fiber layer, and a third fiber layer which is formed inside the second fiber layer and has a higher density than the second fiber layer, wherein the container has a flange on the periphery of the opening thereof, and the first and the third fiber layers are joined together at the periphery of the flange.

The present invention also provides a method of producing a heat-insulating container which comprises making a wet fiber layer shaped to a container from a pulp slurry by papermaking, applying a blowing agent to the inner surface of said wet fiber layer, dewatering the fiber layer by pressing under a prescribed pressure, heat drying the fiber layer to expand the applied blowing agent to lower the density of the inner skin layer of the fiber layer.

The heat-insulating container provided by the prevent invention includes one having a blowing agent layer in place of the second fiber layer.

The present invention accomplishes the second object by providing a method of producing a heat-insulating container having an inner pulp layer and an outer pulp layer both made mainly of pulp by papermaking, which comprises separately forming the inner pulp layer and the outer pulp layer by papermaking, fitting a stack of the inner pulp layer and the outer pulp layer both while wet between a male mold having a prescribed clearance with the inner pulp layer and a female mold, and drying the stack to deform the inner pulp layer in conformity with the clearance to produce a difference in total layer thickness.

The present invention also provides a method of producing a heat-insulating container comprising making a wet fiber layer shaped to a container from a pulp slurry by papermaking, applying a blowing agent to the inner surface of the wet fiber layer, dewatering the fiber layer, and heat drying the fiber layer between a male mold having a prescribed clearance with the inner surface and a female mold to expand the applied blowing agent, thereby lowering the density of the inner skin layer of the fiber layer and producing a difference in total layer thickness in conformity with the clearance.

The present inventors have also found that a heat-insulating container meeting the third object, i.e., a thin-walled and lightweight heat-insulating container having desired buckling strength as well as heat insulating properties can be obtained by forming a structure composed of an inner layer and an outer layer both made mainly of pulp by papermaking and a heat-insulating layer formed of a heat-insulating material interposed between the inner and the outer layer, the inner layer and the heat-insulating layer being fixed together via a mixed layer comprising the pulp and the heat-insulating material.

Reached by the above finding, the present invention provides a io heat-insulating container having an inner layer and an outer layer both made mainly of pulp by papermaking and a heat-insulating layer formed of a heat-insulating material between the inner layer and the outer layer, which is characterized in that a mixed layer comprising the pulp and the heat-insulating material is formed between the inner or the outer layer and the heat-insulting layer and that the inner or the outer layer and the heat-insulating layer are fixed together via the mixed layer.

The present invention also accomplishes the forth object by providing an apparatus for producing a heat-insulating container having an outer layer and an inner layer which are separately made mainly of pulp and are joined together via a heat-insulating layer formed by generation of foams from a blowing agent, which comprises:

a plurality of outer layer-forming core units, a transfer mechanism for transferring the outer layer-forming core units in rotation, an outer layer-forming station where a dried outer layer is formed by using the outer layer-forming core unit transferred by the transfer mechanism, a plurality of inner layer-forming core units, a transfer mechanism for transferring the inner layer-forming core units in rotation, an inner layer-forming station where a wet inner layer having a blowing agent adhered to the outer surface thereof is formed by using the inner layer-forming core unit transferred by the transfer mechanism, and a unitary body-forming core unit having a prescribed clearance with the inner surface of the inner layer, a drying mold having a cavity in conformity with the outer layer, a unitary body-forming station where the dried outer layer and the wet inner layer being put on between the drying mold and the unitary body-forming core unit to stack into a unitary body, then the heat-insulating layer being formed by generation of foams from the blowing agent while the profile of the unitary body-forming core being transferred to the inner layer.

BRIEF DESCRIPTION OF THE DRAWINGS

FIGS. 3(a) to (f) schematically show part of the flow in the production of the heat-insulating container according to the present invention, in which FIG. 3(a) shows the step of papermaking to form a first fiber layer; FIG. 3(b) shows the step of dewatering and drying the first fiber layer; FIG. 3(c) shows the step of papermaking to form a third fiber layer; FIG. 3(d) shows the step of coating the outer surface of the third fiber layer with a blowing agent; FIG. 3(e) shows the step of stacking the first fiber layer and the third fiber layer; and FIG. 3(f) shows the step of drying.

FIGS. 5(a) through (f) schematically show part of the flow in the production of the heat-insulating container according to the present invention, in which FIG. 5(a) shows the step of papermaking to form an outer pulp layer; FIG. 5(b) shows the step of dewatering and drying the outer pulp layer; FIG. 5(c) shows the step of papermaking to form an inner pulp layer; FIG. 5(d) shows the step of coating the outer surface of the inner pulp layer with a blowing agent; FIG. 5(e) shows the step of stacking the inner pulp layer and the outer pulp layer; and FIG. 5(f) shows the step of drying.

FIGS. 6(a) and (b) schematically illustrate the step of forming a resin film layer in the method of producing a heat-insulating container according to the present invention, in which FIG. 6(a) is a schematic cross-sectional view of a container set in a vacuum forming machine.

FIGS. 9(a) through (f) schematically show part of the flow in the production of the heat-insulating container according to the present invention, in which FIG. 9(a) shows the step of papermaking to form an outer layer; FIG. 9(b) shows the step of dewatering and drying the outer layer; FIG. 9(c) shows the step of papermaking to form an inner layer; FIG. 9(d) shows the step of coating the outer surface of the inner layer with a blowing agent; FIG. 9(e) shows the step of stacking the inner layer and the outer layer; and FIG. 9(f) shows the step of drying.

FIGS. 12(a) and (b) schematically show a core unit used in the apparatus according to the embodiment, in which FIG. 12(a) is a vertical cross-section.

FIGS. 15(a) and (b) schematically show a transfer unit used in the apparatus according to the embodiment, in which FIG. 15(a) is a plan view.

FIGS. 19(a) and (b) schematically illustrate the step of applying an adhesive to the outer layer in the apparatus according to the embodiment, in which FIG. 19(a) is a view before application, partly represented in section.

BEST MODE FOR CARRYING OUT THE INVENTION

The present invention will be described based on its preferred embodiments by referring to the accompanying drawings.

Figure 1:
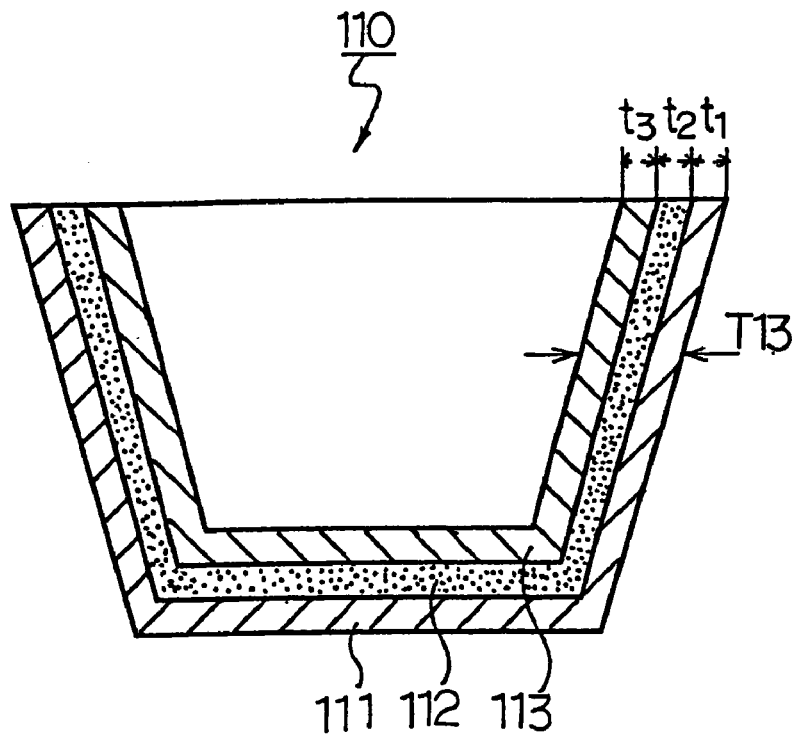
FIG. 1 is a schematic cross-sectional view of a first embodiment of the heat-insulating container according to the present invention.

FIG. 1 shows the first embodiment of the heat-insulating container according to the present invention, in which numerical reference 110 indicates the heat-insulating container.

As shown in FIG. 1, the heat-insulating container 110 is a heat-insulating cup-shaped container composed of a first fiber layer 111 having a prescribed density, a second fiber layer 112 which is formed inside the first fiber layer 111 and has a lower density than the first fiber layer 111, and a third fiber layer 113 which has a higher density than the second fiber layer 112. The third fiber layer 113 is formed inside the second fiber layer 112 and is denser than the second fiber layer 112 to provide an inner surface with increased smoothness so that, for example, the inner surface might be, if desired, coated uniformly. The heat-insulating container 110 has the second fiber layer 112 in the body and the bottom thereof.

From the standpoint of shape retention, moisture-proofness, compressive strength, small wall thickness, and lightweight of the heat-insulating container of the present invention, the first fiber layer has a thickness (the term "thickness" as used herein and hereinafter denotes a dry thickness measured by the method described in Example 1.1 given later) of 0.2 to 1 mm, preferably 0.4 to 1 mm, more preferably 0.5 to 1 mm.

In order for the heat-insulating container of the present invention to have the heat insulating performance hereinafter specified, the second fiber layer has a thickness of 0.4 to 3 mm, preferably 0.5 to 3 mm, more preferably 0.6 to 3 mm. Even though the second fiber layer's thickness exceeds 3 mm, there will be produced no further difference in heat insulating properties.

From the standpoint of shape retention, moldability, strength against the contents, and ease of coating and film laminating, it is preferred for the third fiber layer to have a thickness of 0.2 to 1 mm, particularly 0.4 to 1 mm, especially 0.5 to 1 mm.

In order for the heat-insulating container of the present invention to be thin and light, the total thickness of the first fiber layer and the second fiber layer is 0.6 to 4 mm, preferably 0.9 to 4 mm, more preferably 1.1 to 4 mm.

Considering that the heat-insulating container of the present invention should be thin-walled and yet capable of heat insulation, the total thickness of the first, second, and third fiber layers (e.g., the thickness T13 in the body shown in FIG. 1) is preferably 0.8 to 5 mm, more preferably 1.3 to 5 mm, particularly preferably 1.6 to 4 mm.

The densities (the term "density" as used herein and hereinafter denotes a density after drying) of the first and third fiber layers preferably range from 0.2 to 1.5 g/cm$^3$, particularly 0.4 to 1.0 g/cm$^3$, to secure surface smoothness, moisture- and waterproofness, shape retention, and compressive strength.

The density of the second fiber layer is preferably 0.01 to 0.15 g/cm$^3$, more preferably 0.02 to 0.1 g/cm$^3$, to secure lightweight and the heat insulating performance hereinafter specified.

Adapted to be used as a food container particularly for hot foods, the heat-insulating container having the first and the second fiber layers is required to have such heat-insulating properties that a user can hold by the hand. More specifically it is preferred that the temperature difference as measured by the method described in Example 1.1 hereinafter given be from 20 to 50° C., particularly from 25 to 40° C.

The surface smoothness of the first and the third fiber layers is preferably such that the centerline average roughness Ra and the maximum height $R_{max}$, both measured by the method of Example 1.1 (corresponding to JIS B0601), be from 1 to 8 µm and 60 µm or smaller, respectively, particularly 2 to 6 µm and 50 µm or smaller, respectively.

Thus, being thin-walled and lightweight and having a low-density second fiber layer inside the high-density first fiber layer, the heat-insulating container of the invention is excellent in not only heat insulation but shape retention and mechanical strength (compressive strength). Having the third fiber layer inside the second fiber layer, the container has increased smoothness on its inner side and therefore has high coatability. With a high density and a smooth outer surface, the first fiber layer exhibits excellent printability.

The heat-insulating container of the present invention can be produced by the method of producing a heat-insulating container according to the present invention as described below.

The heat-insulating container of the present invention is produced by use of, for example, a set of molds composed of a male mold and a female mold. The male mold which can be used includes one having a metallic papermaking part and a screen covering the papermaking part, the papermaking part having a downward directed projection with a desired contour corresponding to the inner configuration of a container to be molded and having inside gas/liquid flow passageways which connect to the outer side of the projection. The female mold has a metallic dewatering and drying part having a depression whose inner surface corresponds to the papermaking part of the male mold and having inside gas/liquid flow passageways which connect to the inner side of the depression.

The male mold is immersed in a third fiber slurry, and the third fiber slurry is sucked up through the gas/liquid flow passageways. The fiber is thus deposited on the screen to form a wet third fiber layer.

The third fiber slurry used to form the third fiber layer preferably consists of pulp fiber and water. It may contain, in addition to the pulp fiber and water, inorganic substances, such as talc and kaolinite, inorganic fibers, such as glass fiber and carbon fiber, particulate or fibrous thermoplastic synthetic resins, such as polyolefins, nonwood or plant fibers, polysaccharides, and the like. The proportion of the additional components is preferably 1 to 70% by weight, more preferably 5 to 50% by weight, based on the total amount of the pulp fiber and the additional components. The fiber slurry may further contain appropriate additives, such as fiber dispersants, molding assistants, colorants, and coloring assistants.

After depositing a prescribed third fiber layer, a wet second fiber layer containing a blowing agent is formed on the outer side of the third fiber layer by papermaking in a second fiber slurry containing the blowing agent. The second fiber layer can be formed in the same manner as for the third fiber layer.

The fiber slurry used to form the second fiber layer (second fiber slurry) can be the fiber slurry used to form the third fiber layer having dissolved or dispersed therein a blowing agent.

By using the second fiber slurry containing the blowing agent, the formed second fiber layer has the blowing agent entangled with the solid content of the second fiber slurry. As a result, heat insulating properties can be manifested with a small amount of the blowing agent, and the second fiber layer possesses the characteristics of each component. Where, in particular, the second fiber slurry contains pulp fiber, a container excellent in compressive strength and strength against grasping can be produced at lower cost.

When dried, the wet third and second fiber layers are directed predominantly toward the male mold and dried while being pressed against the male mold by the foams generated from the blowing agent. As a result, high drying efficiency can be achieved. Further, expansion of the blowing agent creates passageways for steam so that the third and second fiber layers can be dried efficiently in a short time without unevenness.

To suppress scorching and the like due to heat, the blowing temperature of the blowing agent is preferably 100 to 190° C., more preferably 110 to 160° C. Blowing agents having such a blowing temperature and dispersibility in a fiber slurry include micro-encapsulated blowing agents, expandable resins, and inorganic blowing agents, such as sodium hydrogencarbonate. Preferred of them are micro-encapsulated blowing agents particularly for their expansion ratio. Micro-encapsulated blowing agents which are preferably used include those having butane, pentane, etc. encapsulated in vinylidene chloride, acrylonitrile, etc.

The amount of the blowing agent dispersed in the second fiber slurry is preferably 4 to 30% by weight, more preferably 5 to 25% by weight, based on the total weight of the heat-insulating container in order to control the second fiber layer's density and thickness within the above-specified ranges, to minimize the production cost, and to assure heat insulating properties after generation of foams (for example, such heat insulating properties that a user can grasp by the hand the body of the container containing hot water of about 100° C.).

The first fiber layer is then formed by immersing the male mold in a first fiber slurry to deposit a fiber layer on the outer side of the second fiber layer by suction in the same manner as described above. The first fiber slurry can be of the same kind as the third fiber slurry.

The fiber slurries used to form the first to third fiber layers can contain sizing agents, pigments, fixing agents, and the like appropriately.

After a prescribed number of fiber layers (hereinafter also called "a multilayer fiber structure") is formed, the male mold is pulled up from the slurry and fitted into a mating female mold, and the wet multilayer fiber structure is dewatered. While the wet multilayer fiber structure is press dewatered, the water content of the structure is sucked and discharged through the gas/liquid flow passageways of the male and female molds. The pressing force in the step of press dewatering the multilayer fiber structure is preferably 0.4 to 2.0 MPa, more preferably 0.5 to 1.0 MPa, to achieve high dewatering efficiency and to transfer the profiles of the molds to the multilayer fiber structure with good precision.

The multilayer fiber structure is then dried by heating to cause the blowing agent in the second fiber layer to expand thereby to decrease the density of the second fiber layer. The pressing force in the heat drying is preferably 0.05 to 1.0 MPa, more preferably 0.1 to 0.6 MPa, to cause the blowing agent to expand effectively to provide the second fiber layer with prescribed density and thickness. The water content of the multilayer fiber structure is expelled in the form of steam through the gas/liquid flow passageways of the male and female molds during the heat drying.

The heat drying temperature should be at or above the blowing initiation temperature but not be so high as to cause scorching and be such as to maintain high drying efficiency. From these viewpoints, the heat drying temperature is preferably 150 to 230° C., more preferably 170 to 220° C.

After drying to a predetermined water content (5 to 10%), pressing by the male and female molds is released to complete heat drying. The molds are opened, and the thus formed heat-insulating container is taken out and trimmed according to necessity. The production cycle thus completes.

According to the above-described method of producing a heat-insulating container, a thin-walled and highly heat-insulating container can be manufactured conveniently.

Apart from the method using a male mold and a female mold, the heat-insulating container of the present invention can also be produced by the following method which uses a set of splits which are joined to make a papermaking mold having a cavity of prescribed shape. The splits used each have a plurality of holes interconnecting the cavity and the outside and have the inner side thereof covered with a screen with a prescribed mesh size.

The splits are butt-joined, and the first fiber slurry is poured under pressure, i.e., injected into the cavity while evacuating the cavity through the interconnecting holes. The water content of the first fiber slurry is sucked, and the fiber is accumulated on the screen to form a prescribed wet first fiber layer. Subsequently, the second fiber slurry is injected into the cavity to form a prescribed wet second fiber layer on the inner side of the first fiber layer.

While the cavity is continuously evacuated by suction, a hollow, elastically stretchable pressing member is inserted into the cavity. A pressurizing fluid is fed into the pressing member to inflate it like a balloon. The inflated pressing member presses the multilayer fiber structure onto the inner wall of the cavity thereby to dewater and to transfer the profile of the cavity to the fiber structure. The pressing member is made of urethane, fluororubber, silicone rubber, elastomers, etc., which are excellent in tensile strength, impact resilience, and stretchability. The pressurizing fluid includes compressed air (heated air), oil (heated oil) and other liquids. The pressing force by the pressing member in dewatering is preferably 0.4 to 2.0 MPa, more preferably 0.5 to 1.0 MPa, for assuring dewatering efficiency and for precise transfer of the inner profile of the cavity.

After the cavity profile has been sufficiently transferred to the multilayer fiber structure, and the fiber structure has been press dewatered to a prescribed water content, the feed of the pressurizing fluid is stopped, and the pressing member is made to shrink and removed from the cavity. The papermaking mold is opened, and the undried multilayer fiber structure is shifted to a drying mold.

Similarly to the papermaking mold, the drying mold is of the type that a set of splits are butt-joined to form a cavity corresponding to the contour of a molded article to be produced. The drying mold is heated to a predetermined temperature. The heating temperature can be the same as in the above-described method using a male mold and a female mold.

A pressing member similar to that used in the papermaking step is inserted inside the multilayer fiber structure, and a pressurizing fluid is fed into the pressing member to expand it. The multilayer fiber structure is dried as pressed toward the inner wall of the cavity by the expanded pressing member. The pressing force by the pressing member in the heat drying step is preferably 0.05 to 1.0 MPa, more preferably 0.1 to 0.6 MPa, to effectively expand the blowing agent in the second fiber layer. After the molded article dries sufficiently, the pressurizing fluid is withdrawn from the pressing member, and the shrunken pressing member is removed. The drying mold is opened to take out the heat-insulating container. After starting heat pressing, when the temperature of the second fiber layer reaches the blowing initiation temperature of the blowing agent, the pressing force can be lowered thereby to make the second fiber layer expand effectively and efficiently while increasing the densities of the first and the third fiber layers.

The heat-insulating container thus produced has a thin wall and excellent heat insulating performance. It has the body and the bottom integrally united with no seams in the body and the bottom and therefore exhibits high strength.

According to the method of producing a heat-insulating container of the present invention, the second fiber layer can be formed as follows. The first fiber layer is formed in the same manner as in the above-described methods of producing a heat-insulating container. The blowing agent is then applied to the inner side of the wet first fiber layer. The first fiber layer is press dewatered under a prescribed pressing force in the same manner as for the multilayer fiber structure and then heat dried while being pressed under a prescribed pressing force in the same manner as in the above-described heat drying step. Whereupon the blowing agent generates foams to reduce the density of the inner skin layer of the first fiber layer to form the second fiber layer.

The blowing agent can be applied by, for example, preparing a blowing agent-containing liquid by dissolving or dispersing the blowing agent in water and spraying the liquid with a sprayer.

Figure 2:
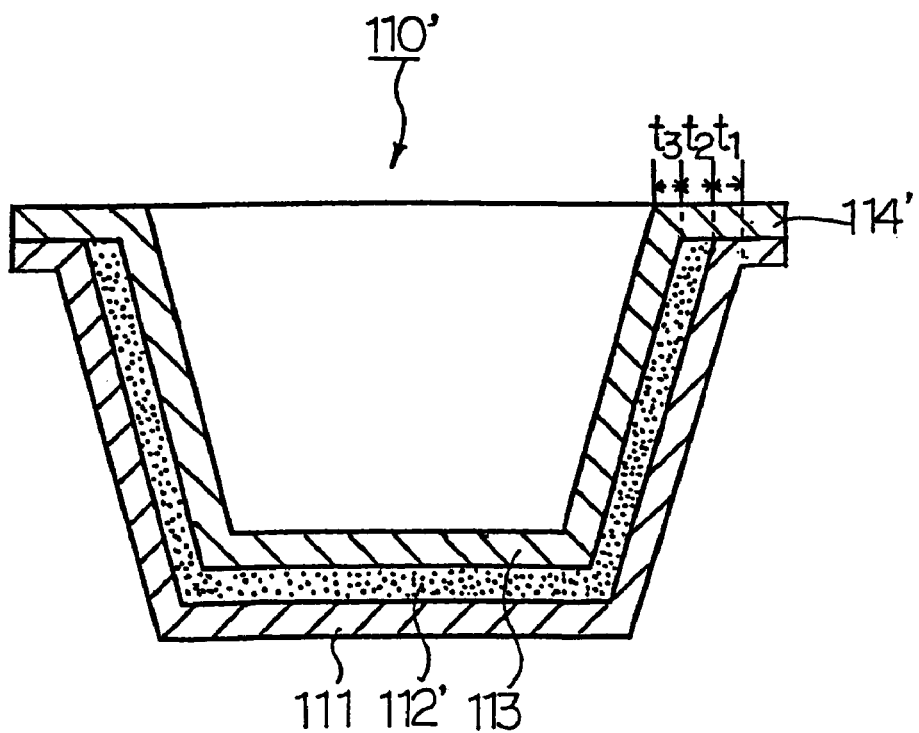
FIG. 2 is a schematic cross-sectional view of a second embodiment of the heat-insulating container according to the present invention.

FIG. 2 is a schematic cross-sectional view of the second embodiment of the heat-insulating container according to the present invention. Elements common to the first and the second embodiments are given the same numerical references, and description therefor is omitted here. Accordingly, the description given to the first embodiment appropriately applies to those particulars of the second one that are not referred to here.

The heat-insulating container 110' of the second embodiment shown in FIG. 2 has a first fiber layer 111 made from the first fiber slurry by papermaking, a third fiber layer 113 made from the third fiber slurry by papermaking, and a blowing agent layer 112' between the first and the third fiber layers. The heat-insulating container 110' has a flange 114'. The flange 114' consists of the third fiber layer 113 and the first fiber layer 111 joined together with no blowing agent layer 112'.

The heat-insulating container 110' according to the second embodiment is produced by forming a third fiber layer 113 by papermaking using the third fiber slurry, feeding to the outer surface of the third fiber layer 113 a liquid containing a blowing agent but not containing fiber in place of the second fiber slurry to impregnate the outer surface of the third fiber layer 113 with the liquid, stacking the third fiber layer 113 on a first fiber layer 111 separately formed from the first fiber slurry by papermaking, and drying the stack into a unitary body.

In producing the heat-insulating container 110', the third fiber layer 113 and the first fiber layer 111 are separately formed by papermaking. Each fiber layer can be formed by using a set of a male mold and a female mold. For example, the male mold has a papermaking part and a resin-made screen with prescribed mesh size and wire width which covers the papermaking part, the papermaking part having a downward directed projection with a desired contour and having in its inside gas/liquid flow passageways which connect to the outer side of the projection. The papermaking part of the male mold is made of an elastic material, such as heat-resistant and anti-corrosion rubber. By using such a mold having a papermaking part formed of an elastic material, a molded article with a complicated surface profile or a deep-drawn part can be produced. The female mold is a metallic mold having a depression whose inner surface profile corresponds to the contour of the papermaking part of the male mold and having in its inside gas/liquid flow passageways which connect to the inner side of the depression. The female mold equipped with a heating means is used to serve for not only dewatering but drying.

As shown in FIGS. 3(a) and (c), a male mold 101 and a male mold 103 are immersed in respective tanks P1 and P3 filled with the respective fiber slurries, and the slurries are sucked up through the gas/liquid flow passageways (not shown) to deposit pulp fiber on the respective screens (not shown) to form a wet first fiber layer 111 and a wet third fiber layer 113 on the screens.

With regard to sufficient amount of gaseous bubbles generated from a blowing agent to form a blowing agent layer 112', the first fiber layer 111 is dried to increase its density before the third fiber layer 113 is stacked thereon. In detail, after a prescribed time of papermaking, the male mold 101 is pulled out of the slurry and fitted into a metallic female mold 102 mating with the male mold 101 as shown in FIG. 3(b), and the first fiber layer 111 is press-dewatered by the papermaking part of the male mold 101. The female mold 102 is heated by the heating means (not shown) to dry the first fiber layer 111 to increase its density. While the first fiber layer 111 is dewatered and dried, the water content (water and steam) of the first fiber layer 111 is sucked and discharged outside through the gas/liquid flow passageways of the male mold 101.

For enhancing the dewatering efficiency to increase the density, the pressing force in dewatering and drying the first fiber layer 111 is preferably 0.2 to 3 MPa, more preferably 0.4 to 1.5 MPa. The mold temperature (the temperature of the female mold 102) in drying the first fiber layer 111 is preferably 150 to 230° C., more preferably 170 to 220° C., for achieving drying efficiency while preventing scorching of the fiber layer. After dewatered and dried, the first fiber layer 111 is transferred from the male mold 101 to the female mold 102. After completion of the transfer, the male mold 101 is withdrawn.

While the first fiber layer 111 is treated to have an increased density, the outer surface of the third fiber layer 113 is coated with a blowing agent by, for example, dipping the male mold 103 having deposited thereon the third fiber layer 113 in a tank P2 filled with a liquid containing the blowing agent as shown in FIG. 3(d) and sucking up the liquid through the gas/liquid flow passageways of the male mold to infiltrate the liquid into the outer surface of the third fiber layer 113. The water content of the third fiber layer 113 before impregnation with the blowing agent is preferably 60 to 90%, more preferably 70 to 85%, so that the blowing agent may be entangled with the fibers satisfactorily.

The outer surface of the wet third fiber layer 113 is thus impregnated with the liquid containing only the blowing agent, and the blowing agent adheres to the fibers constituting the outer surface of the third fiber layer 113 with entanglement to form a mixed layer (not shown) having both the fibers and the blowing agent. The mixed layer serves to firmly unite the third fiber layer 113 and the blowing agent layer 112'. The resulting container hardly suffers from delamination even when deformed by, for example grasping.

Forming the blowing agent layer 112' solely of a blowing agent is advantageous for weight reduction of the container and for shaping a stacking shoulder with good precision. When drying, since the wet third fiber layer is predominantly directed toward the male mold 104 (see FIG. 3(f)), it is pressed against the male mold 104 by the expanding blowing agent to thereby achieve high drying efficiency. Further, the blowing agent layer 112' serves as passageways for steam so that the third fiber layer 113 can be dried efficiently in a short time without unevenness.

It is preferred from the standpoint of strength that the blowing agent layer 112' be formed all over the body and the bottom of the container. Where a resin film is provided on the inner surface of the container by, for example, vacuum forming (skin packing) as described later, it is preferred that the blowing agent layer 112' be formed in parts of the body and the bottom taking air permeability for sucking the resin film into consideration.

The density and distribution of the blowing agent layer are appropriately adjustable taking into consideration container's strength, heat insulating properties, and air permeability for laminating with a resin film by vacuum forming.

The amount of the blowing agent is preferably 1 to 20% by weight, more preferably 3 to 10% by weight, based on the total weight of the heat-insulating container to provide the blowing agent layer with the above-recited density and thickness and also for considerations of production cost.

Then the third fiber layer 113 and the first fiber layer 111 are stacked with the blowing agent layer therebetween. That is, the third fiber layer 113 impregnated with the blowing agent is placed above the first fiber layer 111, which has been dewatered and dried in the female mold 102, and stacked on the first fiber layer 111 as shown in FIG. 3(e). When stacking, the third fiber layer 113 remains on the male mold 103. That is, the male mold 103 having the third fiber layer 113 on is mated with the female mold 102 and presses the wet third fiber layer 113 with its papermaking part to bring the third fiber layer 113 and the first fiber layer 111 into intimate contact while carrying out dewatering. Thereafter, compressed air is ejected through the gas/liquid flow passageways of the male mold 103 to transfer the third fiber layer 113 from the male mold 103 to the female mold 102. After the transfer, the male mold 103 is withdrawn.

As shown in FIG. 3(f), a metallic male mold 104 is mated with the male mold 102. The male mold 104 has gas/liquid flow passageways (not shown) similarly to the male mold 103 and is equipped with a heating means (not shown). The male mold 104 and the female mold 102 are heated by their respective heating means to expand the blowing agent infiltrated into the third fiber layer 113. As a result, the blowing agent layer 112' reduces its density, and the first fiber layer 111 and the third fiber layer 113 are united into one body. The flange 114' is also made unitary by the pressing force during drying. An adhesive is preferably used to make the flange 114' unitary with increased adhesion. Use of starch or like adhesives is recommended for application to food containers. During the heating, the water content of the third fiber layer 113 is expelled in the form of steam through the gas/liquid flow passageways of the male mold 104.

The mold temperature for drying should be at or above the blowing initiation temperature but not be so high as to cause scorching of the fiber layers 111 and 113 and be such as to maintain high drying efficiency. From these viewpoints, the mold temperature is preferably 150 to 230° C., more preferably 170 to 220° C.

On reaching a prescribed expansion ratio and drying the fiber layers 111 and 113 to a prescribed water content, the heat drying completes. The male and female molds 104 and 102 are opened to remove the resulting heat-insulating container.

The heat-insulating container 110' according to the second embodiment is thin-walled and exhibits excellent heat insulating performance similarly to the container 110 of the first embodiment. The flange 114', having no heat-insulating layer, can be made thinner and more fabricable in bending or like fabrication.

In applying as, for example, a container of instant noodles, the heat-insulating container 110' having no blowing agent layer 112' in its flange 114' is advantageous in that the blowing agent is prevented from bleeding from the joint end of the flange 114', still less being eaten when a user put his or her lips against the flange.

In the heat-insulating container 110', a pulp fiber/blowing agent mixed layer is formed on the interface between the third fiber layer 113 and the blowing agent layer 112', with which the two layers are firmly united, and the first fiber layer 111 and the blowing agent layer 112' are united by fusion of the blowing agent at the interface therebetween. The first fiber layer 111, the blowing agent layer 112', and the third fiber layer 113 are thus firmly united into one body to secure high heat insulating properties and shape retention even when hot water, etc. is poured in.

Since the heat-insulating container 110' of the second embodiment is a unitary body having the blowing agent layer 112' between the first and the third fiber layers 111 and 113, it is excellent in mechanical strength (compressive strength) as well as thin-walled and highly heat insulating.

Figure 6A:
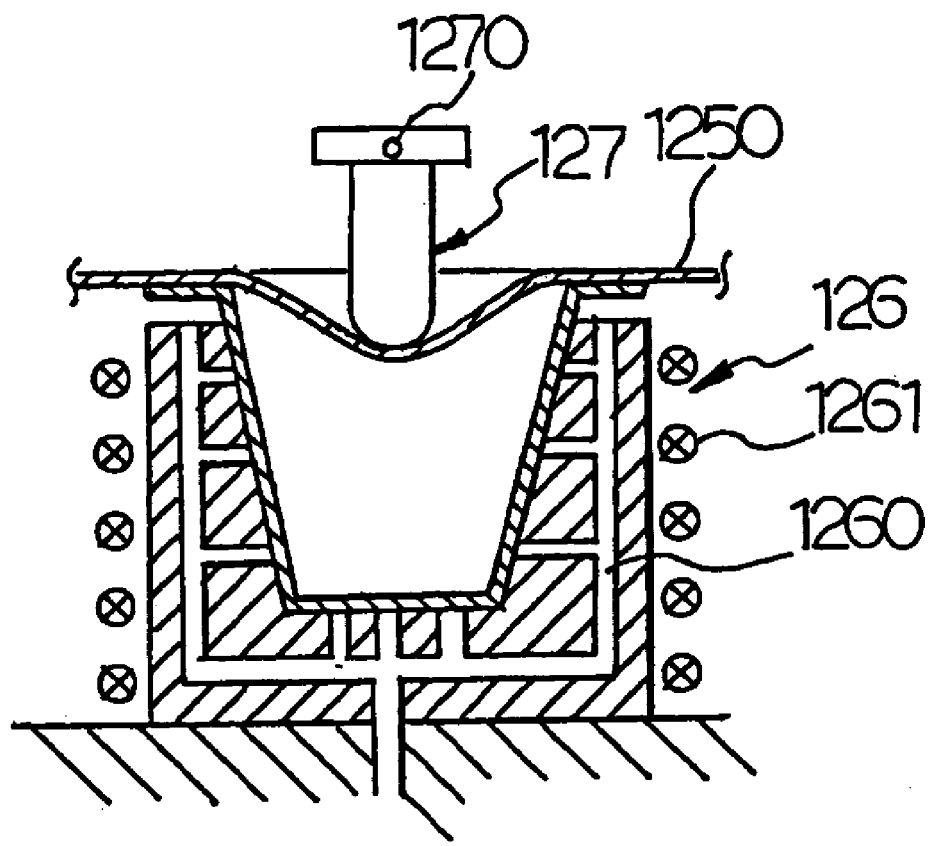

Further, because the heat-insulating container 110' has a smooth surface with no joint seams on both the inner and the outer surfaces, it has satisfactory printability and exhibits good adhesion to a resin film 1250 hereinafter described (see FIGS. 6(a) and (b)).

In addition, since a pulp fiber/blowing agent mixed layer is formed on the interface between the third fiber layer 113 and the blowing agent layer 112', with which the two layers are firmly united, and the first fiber layer 111 and the blowing agent layer 112' are united by fusion of the blowing agent at the interface therebetween, the first fiber layer 111, the blowing agent layer 112', and the third fiber layer 113 are firmly united into one body. Accordingly, the container is excellent in that it exhibits high heat insulating properties and shape retention even when hot water, etc. is poured in and that it hardly suffers from delamination even when deformed by, for example, grasping.

The expansion ratio of the blowing agent is controllable by changing the clearance of the male mold, which offers freedom of design of the container as in forming functional shapes, e.g., a mark indicative of the level to which hot water, etc. is to be poured (hereinafter "pour mark"), a stacking shoulder, etc., or in forming decorative shapes, e.g., letters and logos.

By forming the container 110' by using a mold having a clearance, the mold is successfully inserted, hardly touching the third fiber layer 113 even in making a deep container with small taper like the container 110' and the container obtained after drying has excellent surface properties on its inside.

The present invention is not limited to the above-mentioned embodiments, and various changes and modifications can be made therein without departing from the spirit and scope thereof.

While it is preferred for the container to have a three layer structure composed of the first to the third fiber layers like the heat-insulating container 110 and 110' or a three layer structure composed of the first and the third fiber layers and the blowing agent layer, it is possible to omit the third fiber layer. In this case, the container has a dual layer structure composed of the first and the second fiber layers or the first fiber layer and the blowing agent layer. Where, in particular, a stacking shoulder is formed, the dual layer structure composed of the first fiber layer and the blowing agent layer provides enhanced precision of molding.

Where the third fiber layer is not formed, the second fiber layer or the blowing agent layer is preferably laminated with a resin film as an innermost layer. The same resin film as a resin film 1250 described later can be used, for example. Where the container has the third fiber layer, it is a matter of course that the inner side of the third fiber layer can be laminated with a resin film as with the case of a heat-insulating container 120 according to the third embodiment hereinafter described.

While it is desirable for the heat-insulating container of the present invention to have the second fiber layer or the blowing agent layer from the body to the bottom as with the case of the heat-insulating containers 110 and 110' according to the aforementioned embodiments, the second fiber layer or the blowing agent layer may be provided either in the body or the bottom.

The shape of the heat-insulating containers of the present invention is not limited to the above-illustrated cups and flanged cups and includes other various shapes, such as bowls, bottles, and trays.

The heat-insulating containers according to the present invention can be produced by replacing the second fiber slurry with a liquid containing the blowing agent but containing no fiber. In this case, papermaking from the first fiber slurry is preferably followed by feeding the blowing agent-containing liquid into the cavity. Feed of the blowing agent-containing liquid is followed by feeding the third fiber slurry to form the multilayer fiber structure having the wet first and third fiber layers, whereby the blowing agent can be incorporated into the fiber layer formed in the final stage of papermaking from the first fiber slurry. The resulting multilayer fiber structure is then dried to expand the blowing agent to decrease the density of the skin layer of the first fiber layer.

Figure 4:
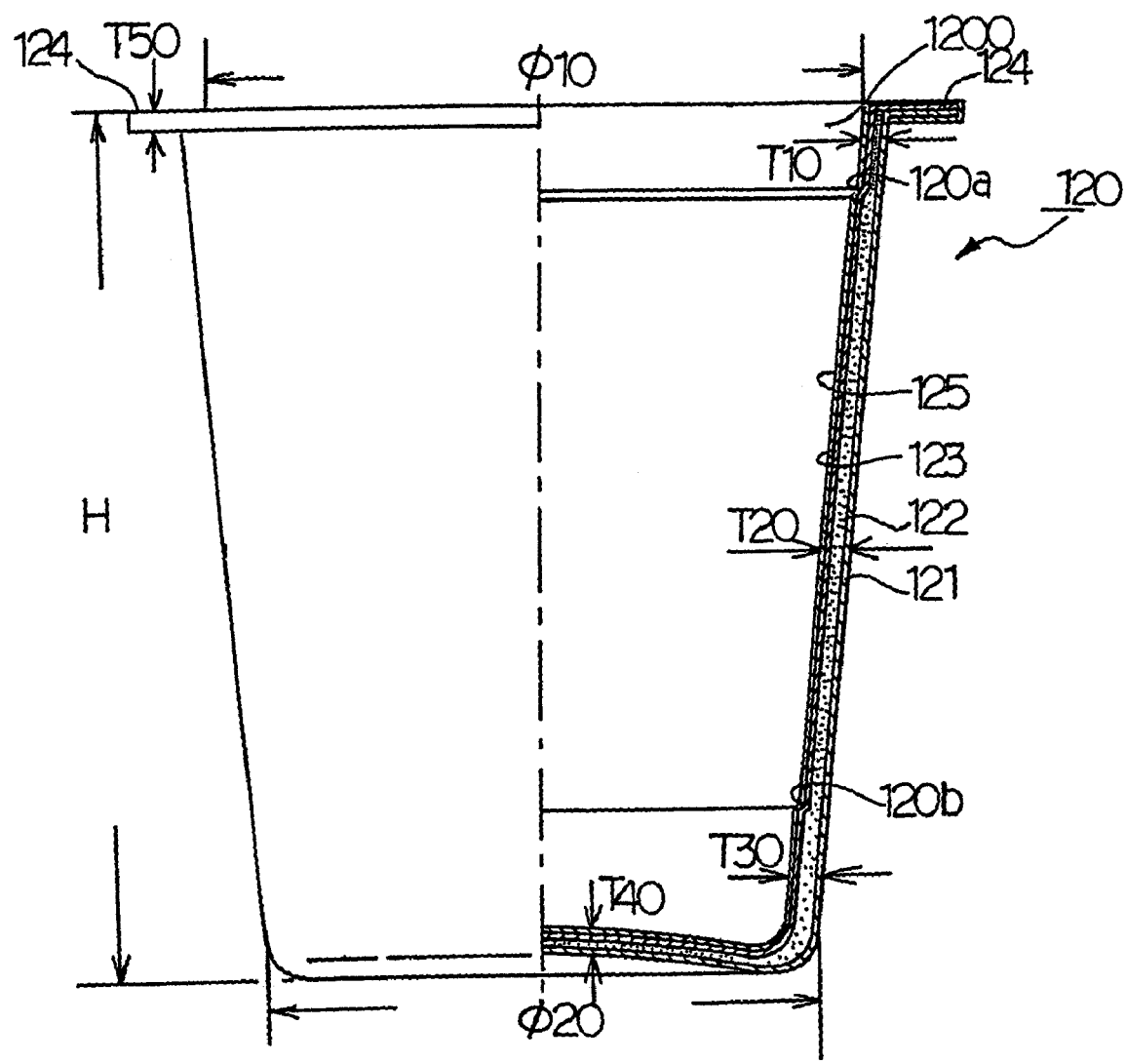
FIG. 4 is a vertical half cross-section schematically illustrating a third embodiment of the heat-insulating container according to the present invention.

FIG. 4 is a schematic vertical half cross-section of a cup for instant noodles as a representation of the third embodiment of the heat-insulating container according to the present invention, in which numerical reference 120 indicates the heat-insulating container.

As shown in FIG. 4, the heat-insulating container 120 has an inner pulp layer 123 and an outer pulp layer 121 both made mainly of pulp by papermaking and a blowing agent layer 122 between the inner pulp layer 123 and the outer pulp layer 121. The outer pulp layer 121 in the third embodiment is equivalent to the first fiber layer in the first and the second embodiments, and the inner pulp layer 123 is equivalent to the third fiber layer in the first and the second embodiments.

The body of the heat-insulating container 120 consists of portions having different wall thicknesses (the term "thickness" as used herein and hereinafter denotes a dry thickness measured by the method described in Example 2 given later) and different wall densities according to the expansion ratio of the blowing agent of the blowing agent layer 122. In other words, the wall thickness and the wall density of the body varies in the vertical direction.

The heat-insulating container 120 has different wall thicknesses (T10, T20, and T30) and wall densities in portions of its body sectioned by shoulders 120a and 120b. The wall thickness increases downward, while the density decreases downward in the body. The shoulder 120a serves as a mark indicative of the level to which hot water is to be poured (pour mark). The shoulder 120b serves as a stopper in stacking empty heat-insulating containers (stacking shoulder). The portion near the opening has a higher density of the blowing agent to enhance the strength, while the portion of the body from the middle to the bottom, which a user grasps, has a lower density of the blowing agent to manifest high heat insulating properties. The shoulders 120a and 120b made by the differences in wall thickness of the body are formed of the inner pulp layer 123. Since the shoulders 120a and 120b due to the change in wall thickness of the body are formed of the inner pulp layer 123, the outer pulp layer 121, which serves as the outer surface of the container 120, is permitted to have flatness assuring satisfactory printability.

The inner pulp layer 123 and the outer pulp layer 121 preferably have a density of 0.2 to 1.5 g/cm$^3$, particularly 0.4 to 1.0 g/cm$^3$, for considerations of surface smoothness, surface strength, compressive strength, waterproofness, shape retention, prevention of dusting when stacked, and cushioning properties when filling with contents or stacking.

It is preferred that the density of the outer pulp layer 121 be higher than that of the inner pulp layer 123 so that the shape retaining functions, such as compressive strength, stacking strength, and strength against grasping, may be chiefly performed by the outer pulp layer 121.

From the standpoint that the heat-insulating container 120 is to have a thin wall, the wall thickness of the portion where heat insulating properties are particularly required, for example, the thickness T20 in FIG. 6, is preferably 0.8 to 5 mm, more preferably 1.3 to 5 mm, particularly preferably 1.6 to 4 mm. The inner pulp layer preferably has a thickness of 0.2 to 1 mm, particularly 0.4 to 1 mm, especially 0.5 to 1 mm, for assuring stability in papermaking, shape retention, compressive strength for the reduced thickness and weight, and reducing the time for papermaking or drying. The outer pulp layer preferably has a thickness of 0.2 to 1 mm, particularly 0.4 to 1 mm, especially 0.5 to 1 mm, for the same reasons as for the inner pulp layer.

At least the part of the inner pulp layer 123 of the heat-insulating container 120 which forms the inner side of the heat-insulating container 120 preferably has the following surface smoothness to secure adhesion to a resin film if provided as described later and to prevent pinholes of the resin film provided. The surface smoothness is preferably such that the centerline average roughness Ra and the maximum height $R_{max}$, as measured by the method of Example 2 hereinafter given (corresponding to JIS B0601), are 1 to 20 μm and 100 μm or less, respectively, particularly 2 to 10 μm and 80 μm or less, respectively.

At least the part of the outer pulp layer 121 of the heat-insulating container 120 which forms the outer side of the heat-insulating container 120 preferably has a centerline average roughness Ra of 1 to 8 μm and a maximum height $R_{max}$ of 60 μm or less, particularly an Ra of 2 to 6 μm and an $R_{max}$ of 50 μm or less, both measured by the method of Example 2 hereinafter given, to assure satisfactory printability. It is preferred, on the other hand, that side of the outer pulp layer 121 to be brought into contact with the blowing agent layer 122 have a relatively rough surface, which can be formed by using a coarse screen in papermaking, so as to provide a large contact area with the blowing agent layer 122 and to bring about increased joint strength of the two layers.

The inner pulp layer 123 and the outer pulp layer 121 are layers made mainly of pulp by papermaking. They may be made solely of pulp fiber or may contain other components, such as inorganic substances, e.g., talc and kaolinite, inorganic fibers, e.g., glass fiber and carbon fiber, particulate or fibrous thermoplastic synthetic resins, e.g., polyolefins, nonwood or plant fibers, polysaccharides, and so forth. The proportion of the other components is preferably 1 to 70% by weight, more preferably 5 to 50% by weight, based on the total amount of the pulp fiber and the other components. The inner pulp layer 123 and the outer pulp layer 121 may additionally contain additives added in the step of papermaking, such as fiber dispersants, molding assistants, coloring pigments, coloring assistants, and so forth.

The blowing agent layer 122 is preferably made mainly of a blowing agent, more preferably made solely of a blowing agent.

Making the blowing agent layer 122 solely of a blowing agent is advantageous for weight reduction of the container and for shaping the stacking shoulder with good precision. Further, when drying, since the wet inner pulp layer is predominantly directed toward the male mold, it is pressed against the male mold by the expanding blowing agent to thereby achieve high drying efficiency. Furthermore, the blowing agent layer serves as passageways for steam so that the inner pulp layer can be dried efficiently in a short time without unevenness.

The blowing agents which can be used in the blowing agent layer 122 include micro-encapsulated blowing agents, expandable resins, and inorganic blowing agents, such as sodium hydrogencarbonate. Preferred of them are microencapsulated blowing agents particularly for their expansion ratio and handling capabilities. Micro-encapsulated blowing agents which are preferably used include those having butane, pentane, etc. encapsulated in vinylidene chloride, acrylonitrile, etc.

The blowing agent layer 122 may contain other components, such as inorganic substances, e.g., talc and kaolinite, inorganic fibers, e.g., glass fiber and carbon fiber, particulate or fibrous thermoplastic synthetic resins, e.g., polyolefins, nonwood or plant fibers, polysaccharides, and so forth. Where the blowing agent layer additionally contains fiber as the other component, such a layer is equivalent to the second fiber layer of the heat-insulating container according to the first embodiment.

Where the blowing agent layer contains the other components, the blowing agent is entangled with these components to exert heat insulating properties with a reduced amount, and the blowing agent layer possesses the characteristics of each component. Where, in particular, the blowing agent layer contains pulp fiber, the container will exhibit high compressive strength and high strength against grasping at lower cost. The amounts of the other components are decided appropriately so as not to increase the density of the blowing agent layer to reduce the heat insulating properties or not to increase the weight of the container.

Weight put on strength, it is preferred that the blowing agent layer 122 be formed all over the body and the bottom of the container. Where a resin film is provided on the inner surface of the container by, for example, vacuum forming (skin packing) as described later, it is preferred that the blowing agent layer 122 be formed in parts of the body and the bottom taking air permeability for sucking the resin film into consideration.

The density and distribution of the blowing agent layer 122 are appropriately adjustable taking into consideration container's strength, heat insulating properties, and air permeability for vacuum forming a resin film.

The heat-insulating container 120 has the blowing agent layer 122 formed between the inner and the outer pulp layers 123 and 121 to exhibit prescribed heat insulating performance. More specifically, the heat insulating performance is preferably such that the temperature difference be from 20 to 40° C. and that the surface temperature be from 50 to 65° C., more preferably such that the temperature difference be from 25 to 35° C. and that the surface temperature be from 55 to 60° C., both as measured by the method described in Example 2 hereinafter given.

The heat-insulating container 120 has a flange 124 on the periphery of its opening 1200. The flange 124 consists of the inner pulp layer 123 and the outer pulp layer 121 joined together with no blowing agent layer 122 interposed therebetween. Formed of the inner pulp layer 123 and the outer pulp layer 121 bonded together with no blowing agent layer 122 therebetween, the flange 124 can be made thinner and stronger and, in addition, more fabricable in subsequent fabrication. The flange 124 having no blowing agent, there is no fear of a user's erroneously swallowing the blowing agent.

The heat-insulating container 120 has a resin film layer 125 covering the inner side of the inner pulp layer 123 and the joint edge face of the flange 124. The resin film 125 imparts water resistance (leakproofness), gas barrier properties, and the like to the container. Accordingly, the resin film which can be used as the resin film layer 125 is not particularly limited in material, thickness, etc. as far as is capable of imparting a designed function. Useful resins include thermoplastic resins, such as polyolefin resins, e.g., polyethylene and polypropylene; polyester resins, e.g., polyethylene terephthalate; polyamide resins, e.g., nylon; polyvinyl resins, e.g., polyvinyl chloride; and styrene resins, e.g., polystyrene. Preferred of them are polyolefin resins for the cost of film production, formability, and the like. The resin film layer 125 has either a single layer structure or a multilayer structure.

The heat-insulating container 120 is covered with the resin film layer 125 as far as the lower side of the flange 124. As a result, water is prevented from entering through the joint edge face of the flange 124, where the ends of the inner and the outer pulp layers 123 and 121 meet, and the container is protected from damage initiating from the joint edge face. Further, when a user put his or her lips to the container 120, the flange 124 feels smooth.

In the heat-insulating container 120, a pulp/blowing agent mixed layer is formed on the interface between the inner pulp layer 123 and the blowing agent layer 122, with which the two layers are firmly united, and the outer pulp layer 121 and the blowing agent layer 122 are united by fusion of the blowing agent at the interface therebetween. Owing to the firm adhesion between the inner pulp layer 123 and the blowing agent layer 122, the container has high heat insulating properties and shape retention even when hot water, etc. is poured in.

Having a unitary structure with the blowing agent layer 122 between the inner and the outer pulp layers 123 and 121, the heat-insulating container 120 according to the present embodiment has excellent mechanical strength (compressive strength) as well as a small wall thickness and high heat insulating properties.

Having a smooth surface with no joint seams on both the inner and the outer sides, the heat-insulating container 120 exhibits satisfactory printability and good adhesion to a resin film.

The heat-insulating container 120 has different wall thicknesses and densities in the vertical direction in the body thereof according to differences in expansion ratio of the blowing agent. The portion near the flange 124 which is not required to be so heat-insulating has a suppressed expansion ratio to have increased strength, whereas the portion from the middle of the body to the bottom which is required to have high heat-insulating properties has an increased expansion ratio to have high heat-insulating properties. Thus, the heat-insulating container 120 is a superior container which exerts heat insulating properties and strength where needed.

The pulp/blowing agent mixed layer formed on the interface between the inner pulp layer 123 and the blowing agent layer 122 firmly units the two layers, and the outer pulp layer 121 and the blowing agent layer 122 are united by fusion of the blowing agent at the interface therebetween. Thus, the container exhibits high heat insulating properties and shape retention even when hot water, etc. is poured in and hardly suffers from delamination even when deformed by, for example, grasping.

Since the expansion ratio of the blowing agent is controllable by changing the clearance of the male mold, the heat-insulating container 120 has a freedom of design in forming functional shapes, e.g., a pour mark and a stacking shoulder, or decorative shapes, e.g., letters and logos.

The method of producing a heat-insulating container according to the present invention will then be described based on the process of producing the heat-insulating container 120 as a preferred embodiment with reference to the accompanying drawings.

In the method of producing the heat-insulating container 120, the inner pulp layer 123 and the outer pulp layer 121 are separately formed by papermaking. Each pulp layer is formed by using a set of a male mold and a female mold. The male mold which can be used include one having a papermaking part and a resin-made screen having prescribed mesh size and wire width which covers the papermaking part, the papermaking part having a downward directed projection with a desired contour and having in its inside gas/liquid flow passageways which connect to the outer side of the projection. The papermaking part of the male mold is made of an elastic material, such as heat-resistant and anti-corrosion rubber. By using such a mold having a papermaking part made of an elastic material, a molded article with a complicated surface profile or a deep-drawn part can be produced. The female mold is a metallic mold having a depression whose inner surface profile corresponds to the contour of the papermaking part of the male mold and equipped with a heating means so as to serve for not only dewatering but drying.

As shown in FIGS. 5(a) and (c), a male mold 1220 and a male mold 1230 are immersed in respective tanks P30 and P10 filled with the respective slurries for the respective pulp layers, and the slurries are sucked up through the gas/liquid flow passageways (not shown) to deposit pulp fiber on the respective screens (not shown) to form a wet inner pulp layer 123 and a wet outer pulp layer 121 on the screens of the respective male molds.

The slurry used to form each pulp layer preferably consists of pulp fiber and water. It may contain, in addition to the pulp fiber and water, inorganic substances, such as talc and kaolinite, inorganic fibers, such as glass fiber and carbon fiber, particulate or fibrous thermoplastic synthetic resins, such as polyolefins, nonwood or plant fibers, polysaccharides, and so forth. The proportion of the additional components is preferably 1 to 70% by weight, more preferably 5 to 50% by weight, based on the total amount of the pulp fiber and the additional components.

The slurry may further contain appropriate additives, such as fiber dispersants, molding assistants, colorants, and coloring assistants. The slurry can further contain sizing agents, pigments, fixing agents, and the like appropriately. In particular, addition of a sizing agent is advantageous in that, when a wet inner pulp layer and an outer pulp layer having been dried to a prescribed water content are joined into one body, the outer pulp layer is prevented from absorbing the water content of the inner pulp layer and thereby prevented from deteriorating the appearance due to stains on its outer surface.

In order to efficiently expand a blowing agent to form a blowing agent layer 122, the outer pulp layer 121 is dried to increase its density before the inner pulp layer is stacked thereon. In detail, after a prescribed time of papermaking, the male mold 1230 is pulled out of the slurry and fitted into a metallic female mold 1231 mating with the male mold 1230 as shown in FIG. 5(b). The female mold 1231 preferably has no vent holes on the inner side so as not to leave marks on the outer surface of the outer pulp layer 121, but a female mold with vent holes can be used where drying time reduction is desired.

The wet outer pulp layer 121 is press-dewatered by the papermaking part of the male mold 1230. The female mold 1231 is heated by its heating means (not shown) to dry the outer pulp layer 121 to increase its density. While the outer pulp layer 121 is dewatered and dried, the water content (water and steam) of the outer pulp layer 121 is sucked and discharged outside through the gas/liquid flow passageways of the male mold 1230.

For enhancing the dewatering efficiency to increase the density, the pressing force in dewatering and drying the outer pulp layer 121 is preferably 0.2 to 3 MPa, more preferably 0.3 to 1.5 MPa. The mold temperature (the temperature of the female mold 1231) in drying the outer pulp layer 121 is preferably 150 to 230° C., more preferably 170 to 220° C., for achieving drying efficiency while preventing scorching due to drying. After dewatered and dried, the outer pulp layer 121 is transferred from the male mold 1230 to the female mold 1231. After completion of the transfer, the male mold 1230 is withdrawn.

While the outer pulp layer 121 is treated to have an increased density, the outer-surface of the inner pulp layer 123 is coated with a blowing agent by, for example, dipping the male mold 1220 having deposited thereon the inner pulp layer 123 in a tank P20 filled with a liquid containing the blowing agent (a solution or dispersion of the blowing agent) as shown in FIG. 5(d) to infiltrate the liquid into the outer surface of the inner pulp layer 123.

The water content of the inner pulp layer 123 before being coated with the blowing agent is preferably 60 to 90%, more preferably 70 to 85%, so that the blowing agent may be entangled with the pulp fibers to easily form a mixed layer.

The outer surface of the wet inner pulp layer 123 is thus impregnated with the liquid containing the blowing agent, and the blowing agent adheres to the pulp fibers constituting the outer surface of the inner pulp layer with entanglement. Upon expanding the blowing agent, there will be formed a mixed layer having both the pulp fibers and the blowing agent, with which the inner pulp layer 123 and the blowing agent layer 122 are firmly united into one body. In applying the blowing agent to the outer surface of the inner pulp layer 123, the male mold 1220 may be evacuated through its gas/liquid flow passageways to suck up the blowing agent-containing liquid if necessary, to thereby adjust the degree of entanglement between the pulp fibers and the blowing agent.

To suppress scorching of the pulp fiber of the pulp layer due to heat expansion, the blowing temperature of the blowing agent is preferably 100 to 190° C., more preferably 110 to 160° C. Blowing agents having such a blowing temperature as well as dispersibility in water or a slurry include micro-encapsulated blowing agents and expandable resins. Preferred of them are micro-encapsulated blowing agents particularly for their expansion ratio and handling properties. Micro-encapsulated blowing agents which are preferably used include those having butane, pentane, etc. encapsulated in vinylidene chloride, acrylonitrile, etc.

The amount of the blowing agent is preferably 1 to 20% by weight, more preferably 3 to 10% by weight, based on the total weight of the heat-insulating container to provide the blowing agent layer with the above-recited density and thickness and also for considerations of production cost.

Then the inner pulp layer 123 and the outer pulp layer 121 are stacked with the blowing agent layer therebetween. That is, the inner pulp layer 123 impregnated with the blowing agent is placed above the outer pulp layer 121 that has been dewatered and dried and placed in the female mold 1231 and fitted into the outer pulp layer 121 as shown in FIG. 5(e). In fitting, the inner pulp layer 123 remains on the male mold 1220. That is, the male mold 1220 having the inner pulp layer 123 on is mated with the female mold 1231 and presses the wet inner pulp layer 123 with its papermaking part to bring the inner pulp layer 123 and the outer pulp layer 121 into intimate contact while carrying out dewatering. Thereafter, compressed air is ejected through the gas/liquid flow passageways of the male mold 1221 to transfer the inner pulp layer 123 from the male mold 1220 to the female mold 1231. After the transfer, the male mold 1220 is withdrawn.

As shown in FIG. 5(f), a metallic male mold 1221 is mated with the female mold 1231 to press toward the female mold 1231. The male mold 1221 has a predetermined clearance C12 which varies in agreement with the variations of the wall thickness of the heat-insulating container 120 at the shoulders 120a and 120b. With such a clearance C12, the male mold is successfully inserted without touching the inner pulp layer even in making a deep container with small taper so that the container obtained after drying may have a smooth inner surface. The male mold 1221 has gas/liquid flow passageways (not shown) similarly to the male mold 1220 and is equipped with a heating means (not shown).

The male mold 1221 and the female mold 1231 are heated by their respective heating means to expand the blowing agent infiltrated into the inner pulp layer 123. As a result, the blowing agent layer 122 reduces its density and unites the inner pulp layer 123 and the outer pulp layer 121 into one body.

The flange 124 is also made unitary by the pressing force during drying. An adhesive is preferably used to make the flange 124 unitary with increased adhesion. Use of starch or like adhesives is recommended for application to food containers. During the drying, the water content of the inner pulp layer 123 is expelled in the form of steam through the gas/liquid flow passageways of the male mold 1221.

The mold temperature for drying (the temperatures of the male mold 1221 and the female mold 1231) should be at or above the blowing initiation temperature but not be so high as to cause scorching of the pulp layers 123 and 121 and be such as to maintain high drying efficiency. From these viewpoints, the mold temperatures are preferably 110 to 230° C., more preferably 130 to 180° C.

On reaching a prescribed expansion ratio of the blowing agent and drying the inner pulp layer 123 to a prescribed water content, the heat drying completes. The male and female molds 1221 and 1231 are opened to remove the resulting heat-insulating container (semi-finished product).

Thereafter, the resin film layer 125 is formed to cover the inner surface of the inner pulp layer 123 and the joint end of the flange 124. The resin film layer 125 can be formed by conventional methods, such as pressure forming and vacuum forming. Skin packing or a like technique is preferred particularly for covering a deep container with a resin film. Vacuum forming can be carried out, for example, as follows. As shown in FIG. 6(a), the semi-finished heat-insulting container is placed in a vacuum forming mold 126 which is substantially the same size as the female mold 1231 (see FIG. 5) used in dewatering and drying the outer pulp layer 121 and has evacuation passageways 1260 and band heaters 1261. A resin film 1250 is set to cover the opening of the container. A plug 127 equipped with a heater 1270 is brought down to press the resin film 1250 into the mold while softening the resin film 1250. At the same time, the container, being air permeable, is evacuated through the evacuation passageways 1260 to thereby bring the resin film 1250 into intimate contact with the inner surface of the inner pulp layer 123.

Figure 6B:
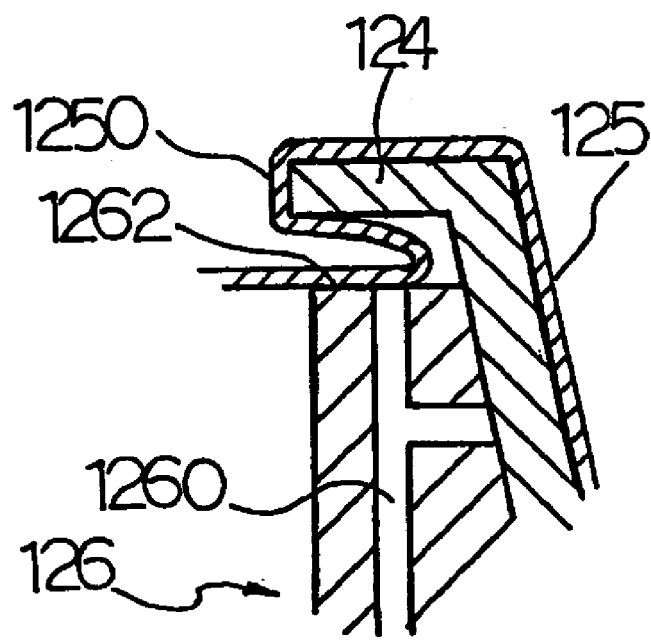
FIG. 6(b) is an enlarged cross-sectional view of the flange shown in FIG. 6(a) with which the resin film is in intimate contact.

As depicted in FIG. 6(b), there is a prescribed clearance between the flange 124 and a part 1262 of the vacuum forming mold 126 which faces the lower side of the flange 124, and the part 1262 also has vacuum ports for the evacuation passageways 1260. As a result, the resin film 125 comes into intimate contact with the lower side of the flange 124 to thereby cover the joint edge face of the flange 124 completely. Finally, the resin film 1250 is trimmed to provide a finished product.

The method of producing the heat-insulating container 120 according to the present embodiment is convenient to provide a heat-insulating container which is thin-walled and excellent in shape retention and heat-insulating performance.

The method of the present invention is not limited to the above-mentioned embodiment, and various changes and modifications can be made therein without departing from the spirit and scope thereof.

For example, while it is desirable for a cup-shaped heat-insulating container like the container 120 of the above-described embodiment to have portions different in wall thickness and wall density due to difference in blowing agent's expansion ratio in the body portion thereof (the portion to be grasped by the hand), the place where such portions with different wall thicknesses and wall densities are to be formed is of choice according to the shape of a container. Where a container is a plate, for instance, such portions can be formed in the body or the other part, e.g., the bottom. While it is preferred to form a stacking shoulder in the body, a stacking should may be omitted if unnecessary.

The shape of the heat-insulating containers of the present invention is not limited to the above-illustrated flanged containers and includes other various shapes, such as bowls, bottles, plates, and trays. It is a matter of course that the heat-insulating containers of the present invention, which hardly cause condensation owing to their heat insulating properties, are useful as containers for cold foods and drinks.

Figure 7:
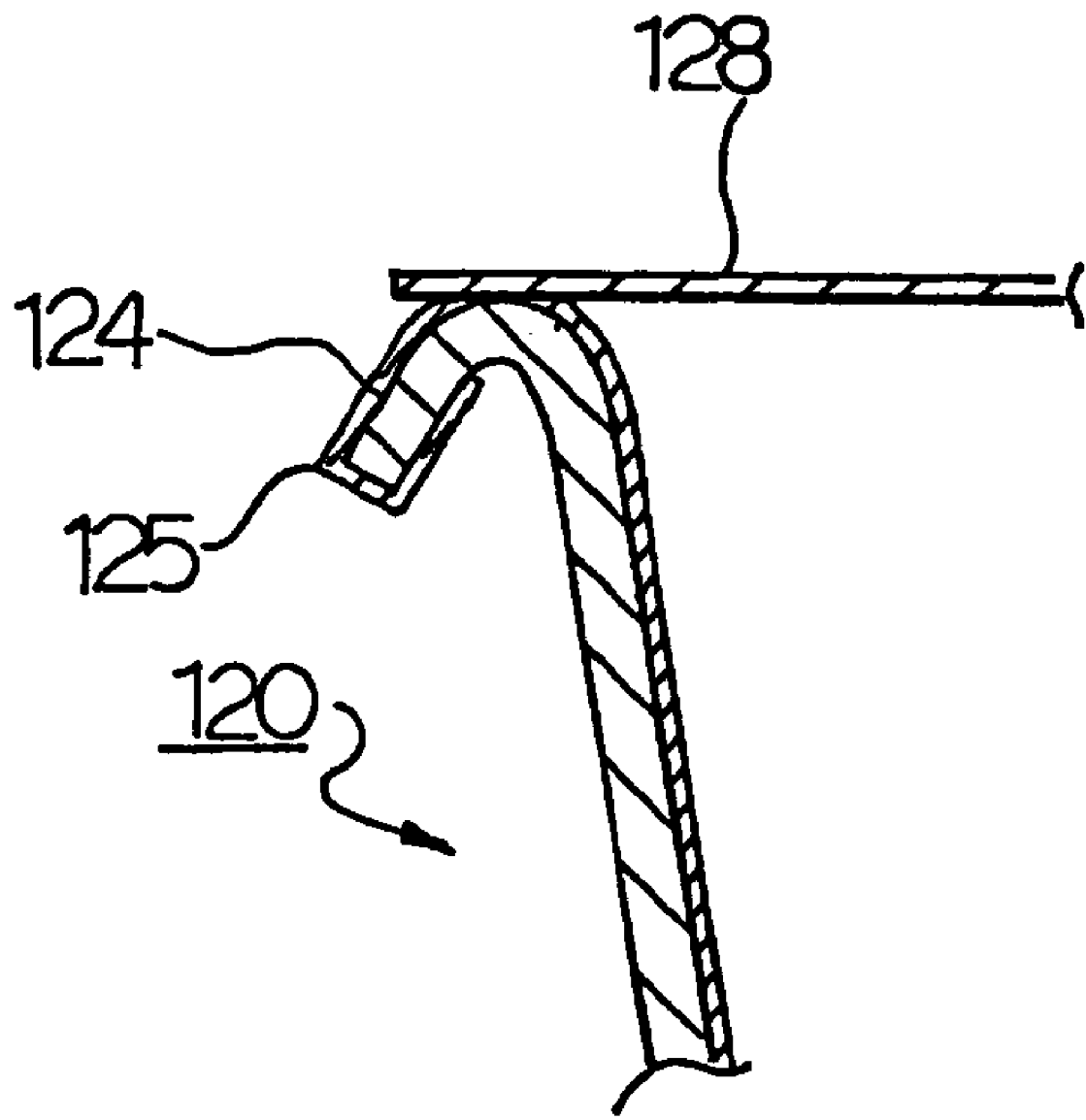
FIG. 7 is a schematic partial cross-section of the heat-insulating container according to the present invention, showing another embodiment of the flange.

Although the flange of the heat-insulating container of the present invention is preferably formed flat as in the heat-insulating container 120 of the above-described embodiment, the flange 124 formed flat may be rounded as shown in FIG. 7. Where the heat-insulating container 120 is sealed by adhering a lid 128, the rounded flange 124 will make it easier for a user to pick and pull the lid 128. Besides, since the resin film layer 125 at the joint edge is apart from the lid 218, the resin film layer 125 is prevented from peeling when the lid is pulled apart to open the container.

As stated previously, the method of producing a heat-insulating container according to the present invention is preferably carried out by stacking the inner pulp layer 123 on the outer pulp layer 121 that has previously been dried to have an increased density. It is also possible that the inner pulp layer 123 is combined with the outer pulp layer 121 that remains undried, and the combined two layers are dried simultaneously.

While coating the outer surface of the inner pulp layer 123 with the blowing agent is preferably performed by dipping the inner pulp layer 123 in the blowing agent-containing liquid, it is possible to apply the liquid to the outer surface of the inner pulp layer 123 by spraying and the like.

Figure 8:
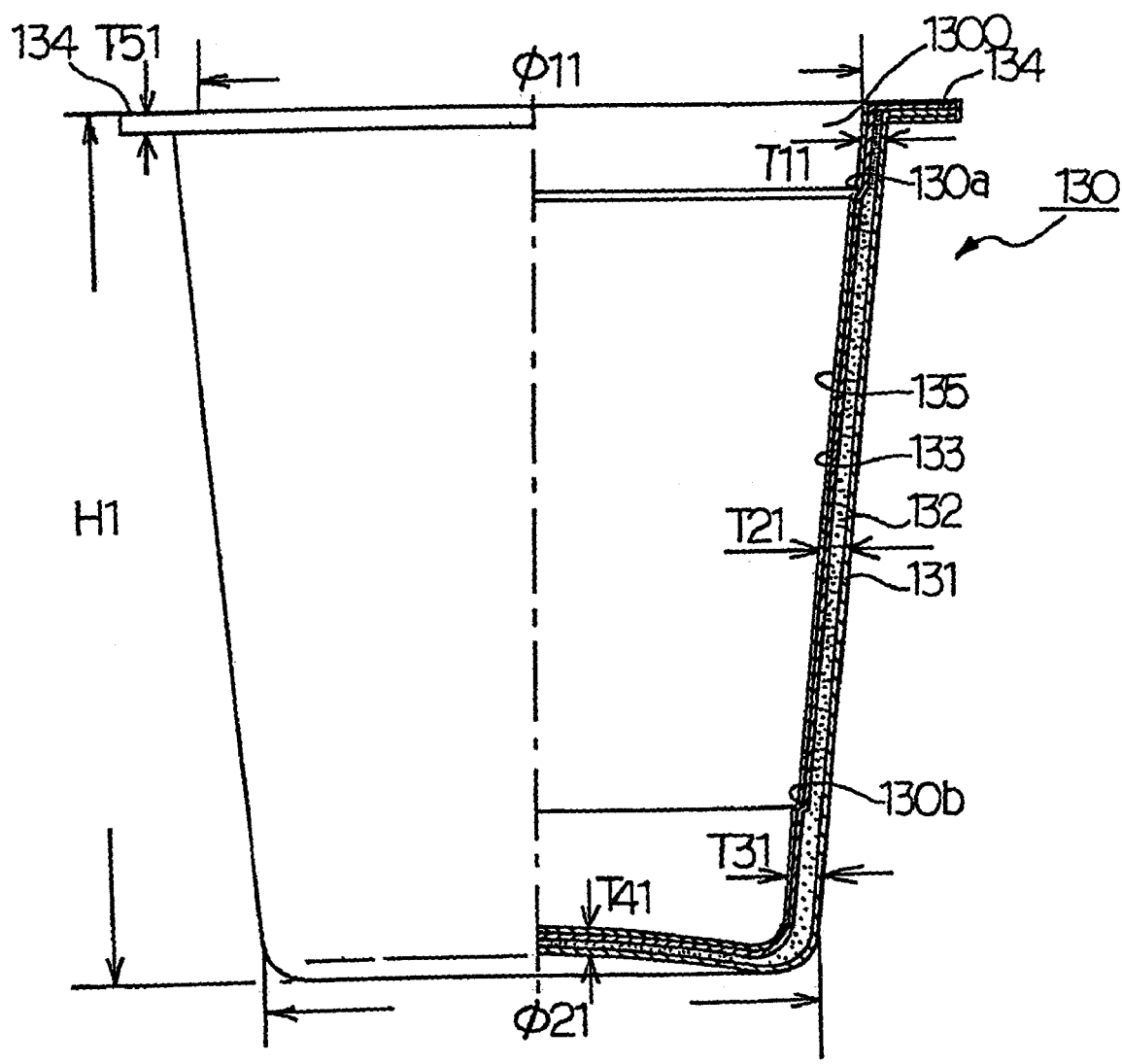
FIG. 8 is a vertical half cross-section schematically illustrating an embodiment of the heat-insulating container according to the present invention.

FIG. 8 shows a heat-insulating container for instant noodles as an embodiment of the heat-insulating container according to the present invention. In the Figure, numerical reference 130 indicates the heat-insulating container.

As shown in FIG. 8, the heat-insulating container 130 has an inner layer (third fiber layer) 133 and an outer layer (first fiber layer) 131 both made mainly of pulp by papermaking and having a closed-end cylindrical form. It also has a heat-insulating layer 132 formed of a heat-insulating material between the inner layer 133 and the outer layer 131. The inner and the outer layers are those made mainly of pulp into a three-dimensional configuration by a papermaking technique. Those formed of so-called paperboards are therefore excepted.

In the heat-insulating container 130, a pulp/blowing agent mixed layer (not shown) is formed on the interface between the inner layer 133 and the heat-insulating layer 132, with which the two layers are firmly united, and the outer layer 131 and the heat-insulating layer 132 are united by fusion of the blowing agent at the interface therebetween. Owing to the firm adhesion between the inner layer 133 and the heat-insulating layer 132 via the mixed layer, high heat insulating properties and shape retention are secured even when hot water, etc. is poured in. Since the skin layer of the inner layer 133 is made into the mixed layer having a reduced density, the container still enjoys a reduced weight as a whole even with the outer layer 131's having an increased density to enhance strength and improve printability.

In the heat-insulating container of the invention, the outer layer 131 preferably has a basis weight of 250 to 500 $g/m^2$, particularly 300 to 400 $g/m^2$. An outer layer basis weight less than 250 $g/m^2$ results in insufficient compressive strength and drop strength in the vertical and lateral directions of the container. An outer layer basis weight exceeding 500 $g/m^2$ assures sufficient strength but results in an increased weight of the container and an increased time for papermaking and drying, which reduces productivity. The basis weight of the outer layer is measured by the method described in Example 3.1 given later.

The outer layer 131 preferably has a density of 0.6 to 1.2 g/cm$^3$, particularly 0.8 to 1.0 g/cm$^3$, for obtaining sufficient strength of the outer layer which contributes to lightweight and also for obtaining surface smoothness. The density of the outer layer is measured by the method of Example 3.1 described later.

From the standpoint of shape retention and compressive strength in view of the time required for papermaking and drying, the outer layer 131 preferably has a thickness of 0.2 to 0.85 mm, more preferably 0.3 to 0.6 mm. The thickness of the outer layer is measured by the method of Example 3.1 hereinafter given.

The inner layer 133 of the heat-insulating container of the present invention preferably has a basis weight of 100 to 400 g/m$^2$, particularly 150 to 350 g/m$^2$. Where the inner layer basis weight is less than 100 g/m$^2$, the heat-insulating material tends to be exposed on the inner surface, and when the surface of the inner layer is laminated with a resin film (hereinafter described) by, for example, skin packing, the inner layer tends to develop cracks due to the vacuum. A basis weight more than 400 g/m$^2$ assures sufficient strength but results in an increased weight of the container and reduced productivity as with the case of the outer layer. The basis weight of the inner layer is measured by the method of Example 3.1 described later.

The density of the inner layer 133 is preferably 0.4 to 0.8 g/cm$^3$, more preferably 0.5 to 0.8 g/cm$^3$, in view of the surface smoothness, surface strength, shape retention, and anti-dusting properties and cushioning properties in stacking empty containers, and for securing strength withstanding skin packing. The density of the inner layer is measured by the method of Example 3.1 hereinafter given.

The thickness of the inner layer 133 is preferably 0.10 to 1.0 mm, more preferably 0.18 to 0.7 mm, for securing stability in papermaking, reducing the papermaking and drying time, and assuring strength. The thickness is measured by the method of Example 3.1 described later.

The inner layer 133 preferably has a lower density than the outer layer 131. It is also preferred for the inner layer to have a smaller basis weight than the outer layer. If the outer layer has a lower density or a smaller basis weight than the inner layer, the container has reduced strength against an external force and tends to buckle, and the outer layer is liable to deformation when grasped so that the heat-insulating layer becomes thin to reduce its heat insulating properties.

The inner layer 133 and the outer layer 131 are made mainly of pulp by papermaking. They may be made solely of pulp fiber or may contain other components, such as inorganic substances, e.g., talc and kaolinite, inorganic fibers, e.g., glass fiber and carbon fiber, particulate or fibrous thermoplastic synthetic resins, e.g., polyolefins, nonwood or plant fibers, polysaccharides, and so forth. The proportion of the other components is preferably 1 to 70% by weight, more preferably 5 to 50% by weight, based on the total amount of the pulp fiber and the other components. The inner layer 133 and the outer layer 131 may additionally contain additives added in the step of papermaking, such as fiber dispersants, molding assistants, coloring pigments, coloring assistants, and the like.

The thickness of the heat-insulating layer 132 is preferably 0.4 to 3 mm, more preferably 0.5 to 2.0 mm, to obtain a thin-wall and highly heat-insulating container. The term "thickness of the heat-insulating layer" as referred to herein means the thickness inclusive of the mixed layer, which is measured by the method of Example 3.1 hereinafter given.

The density of the heat-insulating layer 132 is preferably 0.01 to 0.15 g/cm$^3$, more preferably 0.02 to 0.1 g/cm$^3$, for obtaining a thin-wall and highly heat-insulating container. The term "density of the heat-insulating layer" as referred to herein means the density inclusive of the mixed layer, which is measured by the method of Example 3.1 hereinafter given.

The heat-insulating material forming the heat-insulating layer 132 is not particularly limited. Expandable heat-insulating materials are preferably used for their capabilities of forming a low-density layer uniformly and efficiently and of locally deforming the inner pulp layer by their expanding pressure to impart a desired profile to the inner surface of the container.

To suppress scorching of the pulp fiber of the inner or the outer layer due to heat expansion, the expandable heat-insulating material preferably has a blowing temperature of 100 to 190° C., particularly 110 to 160° C. Such expandable heat-insulating materials preferably include micro-encapsulated blowing agents, expandable resins, and inorganic blowing agents, such as sodium hydrogencarbonate. Preferred of them are micro-encapsulated blowing agents particularly for their high expansion ratio and handling properties. Micro-encapsulated blowing agents which are preferably used include those having butane, pentane, etc. encapsulated in vinylidene chloride, acrylonitrile, etc.

The heat-insulating layer 132 may consist solely of the blowing agent or may contain other components, such as inorganic substances, e.g., talc and kaolinite, inorganic fibers, e.g., glass fiber and carbon fiber, particulate or fibrous thermoplastic synthetic resins, e.g., polyolefins, nonwood or plant fibers, polysaccharides, and the like. The amounts of the other components are decided appropriately so as not to increase the density of the heat-insulating layer to reduce the heat insulating properties or not to increase the weight of the container.

The heat-insulating container 130 has the heat-insulating layer 132 formed between the inner and the outer layers to exhibit prescribed heat insulating performance. Heat insulating performance of a heat-insulating container is higher with a greater temperature difference between the contents and the surface of the container. The heat insulating performance of the heat-insulating container according to the present invention is preferably such that the temperature difference is 20 to 40° C. and that the surface temperature is 50 to 65° C., more preferably such that the temperature difference is 25 to 35° C. and that the surface temperature is 55 to 60° C., both measured by the method of Example 2 descried later.

The heat-insulating layer 132 is preferably formed all over the body and the bottom of the container. In order to assure satisfactory air permeability in forming the resin layer by skin packing as we call, the heat-insulating layer may be formed in parts of the body and the bottom.

As shown in FIG. 8, a resin layer 135 is provided on the heat-insulating container 130 for imparting water resistance (leakproofness), gas barrier properties, and the like to the container.

The thickness of the resin layer 135 is preferably 0.02 to 0.10 mm, more preferably 0.03 to 0.08 mm, from the standpoint of moistureproofness, strength, formability, and cost. The thickness of the resin layer is measured by the method of Example 3.1 described later.

The resin layer 135 is not particularly limited in material as far as is capable of imparting an intended function. Useful resins include thermoplastic resins, such as polyolefin resins, e.g., polyethylene and polypropylene; polyester resins, e.g., polyethylene terephthalate; polyamide resins, e.g., nylon; polyvinyl resins, e.g., polyvinyl chloride; and styrene resins, e.g., polystyrene. Preferred of them are polyolefin resins for the cost of film production, formability, and the like. The resin layer has either a single layer structure or a multilayer structure.

The heat-insulating container 130 has portions with different wall thicknesses and wall densities in its body according to the expansion ratio of the blowing agent of the heat-insulating layer 132. That is, the body has its wall thickness and density varied in the vertical direction.

The heat-insulating container 130 has shoulders (steps) 130a and 130b, at which the body is sectioned in portions different in wall thickness and density. The wall thickness increases downward, while the wall density decreases downward in the body. The shoulder 130a serves as a mark indicative of the level to which hot water is to be poured (pour mark). The shoulder 130b serves as a stopper in stacking empty heat-insulating containers (stacking shoulder). The portion near the opening has a higher density of the blowing agent to enhance the strength, while the portion of the body from the middle to the bottom, which a user grasps, has a lower density of the blowing agent to manifest high heat insulating properties. The shoulders 130a and 130b made by the differences in wall thickness of the body are formed of the inner layer 133. Since the shoulders 130a and 130b due to the change in wall thickness of the body are formed of the inner layer 133, the outer layer 131, which is the outer surface of the container 130, is permitted to have flatness assuring satisfactory printability.

From the standpoint that the heat-insulating container 130 is to have a thin wall, the wall thickness of the portion where heat insulating properties are particularly demanded, for example, the thickness T21 in FIG. 8, is preferably 0.8 to 5 mm, more preferably 1.3 to 5 mm, particularly preferably 1.6 to 4 mm.

At least the part of the inner layer 133 of the heat-insulating container 130 which forms the inner side of the heat-insulating container 130 preferably has the following surface smoothness to secure adhesion to a resin film forming the resin layer 135 and to prevent pinholes of the resin film. The surface smoothness is preferably such that the centerline average roughness Ra and the maximum height $R_{max}$, both measured by the method described below (corresponding to JIS B0601), are 1 to 20 μm and 100 μm or less, respectively, particularly 2 to 10 μm and 80 μm or less, respectively.

At least the part of the outer layer 131 of the heat-insulating container 130 which forms the outer side of the heat-insulating container 130 preferably has a centerline average roughness Ra of 1 to 8 μm and a maximum height $R_{max}$ of 60 μm or less, particularly an Ra of 2 to 6 μm and an $R_{max}$ of 50 μm or less, both measured by the method described below, to secure satisfactory printability.

It is preferred, on the other hand, that the side of the outer layer 131 to be brought into contact with the heat-insulating layer 132 have a relatively rough surface, which can be achieved by using a coarse screen in papermaking, so as to provide a large contact area with the heat-insulating layer 132 and to bring about increased joint strength of the two layers.

Method of Measuring Surface Smoothness:

Surface roughness is measured with Surfcom 120A supplied by Tokyo Seimitsu Co., Ltd. under conditions of cut-off: 2.5 mm; assessment length: 10.00 mm; filter: 2CR; measuring magnification: 500; tilt correction: straight line; and polarity: standard.

The heat-insulating container 130 has a flange 134 on the periphery of its opening 1300. The flange 134 consists of the inner layer 133 and the outer layer 131 joined together with no heat-insulating layer 132 interposed therebetween. Formed of the inner layer 133 and the outer layer 131 directly bonded together with no heat-insulating layer 132 therebetween, the flange 134 can be made thinner and stronger and, in addition, more fabricable in a subsequent fabrication step. The flange 134 having no blowing agent, there is no fear of a user's erroneously swallowing the blowing agent.

The heat-insulating container 130 is covered with the resin layer 135 as far as the lower side of the flange 134. Therefore, water is prevented from entering through the joint edge face of the flange 134, where the ends of the inner and the outer layer 133 and 131 meet, and the container is protected from damage initiating from the joint edge. Further, when a user put his or her lips to the container 130, the flange 134 feels smooth.

The method of producing the heat-insulating container 130 will then be described with reference to the accompanying drawings.

In the method of producing the heat-insulating container 130, the inner layer 133 and the outer layer 131 are separately formed by papermaking. Each layer is formed by papermaking using a set of a male mold and a female mold. The male mold which can be used includes one having a papermaking part and a resin-made screen having prescribed mesh size and wire width which covers the papermaking part, the papermaking part having a downward directed projection with a desired contour and having in its inside gas/liquid flow passageways which connect to the outer side of the projection. The papermaking part of the male mold which is used in papermaking is made of an elastic material, such as heat-resistant and anti-corrosion rubber. By using such a mold having a papermaking part made of an elastic material, a molded article with a complicated surface profile or a deep-drawn part can be produced. The female mold is a metallic mold having a depression whose inner surface profile corresponds to the contour of the papermaking part of the male mold and equipped with a heating means so as to serve for not only dewatering but drying.

As shown in FIGS. 9(a) and (c), a male mold 1320 and a male mold 1330 are immersed in respective tanks P31 and P11 filled with the respective slurries for the respective layers, and the slurries are sucked up through the gas/liquid flow passageways (not shown) to deposit pulp fiber on the respective screens (not shown) to form a wet inner layer 133 and a wet outer layer 131 on the screens of the respective male molds.

The slurry used to form each layer preferably consists of pulp fiber and water. It may contain, in addition to the pulp fiber and water, inorganic substances, such as talc and kaolinite, inorganic fibers, such as glass fiber and carbon fiber, particulate or fibrous thermoplastic synthetic resins, such as polyolefins, nonwood or plant fibers, polysaccharides, and so forth. The proportion of the additional components is preferably 1 to 70% by weight, more preferably 5 to 50% by weight, based on the total amount of the pulp fiber and the additional components.

The slurries may further contain appropriate additives, such as pulp fiber dispersants, molding assistants, colorants, and coloring assistants. The slurries can further contain sizing agents, pigments, fixing agents, and the like appropriately. In particular, addition of a sizing agent is advantageous in that, when a wet inner layer and an outer layer having been dried to a prescribed water content are joined into one body, the outer layer is prevented from absorbing the water content of the inner layer and thereby prevented from suffering from poor appearance due to stains on its outer surface.

The surface of the inner layer 133 deposited by immersing the male mold 1320 in the pulp slurry followed by sucking has the pulp fibers in such a coarse condition that a blowing agent, which is applied later to the outer surface of the inner layer, is easily entangled with the pulp fibers. The inner layer 133 to which a blowing agent is applied preferably has a water content of 60 to 90%, particularly 70 to 85%, so that the blowing agent may be entangled with the pulp fibers to easily form a mixed layer.

In order to efficiently expand a blowing agent to form a heat-insulating layer 132, the outer layer 131 is dried to increase its density before the inner layer is stacked thereon. In detail, after a prescribed time of papermaking, the male mold 1330 is pulled out of the slurry and fitted into a metallic female mold 1331 mating with the male mold 1330 as shown in FIG. 9(b). The female mold 1331 preferably has no vent holes on the inner side so as not to leave marks on the outer surface of the outer layer 131. Where drying time reduction is desired, the female mold may have vent holes. The wet outer layer 131 is press-dewatered by the papermaking part of the male mold 1330. The female mold 1331 is heated by its heating means (not shown) to dry the outer layer 131 to increase its density. While the outer layer 131 is dewatered and dried, the water content (water and steam) of the outer layer 131 is sucked and discharged outside through the gas/liquid flow passageways of the male mold 1330.

The pressing force in dewatering and drying the outer layer 131 is preferably 0.2 to 3 MPa, more preferably 0.3 to 1.5 MPa, for enhancing the dewatering efficiency to increase the density of the layer.

The mold temperature (the temperature of the female mold 1331) in drying the outer layer 131 is preferably 150 to 230° C., more preferably 170 to 220° C., for achieving drying efficiency while preventing scorching due to drying.

After dewatered and dried, the outer layer 131 is transferred from the male mold 1330 to the female mold 1331. After completion of the transfer, the male mold 1330 is withdrawn.

While the outer layer 131 is treated to have an increased density, the outer surface of the inner layer 133 is coated with a blowing agent by, for example, dipping the male mold 1320 having deposited thereon the inner layer 133 in a tank P21 filled with a liquid containing the blowing agent (a solution or dispersion of the blowing agent) as shown in FIG. 9(d) to infiltrate the liquid into the outer surface of the inner layer 133.

The amount of the blowing agent is preferably 1 to 20% by weight, more preferably 3 to 10% by weight, based on the total weight of the heat-insulating container to provide the heat-insulating layer with the above-recited density and thickness and also for considerations of production cost.

Then the inner layer 133 and the outer layer 131 are stacked with the heat-insulating layer 132 therebetween. That is, the inner layer 133 impregnated with the blowing agent is placed above the outer layer 131, which has been dewatered and dried in the female mold 1331, and fitted into the outer layer 131 as shown in FIG. 9(e). In fitting, the inner layer 133 remains on the male mold 1320. That is, the male mold 1320 with the inner layer 133 on is mated with the female mold 1331 and presses the wet inner layer 133 with its papermaking part to bring the inner layer 133 and the outer layer 131 into intimate contact while carrying out dewatering. Thereafter, compressed air is ejected through the gas/liquid flow passageways of the male mold 1321 to transfer the inner layer 133 from the male mold 1320 to the female mold 1331. After the transfer, the male mold 1320 is withdrawn.

As shown in FIG. 9(f), a metallic male mold 1321 is mated with the female mold 1331 and pressed toward the female mold 1331. The male mold 1321 has a predetermined clearance C13 which varies in agreement with the variations of the wall thickness of the heat-insulating container 130 at the shoulders 130a and 130b. The male mold 1321 has gas/liquid flow passageways (not shown) similarly to the male mold 1320 and is equipped with a heating means (not shown). The male mold 1321 and the female mold 1331 are heated by their respective heating means to expand the blowing agent infiltrated into the inner layer 133. As a result, the heat-insulating layer 132 reduces its density, and a pulp/blowing agent (heat-insulating material) mixed layer is formed between the inner layer 133 and the heat-insulating layer 132 to firmly unite the two layers, while the heat-insulating layer 132 and the outer layer 131 are fixed together to form the body and the bottom into a unitary body.

The flange 134 is also made unitary by the pressing force during drying. An adhesive is preferably used to make the flange 134 unitary with increased adhesion. Use of starch or like adhesives is recommended for application to food containers.

During the drying, the water content of the inner layer 133 is expelled as steam through the gas/liquid flow passageways of the male mold 1321. The mold temperature for drying should be at or above the blowing initiation temperature but not be so high as to cause scorching of the layers and be such as to maintain high drying efficiency. From these viewpoints, the mold temperature is preferably 140 to 230° C., more preferably 170 to 220° C.

On reaching a prescribed expansion ratio of the blowing agent and drying the inner layer 133 to a prescribed water content, the heat drying completes. The male and female molds 1321 and 1331 are opened to remove the resulting heat-insulating container (semi-finished product).

Thereafter, the resin layer 135 is formed to cover the inner surface of the inner layer 133 and the joint end of the flange 134. The resin layer 135 can be formed by usual methods, such as vacuum forming. Vacuum forming can be carried out, for example, in the same manner as in the third embodiment (see FIGS. 6(a) and (b)).

As described above, the heat-insulating container 130 according to this embodiment has a pulp/blowing agent mixed layer formed between the inner layer 133 and the heat-insulating layer 132, with which the inner layer 133 and the heat-insulating layer 132 are firmly united into one body. Therefore, sufficient mechanical strength is obtained without increasing the basis weights of the inner layer 133 and the outer layer 131. Thus, the heat-insulating container 130 is a superior container which is thin-walled and lightweight and possesses desired mechanical strength and heat insulating properties. In particular, the existence of the mixed layer on the inner layer 133 side allows the outer layer to have an accordingly increased density, which favors to improvement on strength, printability, surface properties, and the like.

Since the heat-insulating container 130 has a smooth surface with no joints on either the inner side or the outer side, it shows satisfactory printability and good adhesion to a resin film.

Further, the heat-insulating container 130 has its wall thickness and density varied in the body in the vertical direction in accordance with the expansion ratio of the blowing agent. The portion near the flange 134 which does not need to have so high heat insulating properties has a suppressed expansion ratio to secure strength, while the portion from the middle of the body to the bottom which needs high heat insulating properties is designed to have a high expansion ratio to exhibit high heat insulating performance. In other words, the container is excellent in that heat insulating properties and strength are exhibited where demanded.

The present invention is not limited to the heat-insulating container 130 of the above-mentioned embodiment, and various changes and modifications can be made therein without departing from the spirit and scope thereof.

While it is desirable for a cup-shaped heat-insulating container like the container 130 of the above-described embodiment to have portions different in wall thickness and wall density due to difference in blowing agent's expansion ratio in the body portion thereof (the portion to be grasped by the hand), the places where such portions with different wall thicknesses and wall densities are to be formed are of choice according to the shape of a container. Where a container is a plate, for instance, such portions can be formed in the body or the other part, e.g., the bottom. Further, forming a stacking shoulder in the body is recommended but may be omitted if unnecessary.

While it is preferred for the heat-insulating container of the present invention to have a mixed layer on the inner layer side, with which the inner layer and the heat-insulating layer are fixed together, as in the heat-insulating container 130 of the above-mentioned embodiment, it is possible to form the mixed layer on the outer layer side so that the outer layer and the inner layer may be fixed together via the mixed layer. It is also possible to form the mixed layer on both sides of the heat-insulating layer so that each of the inner and the outer layers may be fixed with the heat-insulating layer via the mixed layer.

The shape of the heat-insulating containers of the present invention is not limited to the above-illustrated flanged containers and includes other various shapes, such as bowls, bottles, plates, and trays. It is a matter of course that the heat-insulating containers of the present invention, which hardly cause condensation owing to their heat insulating properties, are useful as containers for cold foods and drinks.

While coating the outer surface of the inner layer with the blowing agent is preferably performed by dipping the inner layer in the blowing agent-containing liquid, it is possible to apply the liquid to the outer surface of the inner layer by spraying and the like.

Figure 10:
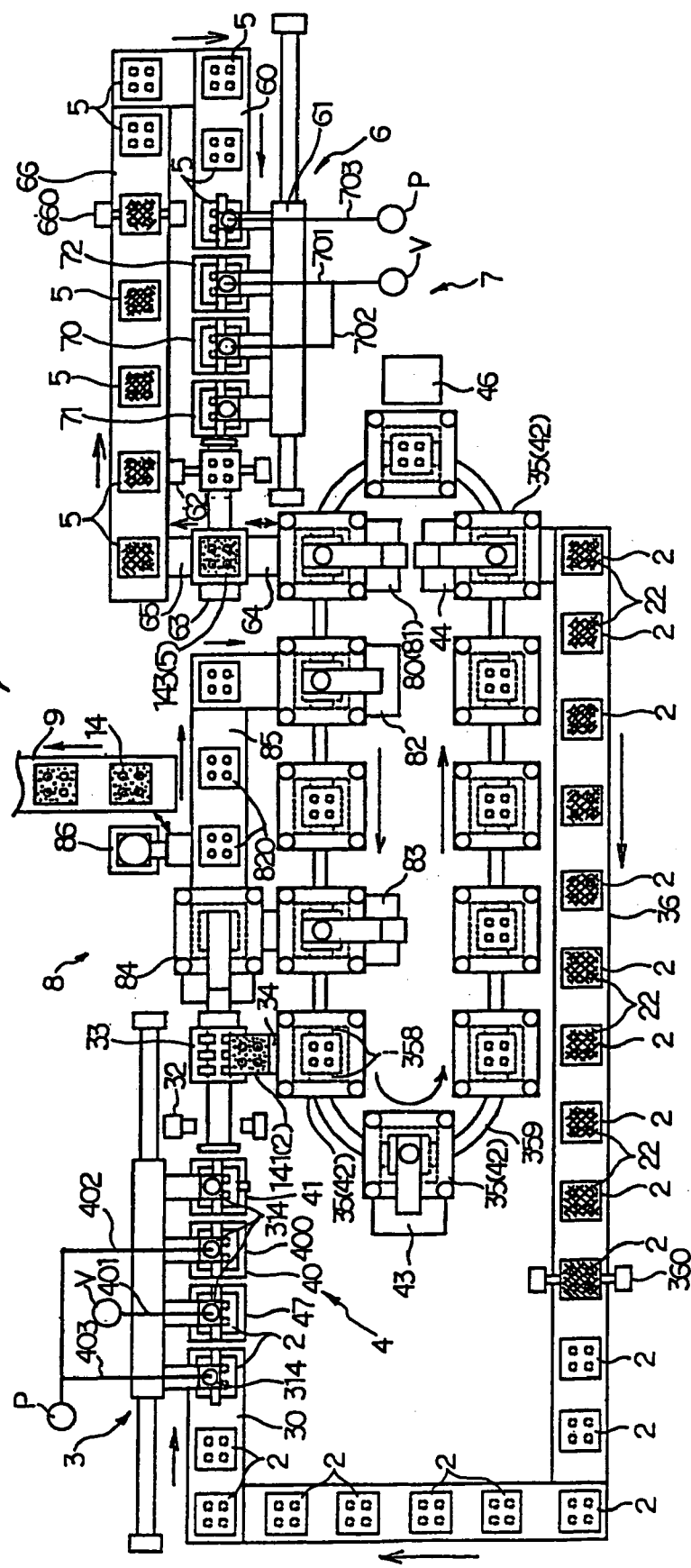
FIG. 10 schematically illustrates a first embodiment of the apparatus for producing a heat-insulating container according to the present invention.

FIG. 10 illustrates a first embodiment of the apparatus for producing a heat-insulating container according to the present invention. In FIG. 10, numerical reference 1 indicates the apparatus for producing a heat-insulating container (hereinafter simply referred to as an apparatus). P indicates a compressor, and V indicates a vacuum evacuator.

Figure 11:
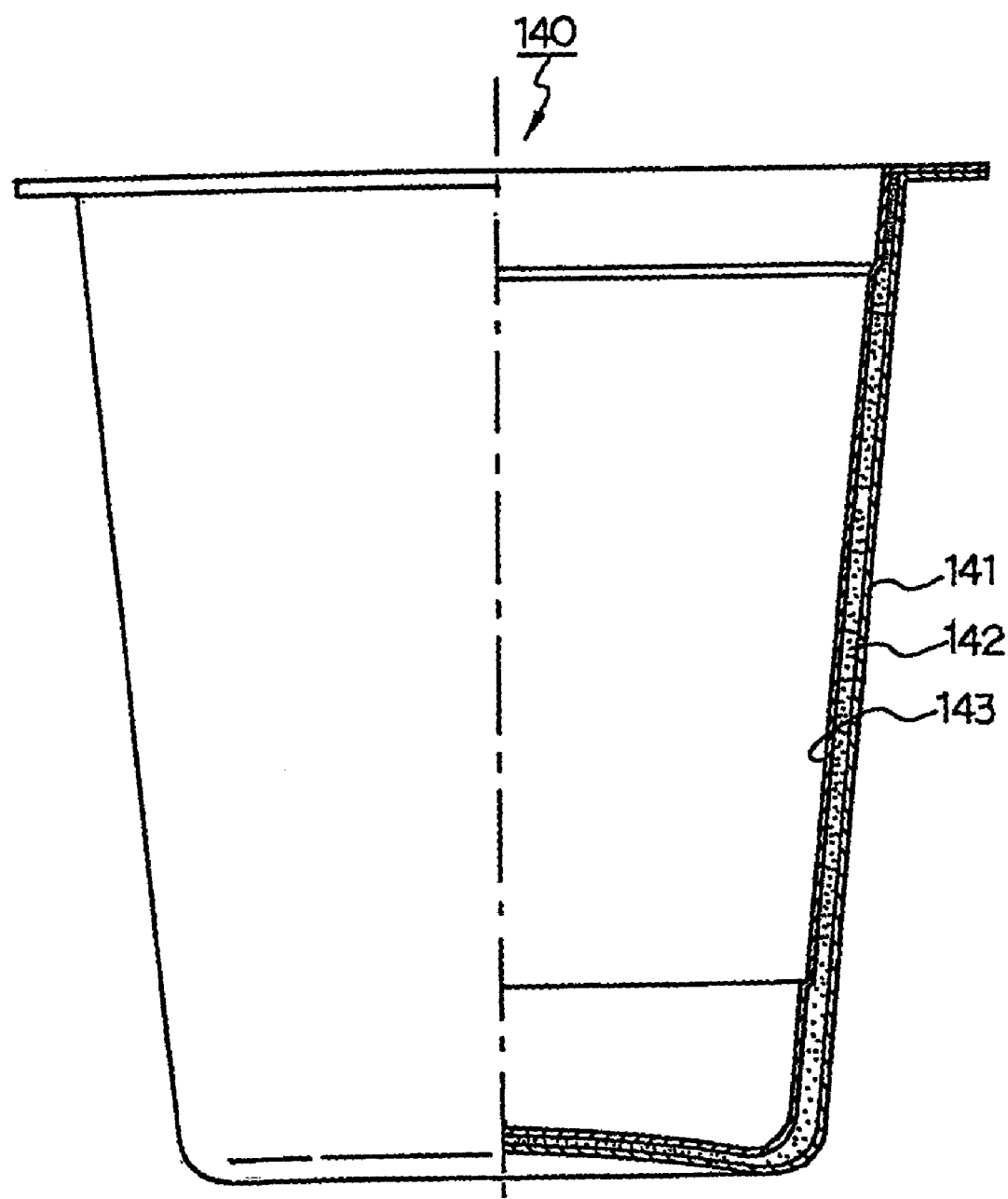
FIG. 11 is a schematic vertical half cross-section of an example of heat-insulating containers produced by the apparatus according to the embodiment.

The apparatus 1 is designed to produce a heat-insulating container 140 shown in FIG. 11, which has an outer layer 141 and an inner layer 143 that has been separately formed mainly of pulp and joined into a unitary body and also has a heat-insulating layer 142 which is formed by expansion of a blowing agent interposed between the outer layer 141 and the inner layer 143.

As shown in FIG. 10, the apparatus 1 has a plurality of outer layer-forming core units (hereinafter simply called core units) 2, a transfer mechanism 3 for transferring the core units 2 in rotation, an outer layer-forming station 4 where an outer layer 141 is formed by using each core unit 2 transferred by the transfer mechanism 3, a plurality of inner layer-forming core units (hereinafter simply called core units) 5, a transfer mechanism 6 for transferring the core units 5 in rotation, an inner layer-forming station 7 where an inner layer 143 having a blowing agent adhered to the outer surface thereof is formed by using each core unit 5 transferred by the transfer mechanism 6, and a unitary body-forming station 8 where the outer layer 141 and the inner layer 143 which have been formed in the outer layer-forming station 4 and the inner layer-forming station 7, respectively, are joined together, and then the blowing agent is expanded to form a heat-insulating layer 142.

Figure 12A:
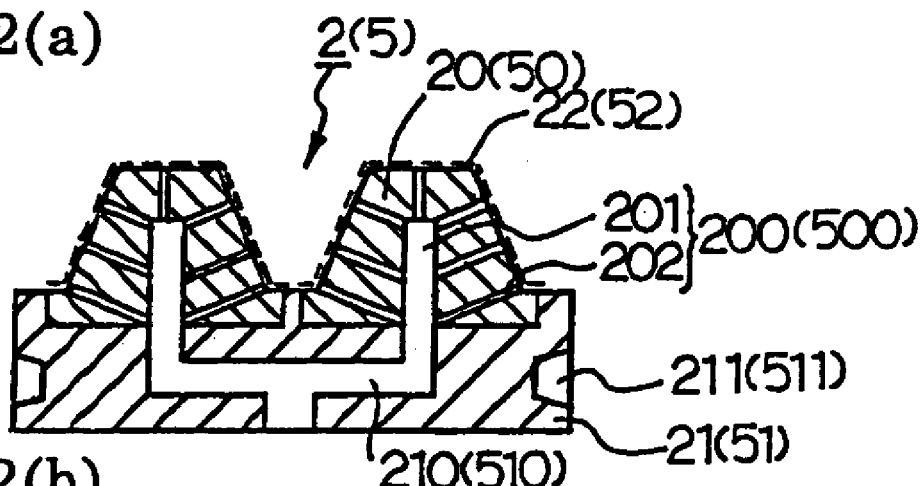
Figure 12B:
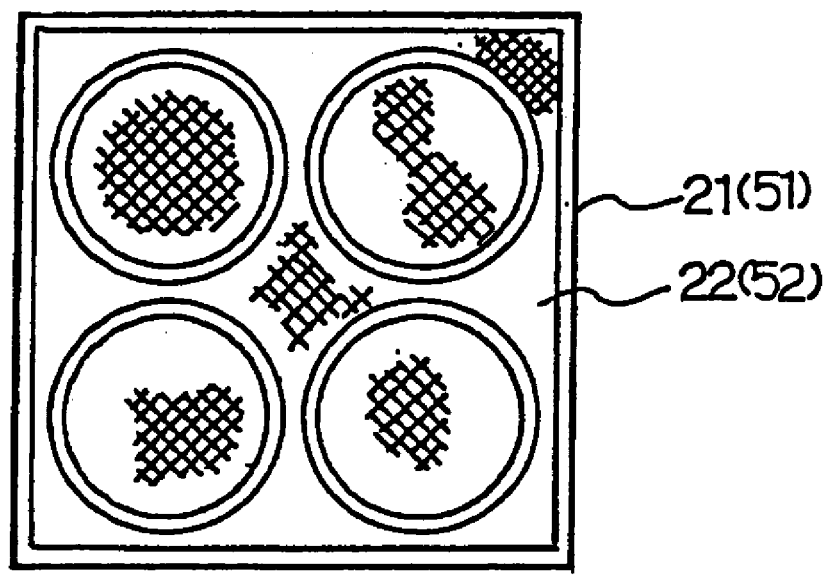
FIG. 12(b) is a plan view.

As shown in FIG. 12, each core unit 2 is a multi-core mold with which an outer layer for four heat-insulating containers can be formed through a single papermaking operation. Each core unit 2 has elastic convex cores 20 each having fluid flow passageways 200 in the inside thereof, a mount 21 on which the elastic cores 20 are fixed with their projections (convexities) facing either upward or downward and which has in the inside thereof interconnecting passageways 210 connecting to the flow passageways 200, and a papermaking screen 22 which covers the surface of every elastic core 20.

The elastic core 20 has a contour slightly smaller in size than the contour of a molded article to be produced. The height of the papermaking part above the flange is larger than the height (or depth) of the molded article to be produced. The elastic core 20 is made of a material that is elastically deformable by pressing. Such materials include rubber materials, for example, silicone rubber and urethane rubber.

The flow passageways 200 inside the elastic core 20 include a main flow passageway 201 and a plurality of branch flow passageways 202 which branch off the main flow passageways 201 and radiate toward the outside of the elastic core 20. One end of each branch flow passageway 202 is open on the outer surface of the papermaking part of the elastic core 20. The area ratio of the openings on the outer surface of the papermaking part is preferably 5 to 40%, more preferably 5 to 14%, for assuring efficiency in dewatering a molded structure mainly formed of pulp fiber hereinafter described and for securing strength of the elastic core in pressing the molded structure. For the same reasons, the number of the openings of the branch flow passageways 202 on the outer surface of the papermaking part is preferably 1 to 4, more preferably 1 or 2, per $cm^2$. The branch flow passageways 202 have a sufficient sectional area so that passage of a fluid is not hindered even if the elastic core 20 is elastically deformed by pressing.

The mount 21 is a plate-shaped member having a depression in which the elastic cores 20 are fitted and fixed with the projections up. The interconnecting passageways 210 connecting to the main flow passageways 201 of the elastic cores 20 are formed in approximately the middle of the bottom portion of the mount 21. On each of the four sides of the mount 21, there is formed a hole 211, in which a claw 315 of a gripper 314 (hereinafter described, see FIG. 13) or a pin 323 of an inversion unit 32 (hereinafter described, see FIG. 14) is to be engaged. The elastic cores 20 are fixed to the mount 21 by screwing.

The papermaking screen 22 is formed of an extensible material capable of deformation in conformity with the elastic deformation of the elastic cores 20 (for example, a net of synthetic resin fiber). The papermaking screen 22 has such a mesh size that allows the water content of a pulp slurry to pass through but blocks pulp fibers. Such a mesh size is preferably 10 to 80 mesh, more preferably 30 to 50 mesh, for executing papermaking while preventing clogging with pulp fibers. For assuring water sucking performance, air permeability, and strength, it is preferred for the papermaking screen 22 to have an average opening area ratio of 10 to 80%, particularly 20 to 40%, when closely put over the outer surface of the elastic cores 20. The papermaking screen 22 has its periphery fixed in between the elastic cores 20 and the mount 21.

In an assembled core unit 2, there is provided a flow path interconnecting the outside (the papermaking surface) and the inside of the core unit 2 through the papermaking screen 22, the flow passageways 200, and the interconnecting passageways 210.

Figure 13:
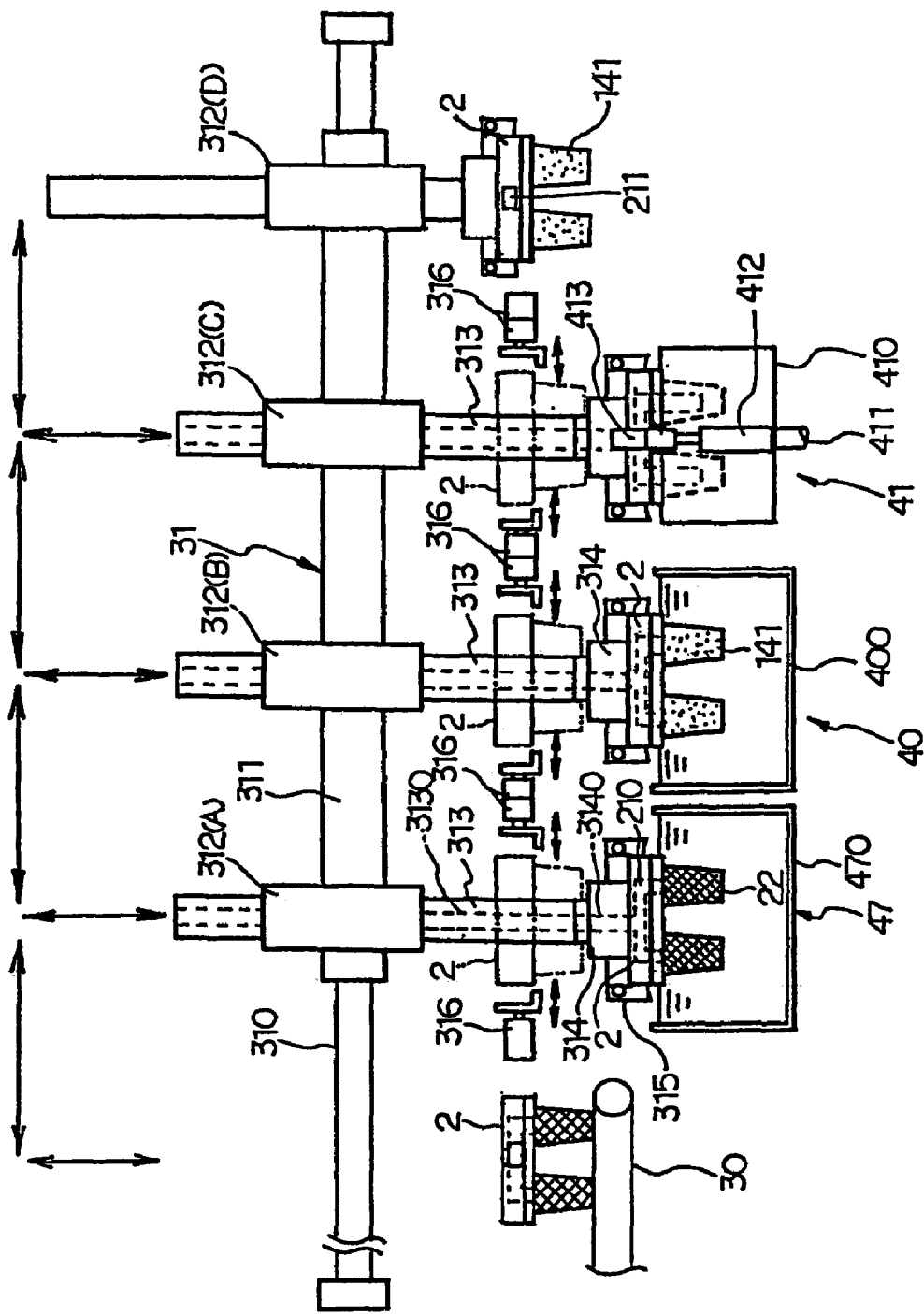
FIG. 13 schematically shows the step of forming an outer layer in the apparatus according to the embodiment.

As shown in FIG. 13, the transfer mechanism 3 has a conveyor 30 which carries core units 2 to the front of the outer layer-forming station 4, a horizontal traverse unit 31 which grips the core units 2 carried on the conveyor 30 and transfers them to the outer layer-forming station 4, an inversion unit 32 which receives the core unit 2 with a formed outer layer 141 on from the horizontal traverse unit 31 and inverts the core unit 2, a transfer unit 33 which changes the moving direction of the inverted core unit, a conveyor 34 which synchronously operates with the transfer unit 33 to carry the core unit 2 having changed its moving direction, a transport unit 35 which receives the core unit 2 from the conveyor 34 and transports it to the unitary body-forming station 8, and a conveyor 36 which returns the core unit 2 from which the outer layer 141 has been removed in the transport unit 35 to the conveyor 30.

Any general-purpose conveyor, such as a belt conveyor or a roller conveyor, can be used as the conveyors 30, 34, and 36 with no particular restriction.

As shown in FIG. 13, the horizontal traverse unit 31 mainly comprises a horizontally supported shaft 310, a motor-driven traverse member 311 movable in the axial direction of the shaft 310 (horizontal direction), and four cylinder units 312 fixed to the traverse member 311 (designated cylinder units 312A through 312D from left to right in FIG. 13).

The left three cylinder units 312A, 312B, and 312C shown in FIG. 13 each have a flow pipe 3130 through the shaft 313 thereof. The flow pipes 3130 connect to flow lines 401 to 403 hereinafter described (see FIG. 10), respectively, at their upper ends and to the interconnecting passageways 210 of the core unit 2 via a gripper 314 described below at their lower ends. The gripper 314 which is to grip the core unit 2 by the periphery of the mount 21 is provided at the tip of the shaft 313 of each cylinder unit 312.

The gripper 314 has two rods which horizontally extend and retract by the cylinder unit. The two rods each have, at the tip thereof, an arm pivoting about a horizontal axis. Each arm has, at the end thereof, a claw 315 which engages with the hole 211 of the core unit 2. Each of the cylinder units 312 vertically moves the gripper 314, and the gripper 314 grips the core unit 2 with the projections facing down.

An interconnecting passageway 3140 is formed in the base of the gripper 314 of each cylinder unit 312A, 312B or 312C. The interconnecting passageway 3140 connects the flow pipe 3130 piercing through the shaft 313 and the interconnecting passageways 210 of the core unit 2. With the core unit 2 gripped by the gripper 314, the flow pipe 3130 piercing the shaft 313, the interconnecting passageway 3140 in the base of the gripper 314, and the interconnecting passageways 210 of the core unit 2 are liquid-tight connected to provide a flow path. Through this flow path connected to the flow pipe line 401, 402 or 403, compressed air for cleaning the core unit 2 can be fed, the liquid content of a papermaking slurry can be discharged in forming the outer layer by papermaking, and compressed air can be fed for dewatering the outer layer 141.

In the first embodiment of the apparatus, three pairs of cylinder units 316 are fixed to the respective frames (not shown) above a cleaning tank 470, a pulp slurry tank 400 and a dewatering mold 410 (hereinafter described) in parallel with the moving direction of the traverse member 311 at a vertical position in agreement with the vertical movement of the respective grippers 314. These cylinder units 316 operate synchronously with the respective cylinder units 312A to 312D to hold the core unit 2 while the core unit 2 stands by before being transferred between adjacent cylinder units 312. That is, the left-hand side pair of cylinder units 316 in FIG. 13 are to temporarily hold the core unit 2 that has been transferred from the conveyor 30 by the left-hand side cylinder unit 312A and cleaned in the cleaning tank 470 until it is gripped by the gripper 314 of the next cylinder unit 312B. The middle pair of cylinder units 316 are to temporarily hold the core unit 2 that has been immersed in a tank 400 by the second left cylinder unit 312B and has formed thereon the outer layer 141 until it is gripped by the gripper 314 of the third left cylinder unit 312C. The right-hand side pair of cylinder units 316 are to temporarily hold the core unit 2 that has been mated with a dewatering mold 410 and dewatered by the left third cylinder unit 312C until the core unit 2 is gripped by the gripper 314 of the right-hand side cylinder unit 312D. In this way, the cylinder units 312A to 312D and the cylinder units 316 operate synchronously in such a manner that the core unit 2 having been treated in the cleaning tank 470, the pulp slurry tank 400 or the dewatering mold 410 is temporarily held on standby above the respective tanks or mold. Thus, the core units 2 delivered in succession are smoothly transferred between adjacent cylinder units 312, and, where the core unit 2 immediately after cleaning or papermaking is dripping, the tank under the core unit is adapted to receive the drips.

Figure 14:
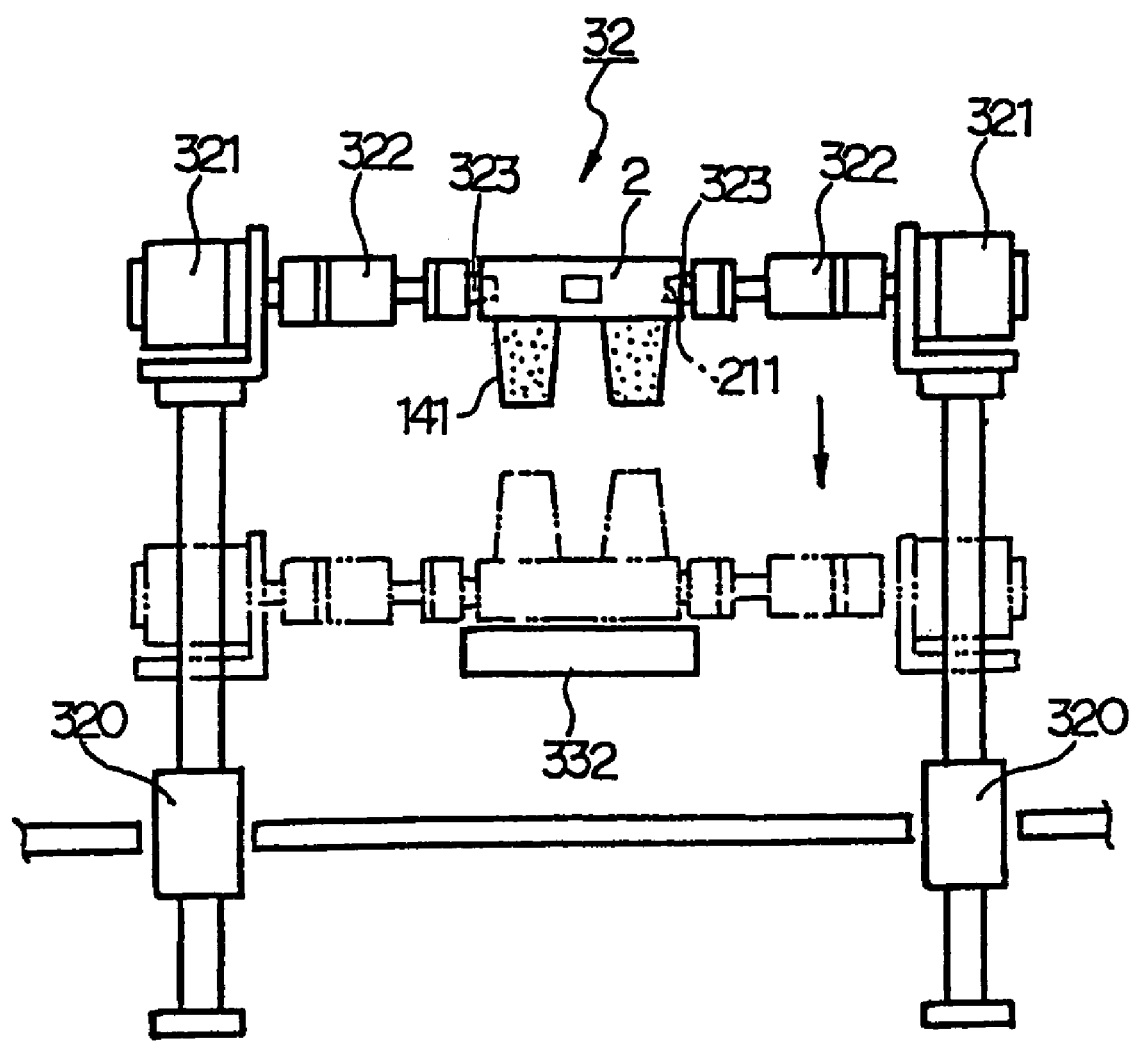
FIG. 14 schematically shows the step of inverting an outer layer-forming core unit in the apparatus according to the embodiment.

As shown in FIG. 14, the inversion unit 32 has a pair of vertically supported cylinder units 320 which are spaced at a given distance. A rotary actuator 321 is attached to the tip of the shaft of each cylinder unit 320 so that the two actuators 321 face to each other. A short-stroke cylinder 322 is attached to the tip of each rotary actuator 321, and a pin 323 is fixed to the tip of the shaft of the short-stroke cylinder 322. The pins 323 engage with the holes 211 of the core unit 2 while it is held by the gripper 314 of the right-hand side cylinder unit 312 (FIG. 13). After the core unit 2 is freed of the gripper 314, the rotary actuators 321 rotate to invert the core unit 2. The cylinder units 320 operate to bring the core unit 2 downward to the position indicated by the imaginary line of FIG. 14 to put the core unit 2 on a service table 332 hereinafter described. The engagement of the pins 323 is then released to complete transfer.

Figure 15A:
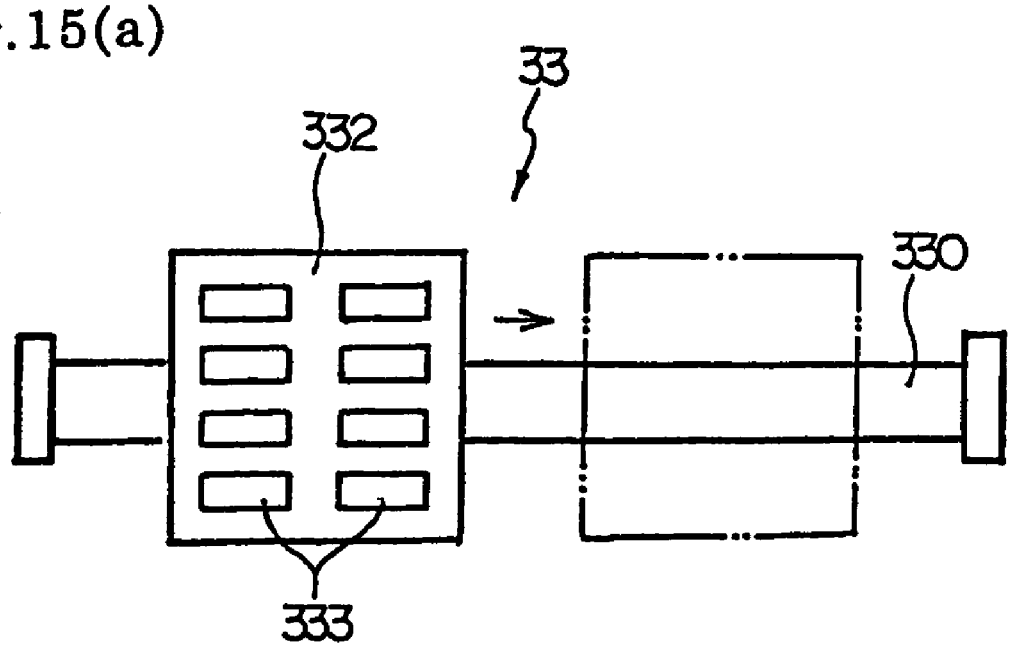
Figure 15B:
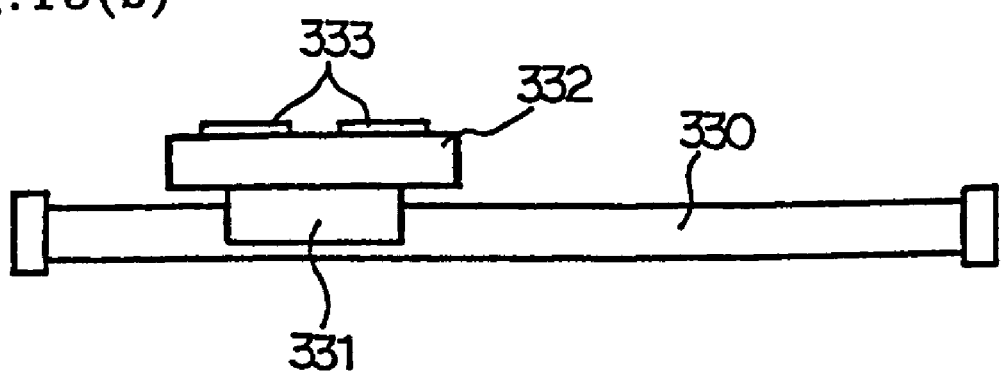
FIG. 15(b) is a side view.

As shown in FIG. 15, the transfer unit 33 is to change the moving direction of the core unit 2 inverted by the inversion unit 32 at a right angle. It mainly comprises a motor-driven traverse member 331 movable along the axis of a horizontally supported shaft 330 and a service table 332 fixed on the traverse member 334. The service table 332 has a plurality of driven rollers 333 on the upper side thereof and is adapted to be operated synchronously with the conveyor 34 to change the moving direction of the core unit 2 at a right angle and transfer it to the transport unit 35 hereinafter described.

Figure 16:
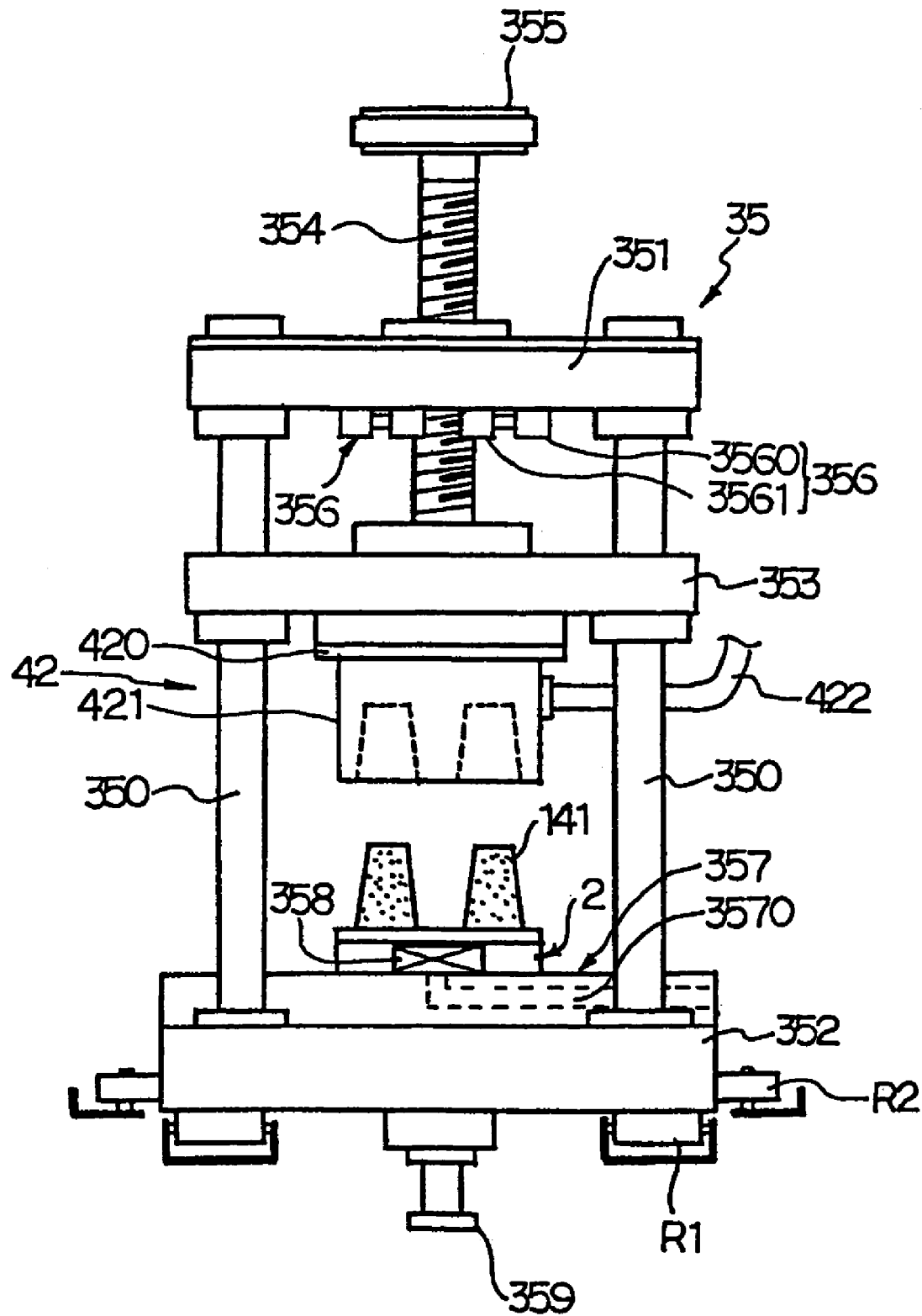
FIG. 16 schematically illustrates the outer layer-forming core unit being transported by a transport unit of the apparatus according to the embodiment.

As shown in FIG. 16, the transport unit 35 has a top plate 351, a base plate 352, four guide shafts 350 which are vertically disposed at a given space and supported at vertical ends thereof by the four corners of the top plate 351 and the base plate 352, and a working plate 353 which vertically moves along the guide shafts 350.

A threaded hole vertically pierces the center of the top plate 351, and a threaded push-rod 354 is screwed therein. The working plate 353 is fixed to the lower end of the push-rod 354, and a disk head 355 is fixed to the upper end of the push-rod 354. A lock ring 356 is attached to the lower side of the top plate 351. The lock ring 356 is composed of a plurality of divided pieces (split nut) 3561 which are adapted to move horizontally by a drive 3560 and combined together into a nut mating with the thread of the push-rod 354. The drive 3560 closes the split nut 3561 to engage it with the thread of the push-rod 354 to thereby lock the turn of the push-rod 354.

In the transport unit 35 thus constructed, the head 355 turns to vertically move the push-rod 354 in the axial direction to vertically move the working plate 353. The lock ring 356 locks the turn of the push-rod 354 to keep a prescribed pressing force. In this state a drying mold 421 (hereinafter described, see FIG. 17) is mated with the core unit 2.

A mount 357, on which the core unit 2 (or the core unit 5) or a unitary body-forming core unit 820 hereinafter described is to be placed, is disposed on the base plate 352. The mount 357 has registration cylinder units 358 which clamp the core unit from both sides to place the core unit in a right position. The mount 357 has in its inside a flow passageway 3570 which leads the interconnecting passageways 210 of the core unit 2 (or core unit 5) to the outside so that steam from the outer layer 141 (or a unitary body 14) may be discharged during drying.

A drying mold 421 (hereinafter described) is fixed to the center of the lower side of the working plate 353. The drying mold 421 is adapted to be mated with the core unit 2 placed on the mount 357 at a prescribed right position.

Each transport unit 35 is connected to an endless chain 359 for traction at the center of the lower side of the base plate 352. The endless chain 359 is put over two gears (not shown) disposed at a given distance. A drive motor (not shown) rotates one of the gears, whereby the endless chain 359 is driven to carry the transport units 35 on an elliptic track. Rollers R1 rotatable on a horizontal axis are provided on both sides of the endless chain 359 in contact with the lower surface of the base plate 352, and guide rollers R2 rotatable on a vertical axis are provided on both sides of the base plate 352 in contact with the side edge faces of the base plate 352. As guided by the rollers R1 and guide rollers R2, the transport units 35 are smoothly and stably carried on the elliptic track of the endless chain 359.

In a modification, rollers rotatable on a horizontal axis are provided on both lateral sides of the lower surface of the base plate 352, rollers rotatable on a vertical axis are provided on both side edge faces of the base plate 352, and track rails for these rollers are laid along the elliptic track of the endless chain 359, whereby the transport units 35 are smoothly and stably carried on the elliptic track of the endless chain 359.

An inversion unit 360 for inverting a core unit 2 is provided in the middle of the conveyor 36 as shown in FIG. 10, where a core unit 2 that has been returned with its elastic cores 20 directed upwardly is inverted to direct the elastic cores 20 downward. As the inversion unit 360 has the same structure as the inversion unit 32, the description therefor is omitted.

As shown in FIG. 10, the outer layer-forming station 4 has a papermaking means 40 in which a core unit 2 is immersed to form an outer layer 141 on each core by papermaking, an outer layer dewatering means 41 for dewatering the formed outer layer 141, an outer layer drying means 42 for drying the dewatered outer layer 141, a pressing unit 43 in which the outer layer 141 is held in between the core unit 2 and a drying mold 421 hereinafter described, and a release means 44 for releasing the dried outer layer 141 from the core unit 2.

As shown in FIG. 13, the papermaking means 40 has a pulp slurry tank 400 filled with a pulp slurry and a flow pipe line 401 (see FIG. 10) led to the interconnecting passageways 210 of the core unit 2. The other end of the flow pipe line 401 is connected to a vacuum evacuator V which sucks and discharges the liquid component of the pulp slurry.

As shown in FIG. 13, the dewatering means 41 has a hollow dewatering mold 410 having cavities corresponding to the core unit 2 and a suction pipe line 411 connected to the bottom of the dewatering mold 410.

The dewatering mold 410 has a drainage hole (not shown) at the bottom and interconnecting passageways (not shown) connecting the outside and the inside of the cavity block. A cylinder unit 412 is attached to the side of the dewatering mold 410. A locking claw 413 swinging about a horizontal axis is attached to the tip of the shaft of the cylinder unit 412.

One end of the suction pipe line 411 is connected to the drainage hole, with the other to a vacuum evacuator (not shown). The cylinder unit 312 lowers the core unit 2 to mate it with the dewatering mold 410. The elastic cores 20 press the outer layer 141 to deform the outer profile of the outer layer 141 in conformity with the inner profile of the cavities of the dewatering mold 410. Then the locking claw 413 operates to maintain the core unit 2 and the dewatering mold 410 under a prescribed pressed state for a given period of time, during which compressed air is fed to the outer layer 141 through the flow pipe line 402 connected to the compressor P and the flow pipe 3130, while water is discharged through the suction pipe line 411. The outer layer 141 is thus dewatered until a predetermined water content is reached.

As shown in FIG. 16, the drying means 42 has a heater plate 420 attached to the lower side of the working plate 353 of the transport unit 35 and a drying mold 421 attached to the lower side of the heater plate 420.

The drying mold 421 has cavities corresponding to the core unit 2. Flow passageways 4210 (see FIG. 19(*b*)) led to the outside are formed in the cavity block. The flow passageways 4210 are led to a flow pipe line 422 which is connected to a vacuum evacuator and a compressor (both not shown) via a switchover valve (not shown). The path of the flow pipe line 422 is switched over to an evacuation path by the switchover valve to discharge steam through the flow passageways of the drying mold 421.

According to the present embodiment, the outer layer drying mold 421 is shared as a common mold for forming a unitary body 14 hereinafter described and for drying the unitary body 14. On switching the switchover valve, the flow path including the flow pipe line 422 and the vacuum evacuator or the compressor is switched between an evacuation path and a pressurizing path so that the drying mold 421 may exert suction on the outer layer 141 or the unitary body 14 when releasing the outer layer 141 or the unitary body 14 from the core unit 2 or 5, or compressed air may be fed to the unitary body 14 when releasing the unitary body. The vacuum evacuator and the compressor are installed inside the elliptic track of the transport units 35, and each transport unit 35 revolves with its flow pipe line 422 connected thereto.

Figure 17:
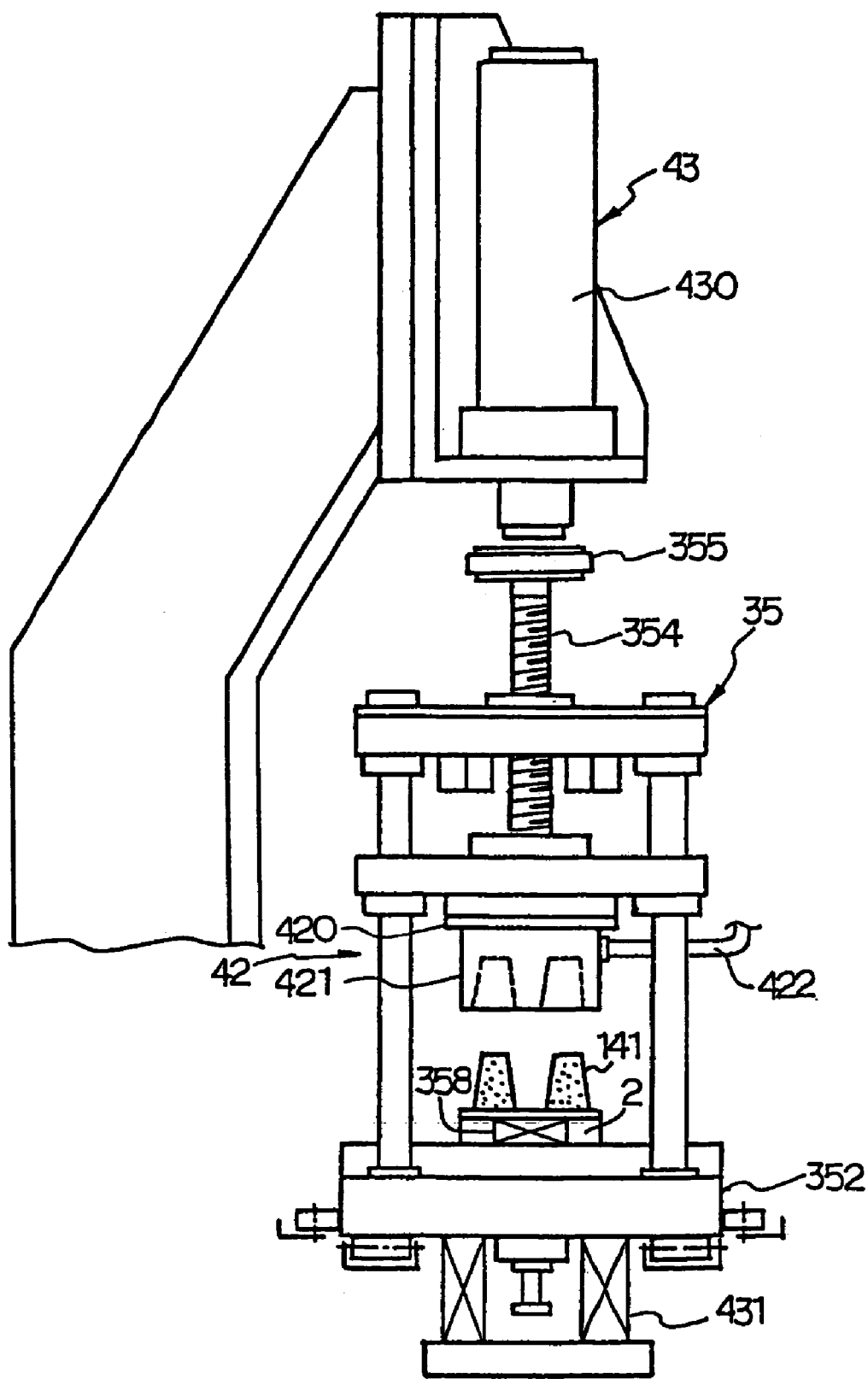
FIG. 17 schematically illustrates the step of press drying an outer layer in the apparatus according to the embodiment.

As shown in FIG. 17, the pressing unit 43 has a cylinder unit 430 which turns the head 355 of the transport unit 35 to bring down the drying mold 421 and a bearing mount 431 which is in contact with the base plate 352 and receives the load.

Figure 18:
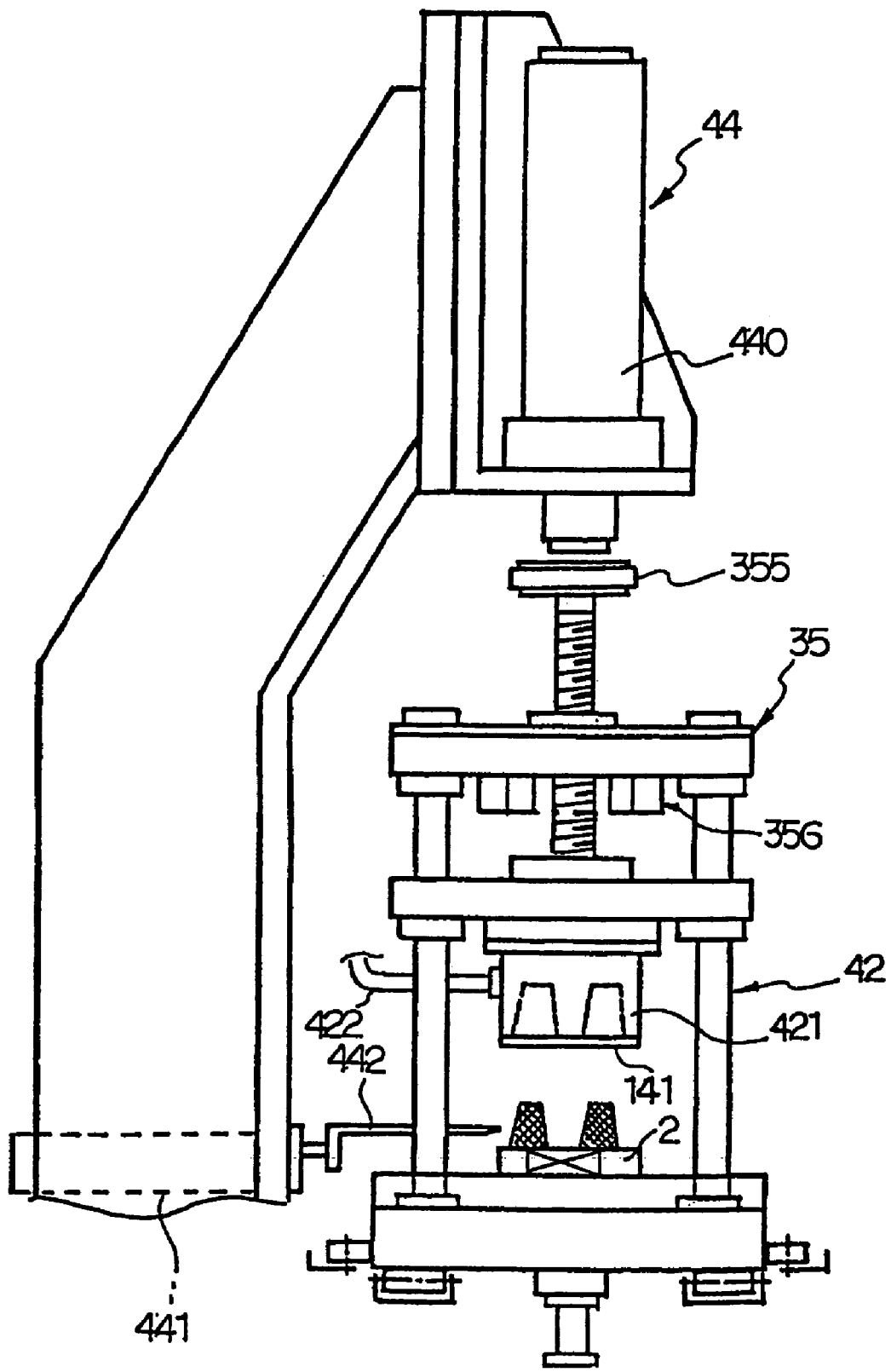
FIG. 18 schematically illustrates the step of removing the outer layer from the outer layer-forming core unit in the apparatus according to the embodiment.

As shown in FIG. 18, the outer layer release means 44 sucks the outer layer 141 that has been carried on the transport unit 35 in a state pressed by the pressing unit 43 (described above) toward the drying mold 421 to thereby release the outer layer 141 from the core unit 2. It has an evacuation path which includes the flow pipe line 422 and the vacuum evacuator connected thereto and exerts suction on the outer layer 141 to the drying mold 421; a cylinder unit 440 which turns the head 355 of the drying mold transport unit 35 to bring the drying mold 421 upward; and a cylinder unit 441 which pushes only the core unit 2 out of the transport unit 35. A scraper 442 which pushes the core unit 2 onto the conveyor 36 is fitted to the tip of the shaft of the cylinder unit 441. While the drying mold 421 is moving up, the outer layer 141 is sucked to the drying mold 421 through the flow pipe line 422. Thus, the outer layer 141 is separated from the elastic cores 20, which elastically restore their original shape with pressure relieved. When the drying mold 421 reaches a prescribed height, the cylinder unit 441 operates the scraper 442 to push only the core unit 2 onto the conveyor 36.

Figure 19A:
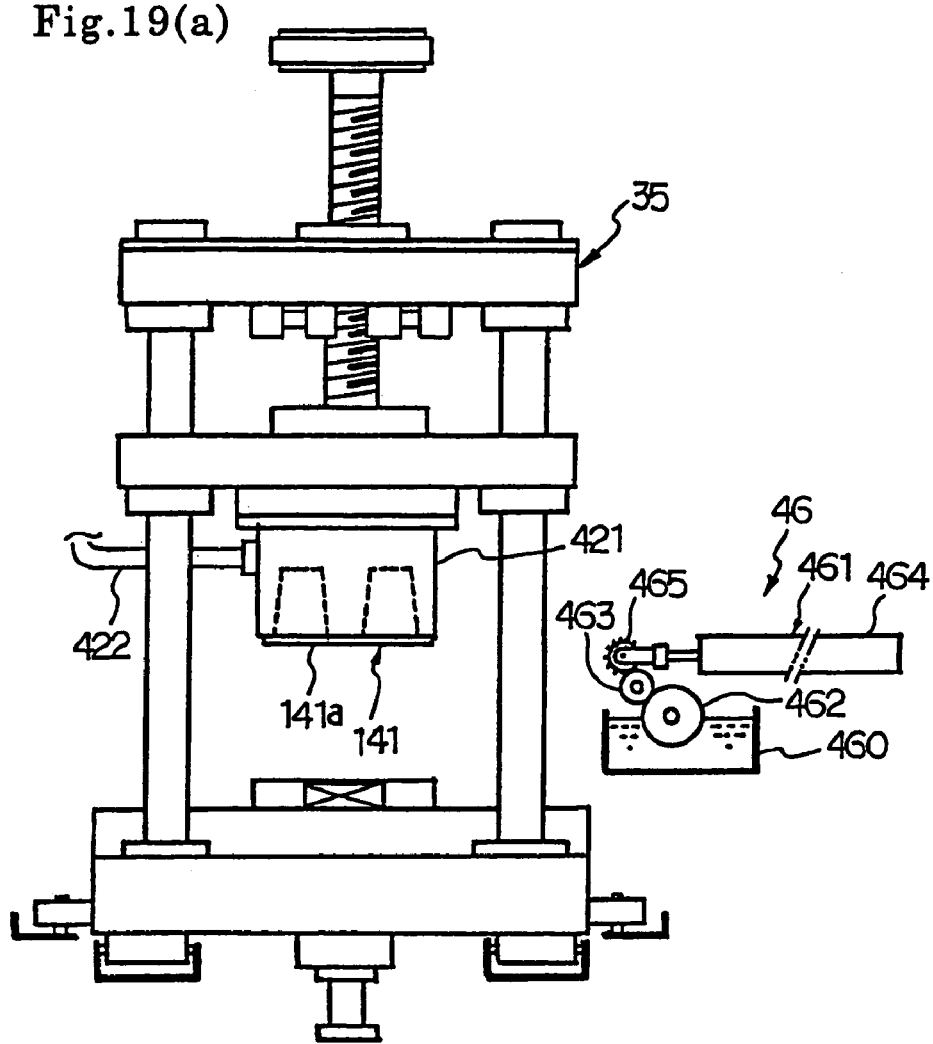
Figure 19B:
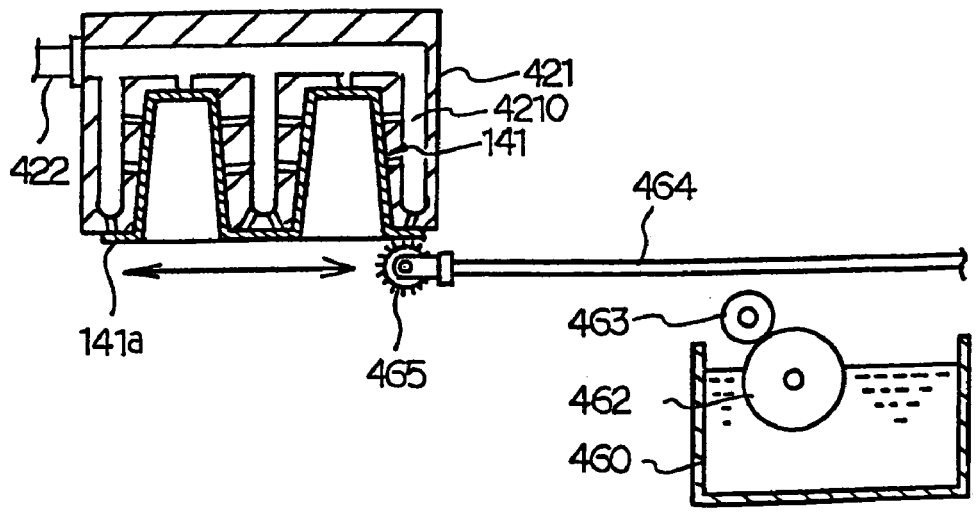
FIG. 19(b) is a partial enlarged view showing the adhesive being applied.

In the present embodiment, the outer layer-forming station 4 has an adhesive application means 46 for applying an adhesive to the flanges 110 of the outer layer 141 while sucked to the drying mold 421 as shown in FIG. 19.

The adhesive application means 46 comprises a pan 460 filled with an adhesive and an applicator 461 which applies the adhesive in the pan 460 to the flanges 110 of the outer layer 141. A first roller 462 which is dipped in the adhesive and picks up the adhesive and a second roller 463 which rotates synchronously with the first roller 462 while picking up the adhesive from the first roller 462, both of which are rotatable on the respective horizontal axes, are placed in the pan 460. The applicator 461 has a horizontally supported cylinder unit 464 and a transfer roller 465 which is attached to the tip of the shaft of the cylinder unit 464 and rotatable on a horizontal axis. The vertical position of the transfer roller 465 is such that the transfer roller 465 and the second roller 463 rotate in contact with each other as the shaft extends and retracts so that the transfer roller 465 picks up the adhesive while the two rollers are rotating. The shaft of the cylinder unit 464 extends to make the transfer roller 465 rotate in contact with the flanges 110 of the outer layer 141, whereby the adhesive is transferred onto the surface of the flanges 110.

In the present embodiment, the outer layer-forming station 4 has a core unit 2 cleaning means 47 in front of the papermaking means 40 as shown in FIG. 13.

As shown in FIG. 13, the cleaning means 47 has a cleaning tank 470 filled with a cleaning liquid. The core unit 2 is immersed in the cleaning tank 470 before it is immersed in the pulp slurry tank 400. Meanwhile compressed air is ejected into the cleaning liquid through the flow pile line 403 (see FIG. 10) led to the compressor P. The papermaking screen 22 of the core unit 2 is thus cleaned to be freed of clogging prior to the papermaking step.

The inner layer-forming core unit 5 shown in FIG. 10 is structurally the same as the core unit 2, except for the shape of the cores 20 of the core unit 2. Therefore, FIG. 12 is used to represent the core unit 5 with numerical references for the core unit 5 are given in the parentheses, and the description therefor is omitted.

As shown in FIG. 10, the transfer mechanism 6 comprises a conveyor 60 which carries core units 5 to the front of the inner layer-forming station 7; a horizontal traverse unit 61 which grips the core unit 5 carried on the conveyor 60 and transfers it to the inner layer-forming station 7; an inversion unit 62 which receives the core unit 5 with a formed inner layer 143 on from the horizontal traverse unit 61 and inverts the core unit 5; a transfer unit 63 which changes the moving direction of the inverted core unit 5; a conveyor 64 which carries the core unit 5 having changed the moving direction to the aforementioned transport unit 35; and a conveyor 65 which shifts the core unit 5 from the transfer unit 63 to a conveyor 66 hereinafter described.

Figure 20:
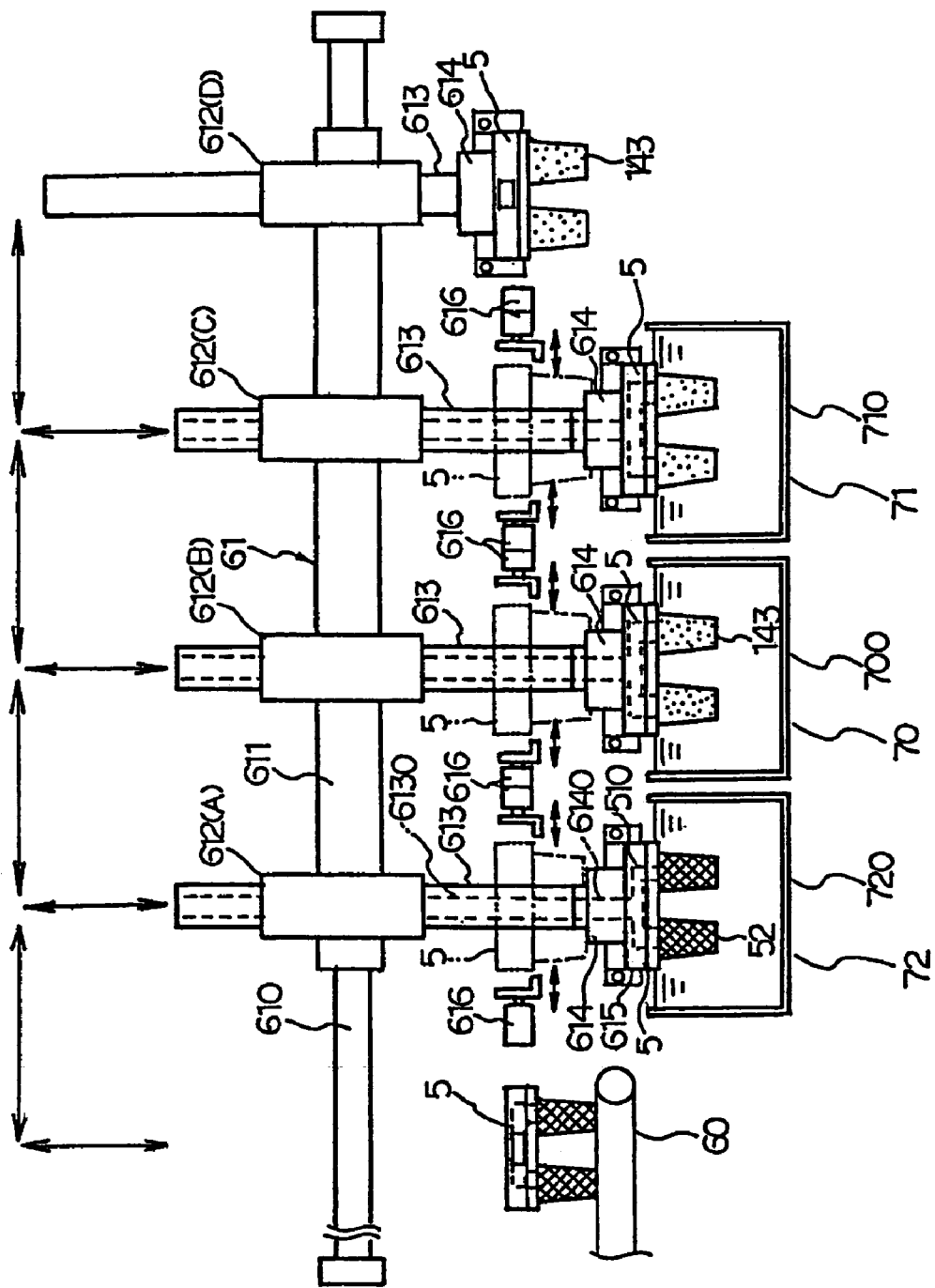
FIG. 20 schematically shows the step of forming an inner layer in the apparatus according to the embodiment.

As shown in FIG. 20, the horizontal traverse unit 61 is composed mainly of a horizontally supported shaft 610, a motor-driven traverse member 611 movable in the axial direction of the shaft 610 (horizontal direction), and four cylinder units 612 fixed to the traverse member 611 (designated cylinder units 612A through 612D from the left-hand side in FIG. 20).

The left three cylinder units 612A, 612B, and 612C shown in FIG. 20 each have a flow pipe 6130 through the shaft 613 thereof. The flow pipes 6130 connect to flow pipe lines 701, 702, and 703 (hereinafter described, see FIG. 10), respectively, at their upper ends and to the interconnecting passageways 510 (see FIG. 12) of the core unit 5 via a gripper 614 described below at their lower ends. The gripper 614 which is to grip the core unit 5 by the periphery of the mount 51 is provided at the tip of the shaft 613 of each cylinder unit 612.

The gripper 614 has two rods which horizontally extend and retract by the cylinder unit. The two rods each have, at the tip thereof, an arm pivoting about a horizontal axis. Each arm has, at the tip thereof, a claw 615 which engages with the hole 511 of the core unit 5. Each of the cylinder units 612 vertically moves the gripper 614, and the gripper 614 grips the core unit 5 with the projections facing down.

An interconnecting passageway 6140 is formed in the base of the gripper 614 of each cylinder unit 612A, 612B or 612C. The interconnecting passageway 6140 connects the flow pipe 6130 piercing through the shaft 613 and the interconnecting passageways 510 of the core unit 5. With the core unit 5 gripped by the gripper 614, the flow pipe 6130 piercing the shaft 613, the interconnecting passageway 6140 in the base of the gripper 614, and the interconnecting passageways 510 of the core unit 5 are gas/liquid-tight connected to provide a flow path. Through these flow passageways combined with the flow pipe lines 701 to 703, compressed air for cleaning the core unit 5 can be fed, the liquid component of a papermaking slurry can be discharged in forming the inner layer 143 by papermaking, and water content can be discharged in applying a blowing agent.

In this embodiment, three pairs of cylinder units 616 are fixed to the respective frames (not shown) above a cleaning tank 720, a pulp slurry tank 700 and an aqueous solution tank 710 (hereinafter described) in parallel with the moving direction of the traverse member 611 at a prescribed position in the longitudinal direction of the shafts 613 of the cylinder units 612. These cylinder units 616 synchronize with the respective cylinder units 612A to 612D to hold the core unit 5 while the core unit 5 stands by before being transferred between adjacent cylinder units 612. That is, the left-hand side pair of cylinder units 616 in FIG. 20 are to temporarily hold the core unit 5 that has been transferred from the conveyor 60 by the left-hand side cylinder unit 612A and cleaned in the cleaning tank 470 until it is gripped by the gripper 614 of the second left cylinder unit 612B. The middle pair of cylinder units 616 are to temporarily hold the core unit 5 that has been immersed in a tank 700 by the left second cylinder unit 612B and formed thereon the inner layer 143 until it is gripped by the gripper 614 of the left third cylinder unit 612C. The right-hand side pair of cylinder units 616 are to temporarily hold the core unit 5 that has been immersed in the tank 710 by the third left cylinder unit 612C until the core unit 5 is gripped by the gripper 614 of the right-hand side cylinder unit 612D. Thus, the cylinder units 612A to 612D and the cylinder units 616 are operated synchronously in such a manner that the core unit 5 having been treated in the cleaning tank 720, the pulp slurry tank 700 or the blowing agent aqueous solution tank 710 is temporarily held on standby above the respective tanks. In this way, the core units 5 delivered in succession are smoothly transferred between adjacent cylinder units 612, and, where the core unit 5 immediately after cleaning, papermaking or adhesion of the blowing agent is dripping, the tanks under the core units receive the drips.

Since the inversion unit 62 has the same structure as the inversion unit 32 previously described, the description therefor is omitted. The conveyors 60, 64, and 65 can be of previously described general-purpose conveyors. The conveyor 65 is adapted to be driven reversibly. Since the transfer unit 63 has the same structure as the transfer unit 33 previously described, except that the driven rollers of the service table are adapted to rotate in opposite directions, the description therefor is omitted.

As shown in FIG. 10, the transfer mechanism 6 for transferring the core units 5 has a conveyor 66 which returns the core unit 5 from which a unitary body 14 has been removed to the conveyor 60 in front of the inner layer-forming station 7. The conveyor 66 can be of the same general-purpose conveyor as described above. An inversion unit 660 for inverting a core unit 5 is provided in the middle of the conveyor 66, where a core unit 5 that has been returned with its elastic cores 50 up is inverted to direct the elastic cores 50 downward. As the inversion unit 660 has the same structure as the inversion unit 32 previously described, the description therefor is omitted.

As shown in FIG. 10, the inner layer-forming station 7 has a papermaking means 70 in which a core unit 5 is immersed to form an inner layer on each core by papermaking and a blowing agent application means 71 in which a blowing agent is adhered to the outer surface of the formed inner layer.

As shown in FIG. 20, the papermaking means 70 has a pulp slurry tank 700 and a flow pipe line 701 (see FIG. 10) led to the interconnecting passageways in the core unit 5. The other end of the flow pipe line 701 is connected to a vacuum evacuator V which sucks and discharges the liquid component.

As shown in FIG. 20, the blowing agent application means 71 has a tank 710 containing a blowing agent aqueous solution. The core unit 5 is immersed in the tank 710, and the aqueous solution is sucked up through the flow pipe line 702 (see FIG. 13) connected to the vacuum evacuator V to adhere the blowing agent to the outer surface inner layer 143.

As shown in FIG. 20, the inner layer-forming station 7 has a cleaning means 72 for cleaning a core unit 5 in front of the tank 700. The cleaning means 72 has a cleaning tank 720 filled with a cleaning liquid. The core unit 5 is immersed in the cleaning tank 720 before it is immersed in the pulp slurry tank 700. Meanwhile compressed air is ejected into the cleaning liquid through the flow pile line 703 (see FIG. 10) led to a compressor P. The papermaking screen 52 of the core unit 5 is thus cleaned to be freed of clogging prior to the papermaking step.

Figure 21:
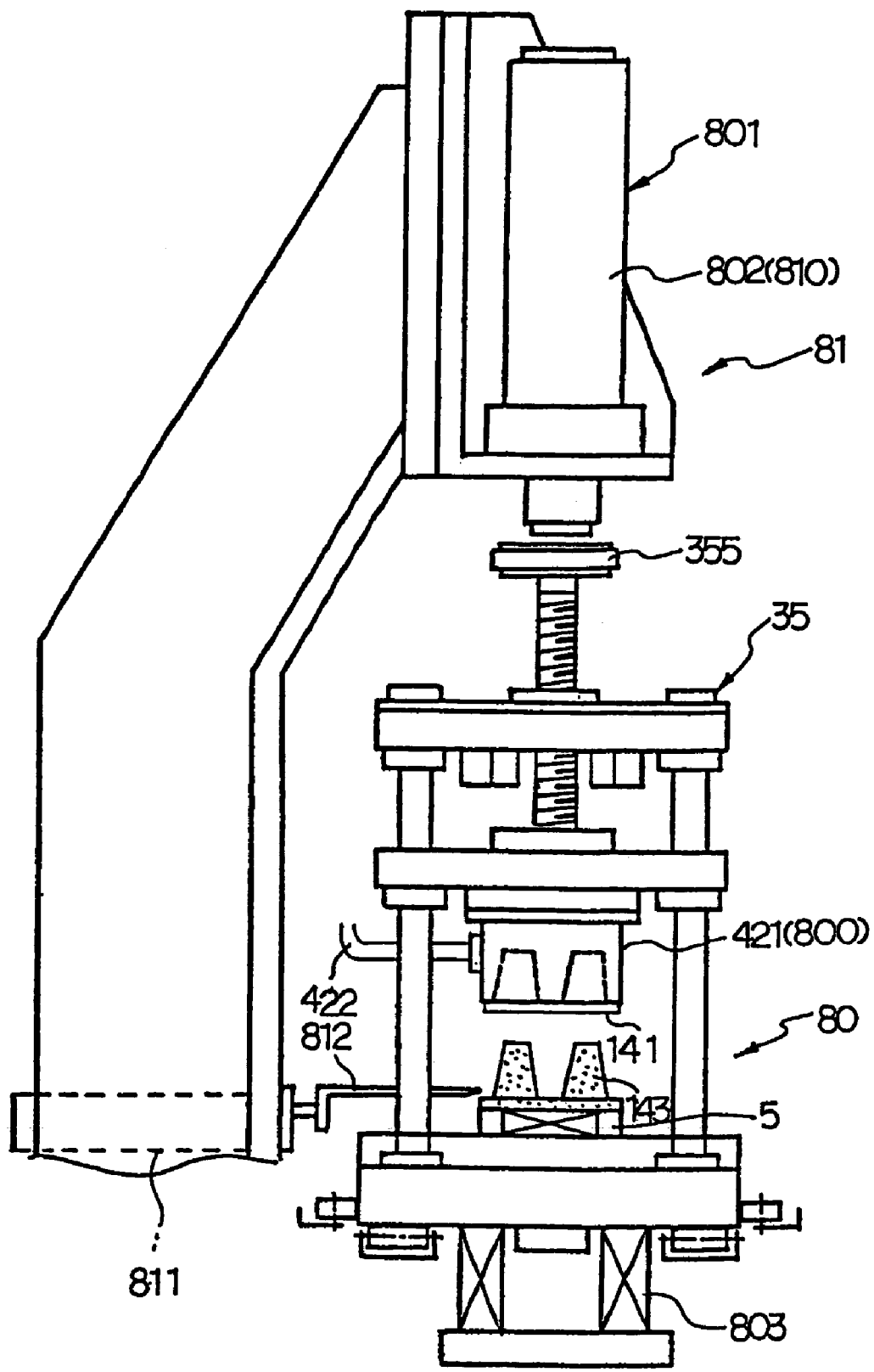
FIG. 21 schematically shows the step of forming a unitary body in the apparatus according to the embodiment.

As shown in FIG. 21, the unitary body-forming station 8 has a unitary body-forming means 80 which unites the outer layer 141 removed from the core unit 2 and the inner layer 143 having the blowing agent added thereto together with the core unit 5; a unitary body release means 81 for releasing the unitary body 14 from the core unit 5; and a drying means 82 for drying the unitary body 14.

The unitary body-forming means 80 has a forming mold 800 having cavities corresponding to the core unit 5 and a pressing unit 801 which applies a prescribed pressure to the forming mold 800 and the core unit 5. According to the present embodiment, the forming mold 800 is the aforementioned drying mold 421.

The pressing unit 801 has a cylinder unit 802 which turns the head 355 of the transport unit 35 to bring down the drying mold 421 and a bearing mount 803 which is in contact with the base plate 352 and receives the load.

The unitary body release means 81 sucks the unitary body 14 formed by the forming means 80 toward the drying mold 421 to thereby release the unitary body 14 from the core unit 5. It has the above-described evacuation path (not shown) which includes the flow pipe line 422 and the vacuum evacuator connected thereto and exerts suction on the unitary body 14 to the drying mold 421; a cylinder unit 810 which turns the head 355 of the transport unit 35 to bring the drying mold 421 (the forming mold) upward; and a cylinder unit 811 which pushes only the core unit 5 out of the transport unit 35. In the present embodiment, the cylinder unit for lifting the forming mold is the cylinder unit 802 of the pressing unit 801.

A scraper 812 which pushes the core unit 5 is fitted to the tip of the shaft of the cylinder unit 811. While the drying mold 421 is moving up, the unitary body 14 is sucked to the drying mold 421 through the evacuation path including the flow pipe line 422 and the vacuum evacuator. Thus, the unitary body 14 is separated from the elastic cores 50 elastically restoring their original size with pressure relieved. When the drying mold 421 reaches a prescribed height, the cylinder unit 811 operates the scraper 812 to push only the core unit 5 onto the conveyor 64 as hereinafter described.

Figure 22:
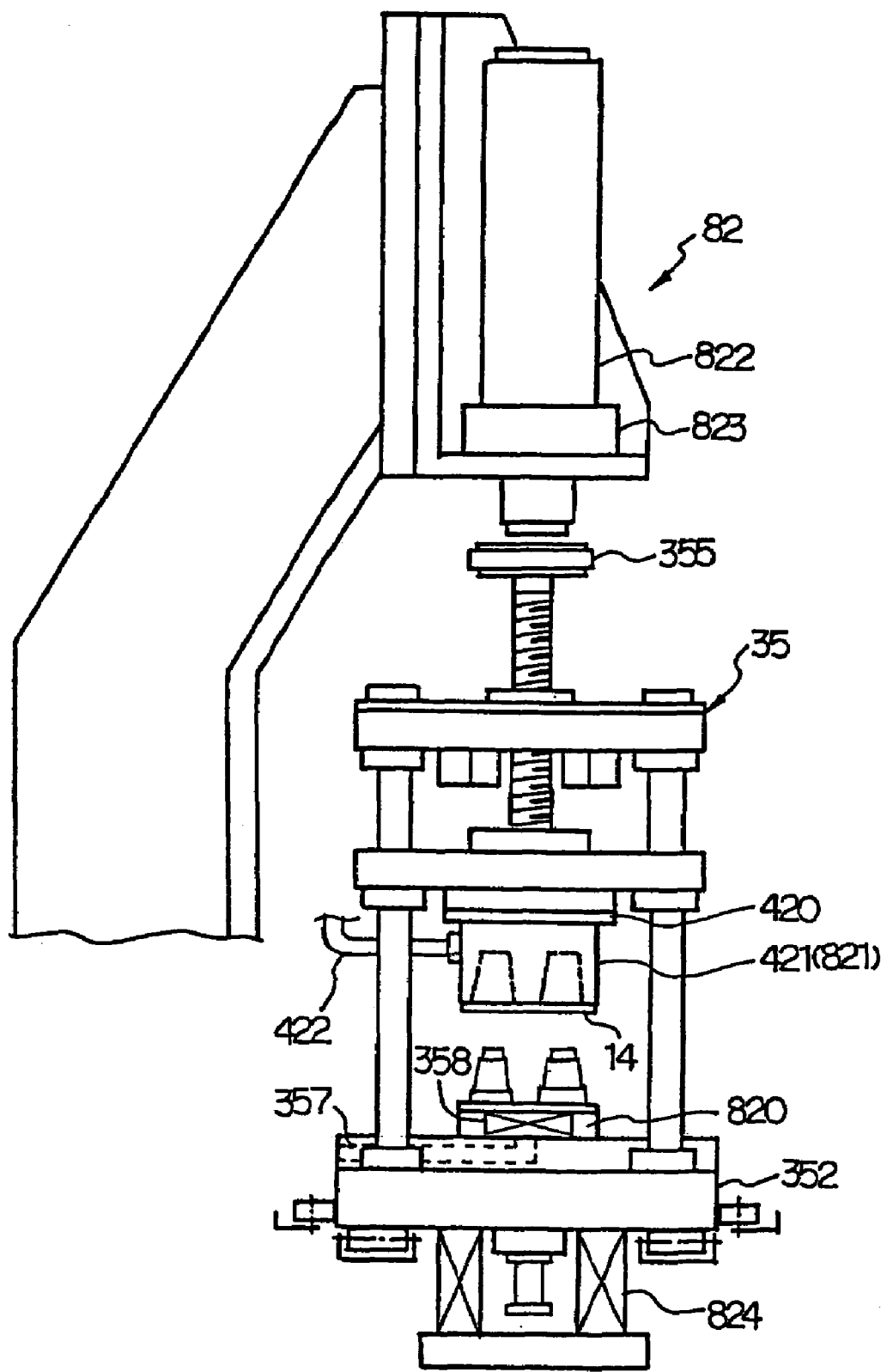
FIG. 22 schematically shows the step of drying the unitary body in the apparatus according to the embodiment.

As shown in FIG. 22, the drying means 82 has a unitary body-forming core unit (hereinafter simply referred to as a core unit) 820 having rigid cores (projections); a drying mold 821 having cavities corresponding to the core unit 820; and a pressing unit 822 for mating the core unit 820 and the drying mold 821 under a prescribed pressure.

Each projection of the core unit 820 has shoulders on its outer peripheral surface so as to create a predetermined clearance with the inner surface of the inner layer 143 when the undried unitary body 14 is put on. The core unit 820 has flow passageways and interconnecting passageways (not shown) formed in the inside thereof similarly to the core units 2 and 5. When the core unit 820 is placed on the mount 357 at a right position, the interconnecting passageways connect to the above-mentioned flow passageway 3570 so that steam can be discharged therethrough while the unitary body 14 is dried.

In the present embodiment, the drying mold 821 is the drying mold 421 for the outer layer 141.

The pressing unit 822 has a cylinder unit 823 which turns the head 355 of the transport unit 35 to bring down the drying mold 421 and a bearing mount 824 which is in contact with the base plate 352 and receives the load.

Figure 23:
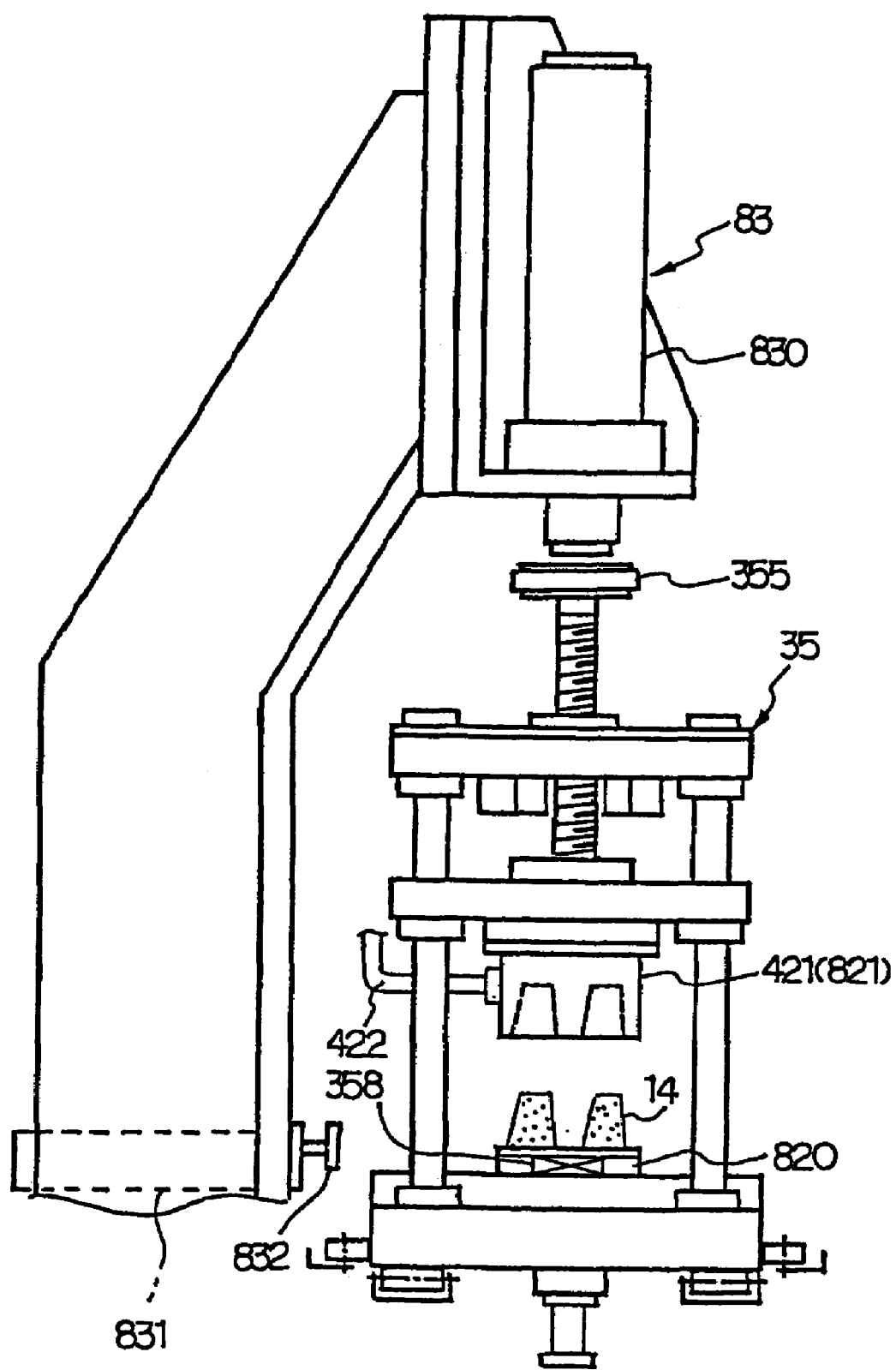
FIG. 23 schematically shows the step of removing the unitary body from the inner layer-forming core unit in the apparatus according to the embodiment.

As shown in FIG. 23, the unitary body-forming station 8 has a transfer means 83 which sends the core unit 820 with the unitary body 14 on from the transport unit 35. The transfer means 83 comprises the above-described pressurizing path (not shown) including the flow pipe line 422 and the compressor; a cylinder unit 830 which turns the head 355 of the transport unit 35 to lift only the drying mold 421; and a cylinder unit 831 which pushes the core unit 820 with the unitary body 14 on out of the transport unit 35.

Figure 24:
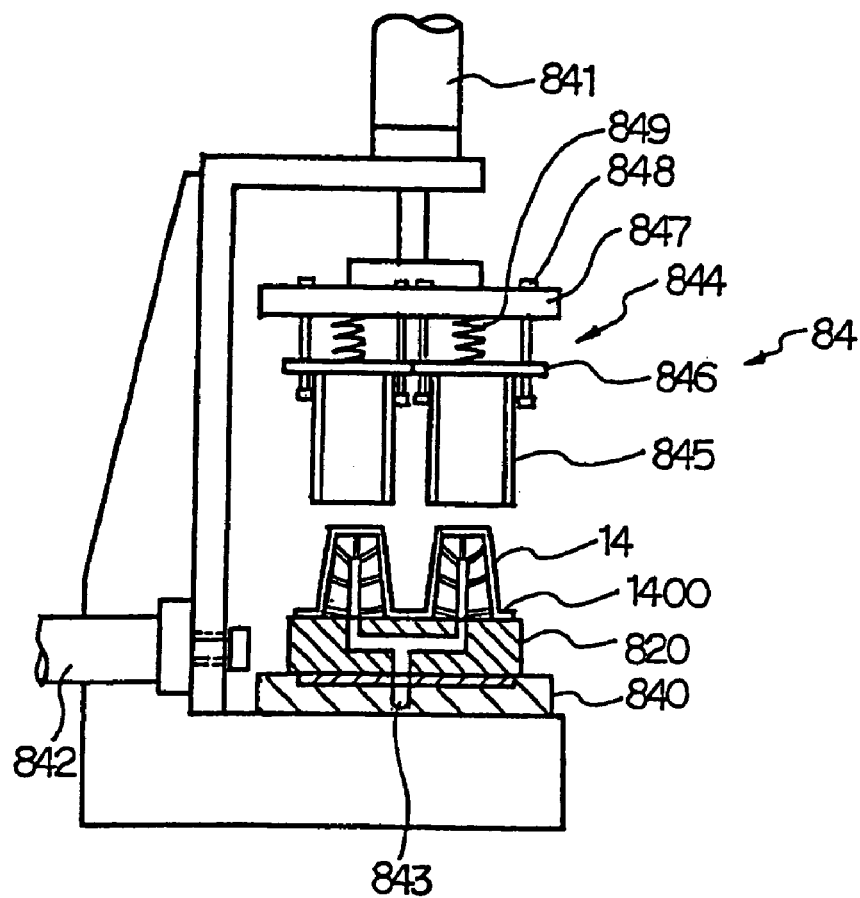
FIG. 24 schematically shows the step of separating the unitary body in the apparatus according to the embodiment.

As shown in FIG. 24, the unitary body-forming station 8 has a unitary body release means 84 in which the unitary body 14 that has been delivered together with the core unit 820 is separated from the core unit 820.

The release means 84 has a mount 840 for the core unit 820; a cylinder unit 841 which presses the unitary body 14 on the mount 840; and a cylinder unit 842 which pushes the core unit 820 horizontally onto a conveyor 85.

The mount 840 has in its inside a flow passageway 843 connecting to the above-described flow passageways in the core unit 820. The flow passageway 843 connects to a pipe line (not shown) which connects to the compressor (not shown), whereby compressed air can be ejected to the unitary body 14 through the core unit 820 to release the unitary body 14 from the core unit 820.

A holding unit 844 is fixed to the end of the shaft of the cylinder unit 841. The holding unit 844 has four cylinders 845 which hold down the individual flanges of the unitary body 14. A top plate 846 is fixed to the upper ends of the cylinders 845. The top plate 846 has through-holes at its four corners, through which floating volts 848 are inserted to fix the top plate 846 to a plate 847 that is fixed to the end of the shaft of the cylinder unit 841. Springs 849 are disposed between the top plate 846 and the plate 847. When the unitary body 14 is released from the core unit 820 by purging with compressed air, the springs 849 prevent the unitary body 14 from jumping out while flexibly following the movement of the unitary body 14.

The thus constructed release means 84 operates as follows. After the unitary body 14 is released from the core unit 820, the holding unit 844 is lifted and withdrawn, and the cylinder unit 842 pushes the core unit 820 with the unitary body 14 on onto the conveyor 85.

Figure 25:
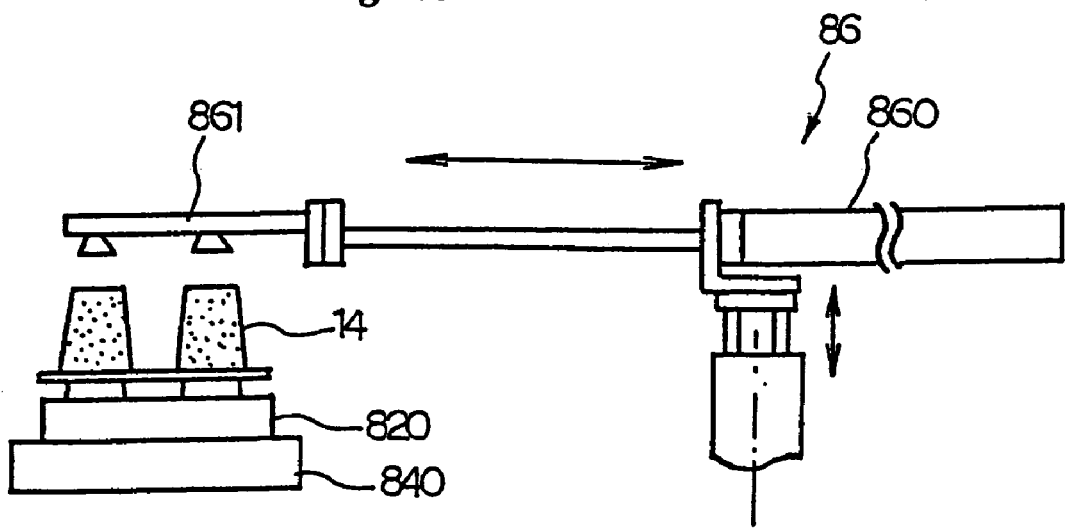
FIG. 25 schematically shows the step of transferring the unitary body in the apparatus according to the embodiment.

As shown in FIG. 20, the unitary body-forming station 8 has a transfer unit 86 for picking up the unitary body 14 from the core unit 820 that has been pushed onto the conveyor 85 together with the unitary body 14 and shifting it to a transfer conveyor 9. As shown in FIG. 25, the transfer unit 86 is mainly composed of a cylinder unit 860 which is supported to swing horizontally and about a vertical axis. A sucker plate 861 having suckers is attached to the tip of the shaft of the cylinder unit 860. The sucker plate 861 sucks the unitary body 14, and the cylinder unit 860 swings about the vertical axis to shift the unitary body 14 to the transfer conveyor 9 as shown in FIG. 13.

The unitary body 14 thus shifted is delivered to a cutting and trimming station (not shown), where they are cut apart and trimmed into final products (heat-insulating containers).

The apparatus 1 is equipped with a control system (not shown) which has a sequence program for synchronizing and correctly operating all the elements of the drive systems and the gas/liquid flow systems in every station having the aforementioned construction and a circuit for transmitting/receiving control signals, etc. between the control system and the elements so that the apparatus 1 can normally operate automatically.

Each step involved for producing a heat-insulating container by use of the apparatus 1 according to the present embodiment will then be described.

First of all, the traverse member 311 shown in FIG. 13 horizontally moves to a right position. The left-hand side cylinder unit 312A operates to bring the gripper 314 downward. After the gripper 314 grips the leading core unit 2 on the conveyor 30, the cylinder unit 312A operates to lift them. The traverse member 311 moves to shift the core unit 2 to above the cleaning tank 470. The cylinder unit 312A brings down the core unit 2 into the cleaning liquid in the cleaning tank 470.

Compressed air is fed from the compressor P through the flow pipe line 403 and through the flow passageways 200 and the interconnecting passageways 210 of the core unit 2 and ejected into the cleaning tank 470. As a result, the papermaking screen 22 of the core unit 2 is cleaned.

The cylinder unit 312A operates to lift the core unit 2 from the cleaning tank 470 up to a predetermined height. The cylinder units 316 hold the cleaned core unit 2 from both sides and keep it for a while, and, at the same time, the gripper 314 releases the core unit 2. The gripper 314 goes up, and the traverse member 311 traverses (to the left in FIG. 13) to such a position that the gripper 314 of the cylinder unit 312A comes right above the second core unit 2 that has been transported on the conveyor 30. The cylinder unit 312A operates to bring down the gripper 314 to grip the next core unit 2. On the other hand, the cylinder 312B operates to bring down its gripper 314 from above the leading core unit 2 gripped by the cylinder units 316 on standby. The gripper 314 grips the core unit 2 on standby, and, at the same time, the core unit 2 is released from the grip by the cylinder units 316. The cylinder units 312A and 312B move upward, and the traverse member 311 traverses (to the right in FIG. 13) to bring the two core units 2 to above the cleaning tank 470 and the slurry tank 400, respectively. The leading core unit 2 is brought down and immersed in the slurry of the tank 400, and the slurry is sucked up through the flow pipe line 401 connecting to the vacuum evacuator V to carry out papermaking to form an outer layer 141. On the other hand, the second core unit 2 is immersed in the cleaning liquid in the cleaning tank 470, and compressed air is ejected through the flow pipe line 403 to clean the second core unit 2.

The cylinder units 312A and 312B operate to pull up the second and the leading core units 2 from the cleaning tank 470 and the slurry tank 400, respectively. After the cylinder units 316 grip these units, the grip by the grippers 314 is released. The cylinder units 312A and 312B move upward, and the traverse member 311 horizontally moves (to the left in FIG. 13) to a prescribed position. After the traverse member 311 traverses (to the left in FIG. 13) to such a position that the gripper 314 of the cylinder unit 312A comes right above the third core unit 2 that has been transported on the conveyor 30. The cylinder unit 312A operates to bring down the gripper 314 to grip the third core unit 2. Simultaneously, the cylinder 312B operates to bring down its gripper 314 from above the second core unit 2 on standby as gripped by the cylinder units 316 to make the gripper 314 grip the second core unit 2 on standby, and the cylinder unit 312C operates to bring down its gripper 314 from above the leading core unit on standby as gripped by the cylinder units 316 to make its gripper 314 grip the leading core unit on standby. The leading and the second core units 2 are released from the grip by the cylinder units 316. The cylinder units 312A, 312B, and 312C move upward, and the traverse member 311 traverses (to the right in FIG. 13) to bring the three core units 2 to above the cleaning tank 470, the slurry tank 400, and the dewatering mold 410, respectively.

The leading core unit 2 is brought down to mate with the dewatering mold 410, and water is sucked and discharged through the suction pipe line 411 while feeding compressed air through the flow pipe line 402 to press and dewater the outer layer 141 between the core unit 2 and the dewatering mold 410. Simultaneously, the second core unit 2 is brought down and immersed in the slurry of the tank 400, and the slurry is sucked up by evacuation through the flow pipe line 401 connecting to the vacuum evacuator V to perform papermaking to form an outer layer 141. Also simultaneously, the third core unit 2 is immersed in the cleaning liquid in the cleaning tank 470, and compressed air is ejected through the flow pipe line 403 to clean the third core unit 2.

The cylinder units 312A to 312C operate to pull up the third and the second core units 2 from the cleaning tank 470 and the slurry tank 400, respectively, and release the leading core unit 2 from the dewatering mold 410. After these core units are gripped by the cylinder units 316, the grip by the grippers 314 is released. The cylinder units 312A to 312C lift, and the traverse member 311 moves horizontally to a prescribed position (to the left in FIG. 13). Namely, the traverse member 311 moves (to the left in FIG. 13) until the gripper 314 of the cylinder unit 312A comes right above the fourth core unit 2 that has been transported on the conveyor 30.

The cylinder unit 312A operates to bring down the gripper 314 to grip the forth core unit 2. On the other hand, the cylinder 312B operates to bring down its gripper 314 from above the third core unit 2 on standby as gripped by the cylinder units 316 to make the gripper 314 grip the third core unit 2 on standby. Simultaneously, the cylinder unit 312C operates to bring down the gripper 314 from above the second core unit on standby as gripped by the cylinder units 316 to grip the second core unit 2 on standby. The cylinder unit 312D operates to lower the gripper 314 from above the leading core unit 2 on standby as gripped by the cylinder units 316 to grip the leading core unit 2 on standby. The grips by the cylinder units 316 on the leading, the second, and the third core units 2 are released. The cylinder units 312A to 312D move upward, and the traverse member 311 traverses (to the right in FIG. 13) to bring the four core units 2 to the positions where they are gripped on the cleaning tank 470, on the slurry tank 400, on the dewatering mold 410, and in the inversion unit 32.

As shown in FIG. 14, the leading core unit 2 on standby is gripped by fitting the pins 323 of the inversion unit 32 into the holes 211 of the mount 21. At the same time, the second core unit 2 is brought down and mated with the dewatering mold 410 to press dewater the outer layer 141 therebetween, while the third core unit 2 is brought down and immersed in the slurry of the tank 400, and the slurry is sucked up by evacuation through the flow pipe line 401 connecting to the vacuum evacuator V to perform papermaking to form an outer layer. Simultaneously, the forth core unit 2 is immersed in the cleaning liquid in the cleaning tank 470, and compressed air is ejected through the flow pipe line 403 to cleaning the forth core unit 2.

After the leading core unit 2 is completely gripped by the pins 323 of the inversion unit 32, the grip by the gripper 314 is released, and the leading core unit 2 is inverted by the cylinder units 320. The cylinder units 312A to 312C operate to pull up the forth and the third core units 2 from the cleaning tank 470 and the slurry tank 400, respectively, and to release the second core unit 2 from the dewatering mold 410. After these core units 2 are gripped by the respective cylinder units 316, the grips by the grippers 314 on these core units 2 are released. The cylinder units 312A to 312C move up, and the traverse member 311 moves horizontally (to the left in FIG. 13) to a prescribed position. That is, the traverse member 311 moves (to the left in FIG. 13) until the gripper 314 of the cylinder unit 312A comes right above the fifth core unit 2 that has been transported on the conveyor 30.

In this way, core units 2 are successively transferred to the steps of cleaning, papermaking, dewatering, and inverting by means of the traverse member 311, the cylinder units 312A to 312D, and the grippers 314.

As indicated by the dashed dotted line in FIG. 14, the cylinder units 320 of the inversion unit 32 operate to bring down the inverted core unit 2 and put it on the service table 332 of the transfer unit 33 which has been standing by under the inverted core unit 2. The horizontal traverse member 331 of the transfer unit 33 travels to horizontally move the service table 332. The driven rollers 333 of the service table 332 and the conveyor 34 are driven synchronously to load the leading core unit 2 on the transport unit 35 as shown in FIG. 16. The registration cylinders 358 of the transport unit 35 are open during loading and closed after loading to hold the core unit 2 at a right position.

After completion of the leading core unit 2 transfer, the service table 332 returns to the position under the inversion position of the inversion unit 32 to stand by for the second core unit 2.

The steps involved in the inner layer 143-forming station 7 (see FIG. 13) of from formation of an inner layer 143 to inversion of the inner layer 143 can be carried out in the same manner as in the outer layer 141-forming station 4, except that the dewatering step with the dewatering means 41 in the outer layer 141-forming station 4 is replaced with the step of applying a blowing agent by the blowing agent application means 71. Therefore, the description therefor is omitted.

Then, the endless chain 359 is driven to transport the transport unit 35 to the position where the core unit 2 and the drying mold 421 are mated by the pressing unit 43 shown in FIG. 13.

As shown in FIG. 17, the cylinder unit 430 operates to turn the head 355 of the transport unit 35 to bring down the drying mold 421. The drying mold 421 heated to a predetermined temperature by the heater plate 420 is mated with the core unit 2 with a prescribed pressing force, and the push-rod 354 is locked by the lock ring 356. Steam is discharged by suction through the evacuation path including the flow pipe line 422 and the vacuum evacuator connected thereto. On completing locking with the lock ring 356, the shaft of the cylinder unit 430 is lifted, and the endless chain 359 is again driven to transport the transport unit 35 to the position where the outer layer 141 is released by the release means 44 shown in FIG. 13.

At the position of releasing the core unit 2, the lock ring 356 of the transport unit 35 is loosened, and the head 355 is turned to lift the drying mold 421. Meantime the outer layer 141 is attracted to the side of the drying mold 421 by suction through the evacuation path including the flow pipe line 422 and the vacuum evacuator connected thereto, whereby the drying mold 421 having the outer layer 141 in is brought upward. On the other hand, the cylinder unit 441 operates to insert the scraper 442 between the core unit 2 and the outer layer 141 to separate them apart. When the outer layer 141 reaches a prescribed height, the scraper 442 is further ejected forward to transfer only the core unit 2 onto the conveyor.

The outer layer-forming core unit is carried on the conveyor 36 and then on the conveyor 30 to the front of the cleaning tank 470.

The endless chain 359 drive is resumed to transport the transport unit 35 shown in FIG. 13 to the position for applying an adhesive by the adhesive application means 46.

At the position for adhesive application, the cylinder unit 464 operates to set the transfer roller 465 having picked up the adhesive in the pan 460 at a position under the outer layer 141 sucked to the drying mold 421 in the transport unit 35 as shown in FIG. 19. The transfer roller 465 is rotated in contact with the flanges 141a of the outer layer 141 to transfer the adhesive to the flanges 141a.

The endless chain 359 is again moved to carry the transport unit 35 to the position where the outer layer 141 and the inner layer 143 are united by the unitary body-forming means 80 of the unitary body-forming station 8.

At this position, the core unit 5 having the inner layer 143 on is transferred from the transfer unit 63 to the transport unit 35. Then, as shown in FIG. 21, the cylinder unit 802 turns the head 355 to bring down the drying mold 421 (forming mold) from above the core unit 5 and to mate the drying mold 421 and the core unit 5. As a result, the inner layer 143 and the outer layer 141 are united between the core unit 5 and the drying mold 421.

The water content is removed through the evacuation path including the flow pipe line 422 and the vacuum evacuator connected thereto while pressing the unitary body 14 composed of the inner layer 143 and the outer layer 141 for a prescribed period of time. Then, the cylinder unit 802 operates to turn the head 355 while the resulting unitary body 14 is sucked to the drying mold 421 side through the evacuation path. The drying mold 421 goes up with the unitary body 14 in to thereby separate the unitary body separate from the core unit 5. When the unitary body 14 reaches a prescribed height, the cylinder unit 811 operates to extend its scraper 812 to transfer only the core unit 5 to the conveyor 64. The core unit 5 is shifted by the conveyor 64 onto the service table of the transfer unit 63, transferred by the driven rollers of the service table onto the conveyor 66 via the conveyor 65, and returned to the front of the cleaning means 72 on the conveyor 60.

The endless chain 359 is driven again to transport the transport unit 35 to the position of drying by the drying means 82 in the unitary body-forming station 8. At the drying position, as shown in FIG. 22, a core unit 820 is loaded into the transport unit 35 by the conveyor and positioned by the registration cylinders 358. The cylinder unit 823 turns the head 355 to lower the drying mold 421 from above the core unit 820. The drying mold 421 and the core unit 820 thus mate with each other with the unitary body 14 therebetween. The heater plate 420 is heated to heat the drying mold to a prescribed temperature, at which the blowing agent expands to form a heat-insulating layer. Because each projection of the core unit 820 has shoulders on its outer peripheral surface, the formed heat-insulating layer 142 has different expansion densities in its body as with the heat-insulating container 140 shown in FIG. 14.

The endless chain 359 is driven to transport the transport unit 35 to the position of transfer by the transfer means 83 shown in FIG. 13. At the position of transfer by the transfer means 83, as shown in FIG. 23, the cylinder unit 830 turns the head 355 to lift the drying mold 421 while ejecting compressed air toward the unitary body 14 through the pressurizing path including the flow pipe line 422 of the drying mold 421 and the compressor. Thus, the drying mold 421 is separated from the unitary body 14 so that only the drying mold 421 is lifted. When the drying mold 421 reaches a prescribed height, the registration cylinders 358 are opened apart to release the core unit 820. The cylinder unit 831 extends its shaft 832 forward to eject the core unit 820 having the unitary body 14, which is transferred via a conveyor to the position of release by the release means 84. After the core unit 820 is ejected, the endless chain 359 is again driven to transport the transport unit 35 to the position where it meets with the core unit 2.

In the apparatus 1 according to the present embodiment, while each transport unit 35 is revolved on the elliptic track by the endless chain 359, the steps of press drying the outer layer 141, releasing the outer layer 141 from the core unit 2, applying the adhesive to the outer layer 141, uniting the outer layer 141 and the inner layer 143 to form and dewater the unitary body 14, releasing the unitary body 14 from the core unit 5, forming the heat-insulating layer through expansion of the blowing agent, and transferring the core unit 820 with the unitary body 14 are carried out in succession.

The core unit pushed out by the cylinder unit 831 is loaded on the mount 840 of the release means 84 via the conveyor. The cylinders 845 of the holding unit 844 go down to hold the unitary body 14 at their flanges 1400. In this state, compressed air is fed through the flow passageway 843 inside the mount 840 to separate the unitary body 14 from the core unit 820. The cylinder 842 operates to load the core unit 820 with the unitary body 14 on the conveyor 85.

The cylinder unit 860 operates to set the sucker plate 861 of the transfer unit 86 above the core unit 820 that has been loaded together with the unitary body 14 on the conveyor 85. After the sucker plate 861 sucks the unitary body 14, the cylinder unit 860 again operates to shift the unitary body 14 to the transfer conveyor 9.

The conveyor 9 carries the unitary body 14 to the cutting and trimming station (not shown), where it is cut into four containers and trimmed to obtain heat-insulating containers 140 shown in FIG. 14.

In the apparatus 1 according to the present embodiment, core units 2 for outer layer and core units 5 for inner layer each having a papermaking screen 22 that is liable to damage on repeated use are used in rotation. Even if a screen should be damaged, it is possible to continue production without suspending the whole system, and the damaged screen can be changed for a normal one. Therefore, pulp molded articles can be produced at high production efficiency.

Since the core unit 820 has shoulders on its outer peripheral surface so as to give a prescribed clearance with an inner layer when a unitary body 14 is put on, there is formed a heat-insulating layer with different expansion densities in its body as in the heat-insulating container 140.

The outer layer-forming station 4 includes the outer layer drying means 42 for drying a dewatered outer layer 141 so that the outer layer 141 is dried before it is released by the release means 81. As a result, when a wet inner layer 143 is superposed on the outer layer 141, there is no fear that the water content of the inner layer 143 oozes on the outer surface of the outer layer 141 to ruin the appearance.

In the present embodiment, the drying mold 421 serves as an outer layer drying mold, a unitary body forming mold, and a unitary body drying mold. Compared with a production system using separate molds for molding and drying, positional deviation in transfer operations is securely minimized, and production efficiency is increased.

Figure 26:
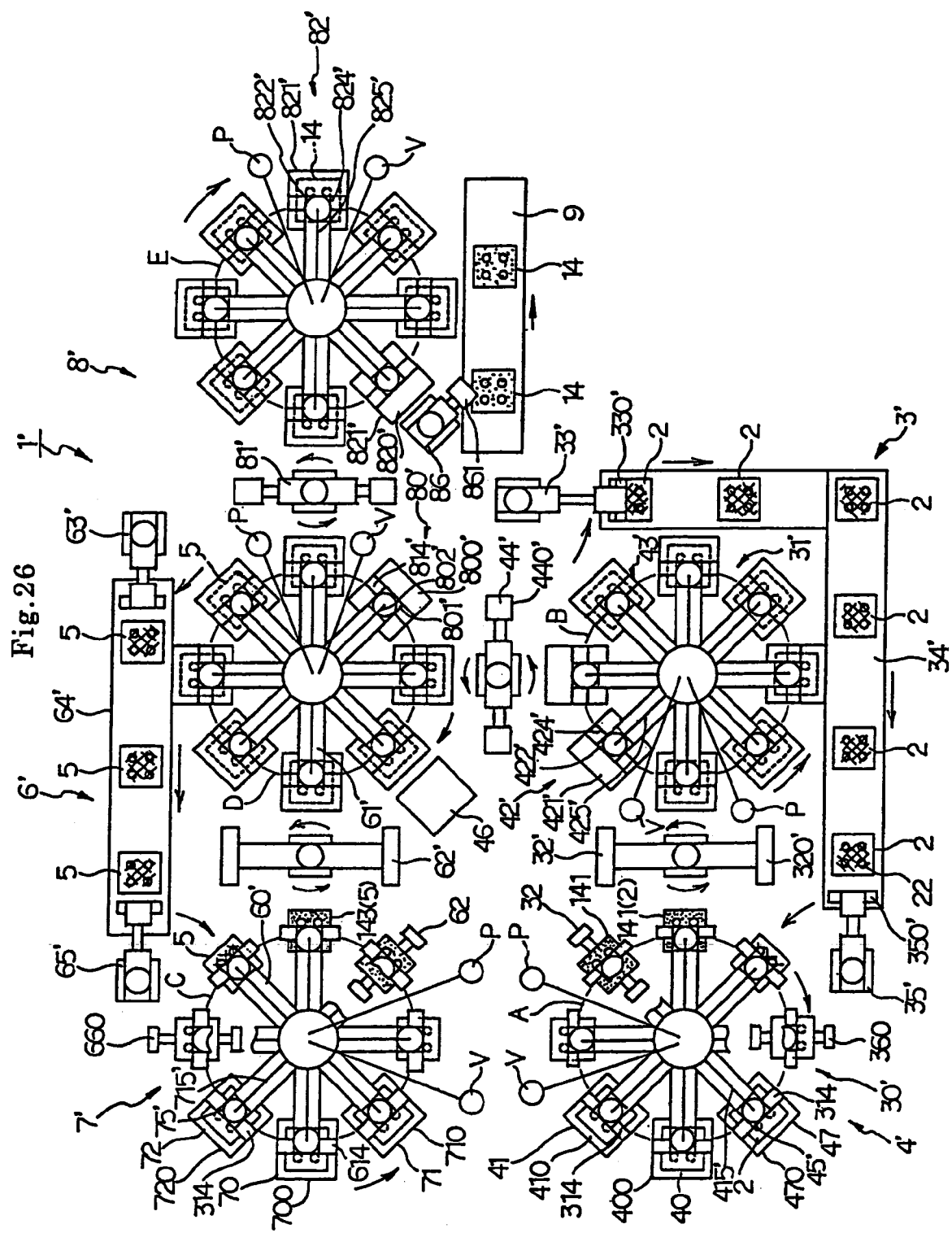
FIG. 26 schematically shows a second embodiment of the apparatus for producing a heat-insulating container according to the present invention.

FIG. 26 illustrates an apparatus 1' according to the second embodiment of the present invention, in which elements common to the first embodiment are given the same numerical references as used in the first embodiment, and the description therefor is omitted. Accordingly, the description of the apparatus 1 of the first embodiment appropriately applies to the particulars that are not described here.

The apparatus 1' comprises a plurality of core units 2, a core unit transfer mechanism 3' for transferring the plurality of core units 2 in rotation, an outer layer-forming station 4' where an outer layer 141 is formed by using each core unit 2 transferred by the transfer mechanism 3', a plurality of core units 5, a core unit transfer mechanism 6' for transferring the plurality of core units 5 in rotation, an inner layer-forming station 7' where an inner layer 143 having a blowing agent adhered to the outer surface thereof is formed by using each core unit 5 transferred by the transfer mechanism 6', and a unitary body-forming station 8' where the outer layer 141 and the inner layer 143 which have been formed in the outer layer-forming station 4' and the inner layer-forming station 7', respectively, are joined together, followed by expanding the blowing agent to form a heat-insulating layer 142.

The core unit transfer mechanism 3' works to transfer each core unit 2 on a circular track A to a prescribed position, shift the core unit 2 to a circular track B, transfer the core unit 2 on the circular track B to a prescribed position, and return the core unit 2 shifted from the circular track B at a prescribed position to the circular track A.

The transfer mechanism 3' comprises a first rotary transfer means 30' which transfers eight core units 2 on the circular track A, a second rotary transfer means 31' which transfers the core units 2 having an outer layer 141 formed thereon on the circular track B, a traverse unit 32' which transfers each core unit 2 having the outer layer 141 from the transfer means 30' to 31', a traverse unit 33' which unloads the core units 2 from which the outer layer 141 has been released from the circular track B, a conveyor 34' which returns the core units 2 from the circular track B to the circular track A, and a traverse unit 35' which loads the core units 2 coming on the conveyor 34' onto the circular track A.

The first rotary transfer means 30' has grippers 314 which each grip the core unit 2 on the circular track A. The second rotary transfer means 31' has a turn table (not shown) which transfers upwardly directed core units 2 on the circular track B. The traverse units 32', 33', and 35' each mainly comprise a cylinder which is disposed horizontally and supported vertically movably and circularly movably about a vertical axis. The cylinder has, at the end of its shaft, a gripper 320', 330' or 350', respectively, which has, at the tip thereof, claws engageable with the holes 211 of the core unit 2.

The outer layer-forming station 4' has a cleaning means 47 for cleaning the core units 2 coming on the circular track A, a papermaking means 40 for immersing each of the core units 2 and forming an outer layer 141 thereon, and a dewatering means 41 for dewatering the formed outer layer 141.

The cleaning means 47 contains a tank 470. The papermaking means 40 contains a tank 400. The dewatering means 41 has a dewatering mold 410.

The outer layer-forming station 4' has an outer layer drying means 42' for drying the outer layer 141 on the core unit 2 running on the circular track B, a release means 43' for releasing the dried outer layer from the core unit 2, a transfer means 44' for transferring the outer layer 141 from the circular track B to a circular track D, and a cylinder unit 45' for vertically moving the core unit 2.

The core unit 2 is gripped by the gripper 314 attached to the lower end of the shaft of the cylinder unit 45'. The shaft of the cylinder unit 45' has a flow pipe (not shown) connecting to the flow passageway 3140 of the gripper 314 (see FIG. 13). The upper end of the flow pipe is connected to a flow pipe 415' via a rotary joint (not shown) and a distributor (not shown). The flow pipe 415' is led to either a vacuum evacuator V or a compressor P via a switchover valve (not shown). By switching the switchover valve, the flow pipe 415' is adapted to feed compressed air in cleaning the core unit 2 and to discharge the liquid component of the slurry by suction in forming the outer layer 141 by papermaking. The cylinder unit 45' also functions as a pressing means which vertically moves the core unit 2 and applies a prescribed pressure to the core unit 2 and the dewatering mold 410.

The drying means 42' has a turn table (not shown) for transferring the core unit 2 with the outer layer 141 on the circular track B; a drying mold 421' for drying the outer layer 141; and a cylinder unit 422' which vertically moves the drying mold 421' to mate the drying mold 421' with the core unit 2. The drying mold 421' is supported as gripped by a gripper 424' fitted to the lower end of the shaft of the cylinder unit 422'. A flow pipe (not shown) is provided through the shaft of the cylinder unit 422'.

The turn table has flow passageways (not shown) connecting to the interconnecting passageways 210 of each core unit 2 and to the outside of the turn table. Through each of these flow passageways, steam discharge and compressed air feed are effected in drying the outer layer 141.

The drying mold 421' has a cavity corresponding to the core unit 2 and has in its inside flow passageways (not shown) connecting to the cavity and to the outside thereof. A flow passageway is made through the base of the gripper 424' which connects the upper end of the flow passageway inside the drying mold 421' with the lower end of the flow pipe inside the cylinder unit 422'. The upper end of the flow pipe piercing through the shaft of the cylinder unit 422' is connected to a flow pipe 425' via a rotary joint (not shown) and a distributor (not shown). The flow pipe 425' is led to either a vacuum evacuator V or a compressor P via a switchover valve (not shown).

The flow passageways of the drying mold 421', the flow passageway of the gripper 424', the flow pipe of the cylinder unit 422', and the flow pipe 425' provide a flow path. In drying the outer layer 141 in the drying mold 421', the switchover valve operates to switch over the flow path to an evacuation path so that the steam is suck up and discharged. On the other hand, the steam is discharged through the flow passageway of the turn table.

The drying mold 421' is adapted to attract the dried outer layer 141 by suction in releasing the outer layer 141 from the core unit 2 or to feed compressed air in releasing the outer layer 141 from the drying mold 421' by operating the switchover valve to switch over the flow path including the flow pipe 425' and the vacuum evacuator V or the compressor P to either an evacuation path or a pressurizing path.

The release means 43' is to suck the outer layer 141 having been delivered by the rotary transfer means 30' in a pressed state to thereby attract the outer layer 141 to the drying mold 421' and release it from the core unit 2. The release means 43' provides an evacuation path including the above-described flow pipe 425' for sucking the outer layer 141 toward the drying mold 421' and the above-described vacuum evacuator V.

The transfer means 44' mainly comprises a cylinder unit which is disposed horizontally and supported rotatably about a vertical axis and vertically movably. A sucker plate 440' having suckers is provided at each end of the shaft of the cylinder unit.

The core unit 5 transfer mechanism 6' is to transfer core units 5 from circular tracks C to D and return the core units 5 removed from the circular track D to the circular track C.

The transfer mechanism 6' has a rotary transfer means 60' for transferring core units 5 on the circular track C; a rotary transfer means 61' for transferring the core units 5 having a unitary body 14 on on the circular track D; a traverse unit 62' set between transfer means 60' and 61' for shifting the core unit 5 having an inner layer 141 to the circular track D; core unit 5 for removing the core unit 5 from which a unitary body 14 has been separated from the circular track D; a conveyor 64' for returning the traverse unit shifted from the circular track D toward the circular track C; and a traverse unit 65' for loading the returned core unit 5 on the circular track C.

The inner layer-forming station 7' has a cleaning means 72 for cleaning core units 5 running on the circular track C; a papermaking means 70 for immersing each core unit 5 to form an inner layer on each core of the core unit 5 by papermaking; a blowing agent application means 71 for applying a blowing agent to the outer surface of the formed inner layer; a cylinder unit 75' for vertically moving the core unit 5; and an inversion unit 62 for inverting the core unit 5 having the blowing agent-adhered inner layer 143.

The cleaning means 72 has a cleaning tank 720. The papermaking means 70 has a tank 700. The blowing agent application means has a tank 710.

The inner layer-forming station 7' also has an inversion unit 660 in which the core unit 5 returned to the circular track C is inverted before being cleaned.

The core unit 5 is gripped by a gripper 314 attached to the lower end of the shaft of the cylinder unit 75'. The shaft of the cylinder unit 75' has a flow pipe (not shown) connecting to the flow passageway 3140 of the gripper 314 (see FIG. 13). The upper end of the flow pipe is connected to a flow pipe 715' via a rotary joint (not shown) and a distributor (not shown). The flow pipe 715' is led to either a vacuum evacuator V or a compressor P via a switchover valve (not shown). By switching the switchover valve, the flow pipe 715' is adapted to feed compressed air in cleaning the core unit 5 and to discharge the liquid component of the slurry by suction in forming the inner layer 143 by papermaking.

The unitary body 14-forming station 8' comprises a unitary body forming means 80' with which the outer layer 141 separated from the core unit 2 and the drying mold 421' is joined with the blowing agent-adhered inner layer 143 on the core unit 5; a transfer means (unitary body release means) 81' for transferring the unitary body 14 from the circular tracks D to E; and a drying means 82' with which the unitary body is dried while moving on the circular track D. In the second embodiment, the unitary body forming station 8' has an adhesive application means 46 for applying an adhesive to the flanges of the outer layer 141 sucked to a forming mold 800' hereinafter described.

The forming means 80' has a forming mold 800' having a cavity mating with the core unit 5 and a cylinder unit 801' which vertically moves the forming mold 800' to press the forming mold 800' and the core unit 5 under a prescribed pressure. The forming mold 800' is gripped by a gripper 814' fitted to the lower end of the shaft of the cylinder unit 801'. A flow pipe (not shown) is provided through the shaft of the cylinder unit 801'.

The forming mold 800' has a cavity mating with the core unit 5 similarly to the drying mold 421. It has in the inside flow passageways (not shown) interconnecting the cavity and the outside of the mold. A flow passageway is formed through the base of the gripper 814 to connect the upper end of the flow passageways inside the forming mold 800' with the lower end of the flow pipe inside the cylinder unit 801'. The upper end of the flow pipe provided through the shaft of the cylinder unit 801' is connected to a flow pipe 802' via a rotary joint (not shown) and a distributor (not shown). The flow pipe 802' is led to either the vacuum evacuator V or the compressor P via a switchover valve (not shown).

The flow passageways of the forming mold 800', the flow passageway of the gripper 814', the flow pipe of the cylinder unit 801', and the flow pipe 802' provide a flow path. In press dewatering a unitary body 14 in the forming mold 800', the switchover valve operates to switch over the flow path to an evacuation path so that the water content is suck up. At the same time, compressed air is fed through the flow passageway connecting to the core unit 5. The unitary body 14 is thus dewatered to a prescribed water content.

The forming mold 800' is adapted to attract the unitary body 14 by suction in releasing the unitary body 14 from the core unit 5 or to feed compressed air in releasing the unitary body 14 from a unitary body 14 drying mold by operating the switchover valve to switch over the flow path including the flow pipe and the vacuum evacuator V or the compressor P to either an evacuation path or a pressurizing path.

The transfer means 81' has the same structure as the transfer means 44'.

The drying means 82' has unitary body forming core units 820' having rigid cores (projections); a turn table (not shown) transporting the core units 820' on a circular track E; drying molds 821' having a cavity mating with the core unit 820'; and cylinder units 822' for mating each core unit 820' and each drying mold 821' under a prescribed pressure. The drying mold 821' is supported by the grip with a gripper 824' attached to the lower end of the shaft of the cylinder unit 822'. A flow pipe (not shown) is provided through the shaft of the cylinder unit 822'.

The turn table has flow passageways connecting to the interconnecting passageways of each core unit 820 and to the outside of the turn table. Through each of these flow passageways, steam discharge and compressed air feed are effected in drying the unitary body 14.

The drying mold 821' has a cavity corresponding to the core unit 820' and has in its inside flow passageways (not shown) interconnecting the cavity and the outside. A flow passageway is provided through the base of the gripper 824' to connect the upper end of the flow passageways inside the drying mold 821' with the lower end of the flow pipe inside the cylinder unit 822'. The upper end of the flow pipe provided through the shaft of the cylinder unit 822' is connected to a flow pipe 825' via a rotary joint (not shown) and a distributor (not shown). The flow pipe 825' is led to either a vacuum evacuator V or a compressor P via a switchover valve (not shown).

The flow passageways of the drying mold 821', the flow passageway of the gripper 824', the flow pipe of the cylinder unit 822', and the flow pipe 825' form a flow path. In drying a unitary body 14 in the drying mold 821', the switchover valve operates to switch over the flow path to an evacuation path so that steam is suck up and discharged. At the same time, steam is discharged through the flow passageway of the turn table.

After the unitary body 14 dries, and the blowing agent expands to form a heat-insulating layer, the cylinder unit 822' lifts the drying mold 821' while blowing the dry unitary body 14 from both the upper and lower sides with compressed air fed from a compressor (not shown) through the flow passageway on one side and compressed air fed from the side of the drying mold 821' on the other side. As a result, the unitary body 14 is released from the core unit 820', and the drying mold 821' alone is withdrawn upward.

The unitary body-forming station 8' has a transfer unit 86 which transfers the unitary body 14 having been released from both the drying mold 821' and the core unit 820' on the circular track E to a transfer conveyor 9. After a sucker plate 861 of the transfer unit sucks the unitary body 14, a cylinder unit swings on a vertical axis to shift the unitary body 14 to the transfer conveyor 9. The conveyor 9 carries the unitary body 14 to a cutting and trimming station (not shown), where it is cut and trimmed to yield products (heat-insulating containers).

Similarly to the apparatus 1, the apparatus 1' is equipped with a control system (not shown) which has a sequence program for synchronizing and correctly operating all the elements of the drive systems and the gas/liquid flow systems in every station and a circuit for transmitting/receiving control signals, etc. between the control system and the elements so that the apparatus 1' can normally operate automatically.

In the apparatus 1' according to the second embodiment, core units 2 and 5 each having a papermaking screen that is liable to damage on repeated use are used in rotation. Even if a screen is damaged, it is possible to continue production without suspending the whole apparatus simply by changing the core unit 2 or 5 the screen of which has been damaged. Therefore, heat-insulating containers can be produced at high production efficiency.

The present invention is by no means limited to the above-described apparatus 1, and modifications can be made thereto within the scope of the present invention.

For example, while in the apparatus 1 and 1' of the above embodiments, the outer layer 141 is dewatered and dried by a drying means before it is joined with the inner layer into a unitary body, it is possible to omit the drying means in case where the outer layer is used to make a unitary body while wet.

The apparatus 1' of the second embodiment is designed to handle eight core units on each rotary mechanism in every station. It is adaptable to handle less than 8 and more than 4 core units.

The apparatus 1 and 1' of the above embodiments have one pulp slurry tank in each of the outer layer- and the inner layer-forming stations. It is possible to increase the number of the tanks to deposit a multilayered outer layer or inner layer.

While the apparatus has been described based on an embodiment having one or two papermaking stations for the inner or the outer layer, the apparatus of the present invention can have three or more papermaking stations for each layer to produce a molded article having a multilayer structure composed of three or more layers of different compositions successively deposited in the papermaking stations.

While the apparatus 1 and 1' according to the embodiments are designed to produce cup-shaped heat-insulating containers, the present invention is, as a matter of course, applicable to apparatus for producing molded articles of other shapes with consequential alterations made to the shapes of the core units, the dewatering mold, the drying mold, and the forming mold, the trimming configuration, and the like in accordance with the shape of a molded article to be produced.

The present invention will now be illustrated in more detail with reference to Examples.

As demonstrated in Examples 1.1 and 1.2 and Comparative Examples 1.1 to 1.4, heat-insulating containers having a predetermined capacity (480 ml) were produced. Table 1 shows the drying conditions, the amount of the blowing agent applied, and the layer structure of the heat-insulating containers; the results of measurements on the thickness of each layer, the total thickness, and the density of each layer and the overall density; and the results of evaluation for heat insulating performance of the containers, the surface smoothness of the inner surface of the containers, and the moldability, as measured and evaluated according to the following methods.

EXAMPLE 1.1

Papermaking Conditions:

A male mold having a metallic papermaking part shaped to a heat-insulating container having the above-specified capacity and a screen covering the papermaking part was immersed in a third fiber slurry having the following composition to form a prescribed third fiber layer. To the surface of the third fiber layer was applied 50 ml of a blowing agent-containing liquid having the following composition by spraying. The male mold was then immersed in a first fiber slurry having the following composition (the same as for the third fiber slurry) to form a prescribed first fiber layer to give a multilayer fiber structure.

First Fiber Slurry:
  Pulp slurry (fiber (for coated board) content: 0.5 wt %)
  Sizing agent (2 wt % with respect to the pulp)

Blowing Agent-Containing Liquid:
  An aqueous solution containing a blowing agent (Matsumoto Microsphere F30, available from Matsumoto Yushi-Seiyaku Co., Ltd.; blowing temperature: 135° C.) in a concentration of 8.0 wt %, which corresponded to 22 wt % with respect to the total weight of a molded article)

Third Fiber Slurry:
  Pulp slurry (fiber (for coated board) content: 0.5 wt %)
  Sizing agent (2 wt % with respect to the pulp)

Press Dewatering Conditions:
  The fiber structure was fitted between the male mold and a mating female mold and dewatered by suction under the pressing conditions shown below to a water content of 62%.
  Pressing force: 0.5 MPa (20 seconds)

Heat Drying Conditions:
  The fiber structure was dried to a water content of 7% under the following mold temperature and pressure conditions.
  Mold temperature: 160° C.
  Pressing force: 0.5 MPa (60 seconds)+0.1 MPa (120 seconds)

EXAMPLE 1.2

Heat-insulating containers were produced in the same manner as in Example 1.1, except for changing the amount of the blowing agent applied to 6.7% based on the total weight of a molded article.

COMPARATIVE EXAMPLE 1.1

Heat-insulating containers were produced in the same manner as in Example 1.1, except for changing the amount of the blowing agent applied to 3.4% based on the total weight of a molded article and the pressing force in the drying step to 0.1 MPa (180 seconds).

COMPARATIVE EXAMPLE 1.2

Heat-insulating containers were produced in the same manner as in Example 1.1, except for changing the amount of the blowing agent applied to 6.7% based on the total weight of a molded article, reducing the fiber slurry suction time in the formation of the third fiber layer, and changing the pressing force in the drying step to 0.1 MPa (180 seconds).

COMPARATIVE EXAMPLE 1.3

Heat-insulating containers were produced in the same manner as in Example 1.1, except that the first and the third fiber layers were not formed but, instead, a second fiber layer containing 6.7%, based on the total weight of the container, of the blowing agent was formed and that the pressing force in the drying step was changed to 0.1 MPa (180 seconds).

COMPARATIVE EXAMPLE 1.4

Heat-insulating containers were produced in the same manner as in Example 1.1, except that the blowing agent-containing heat was not sprayed to make a structure composed of the first and the third fiber layers and that the pressing force in the drying step was changed to 0.5 MPa (180 seconds).

Measurement of Each Layer and Total Thickness:
  A piece cut out of the molded article was observed under a tool microscope to measure the thickness of each layer.

Measurement of Density (Each Layer):
  The density of each of the second fiber layer, the first fiber layer, and the third fiber layer was calculated from the thicknesses measured above, the area and the weight of the piece, the total weight of the molded article, and the weight of the blowing agent.

Evaluation of Heat Insulation Characteristics:
  A piece cut out of the molded article was pressed to a heating plate at 90 to 100° C., and the surface temperature of the piece was measured with a contact thermometer. When the molded article surface temperature became constant, the difference between the heating plate surface temperature and the molded article surface temperature was obtained.

Measurement of Inner Surface Roughness:
  Surface smoothness was measured with Surfcom 120A supplied by Tokyo Seimitsu Co., Ltd. The measuring conditions were as follows. Cut-off: 0.80 mm; assessment length: 10.00 mm; filter: 2CR; measuring magnification: 500; tilt correction: straight line; and polarity: standard.

TABLE 1

|  | Example 1.1 | Example 1.2 | Comparative Example 1.1 | Comparative Example 1.2 | Comparative Example 1.3 | Comparative Example 1.4 |
| --- | --- | --- | --- | --- | --- | --- |
| Drying Conditions Pressure (MPa)-Time (sec) | 0.5-60 0.1-120 | 0.5-60 0.1-120 | 0.1-180 | 0.1-180 | 0.1-180 | 0.5-180 |
| Amount of Blowing Agent (wt % w.r.t. molding article) | 22 | 6.7 | 3.4 | 6.7 | 6.7 | — |
| Layer Structure | 1/2/3 | 1/2/3 | 1/2/3 | 1/2/3 | 2 | 1/3 |
| Thickness t1/t2/t3 (mm) | 0.51/2.3/0.79 | 0.46/0.58/0.78 | 0.53/0.22/0.71 | 0.17/0.25/0.48 | 1.42 | |
| Total Thickness (mm) | 3.6 | 1.82 | 1.46 | 0.9 | 1.42 | 1.1 |
| Density d1/d3 (g/cm³) | 0.47 | 0.5 | 0.5 | | | |
| Density d2 (g/cm³) | 0.08 | 0.08 | 0.1 | | | |
| Overall Density d (g/cm³) | 0.2 | 0.34 | 0.41 | | 0.41 | 0.57 |
| Heat Insulating Performance (° C.) | 45 | 30 | 23 | | 20 | 14 |
| Surface Roughness Ra (μm) | 4.5 | 3.8 | 7.3 | — | 9.3 | 5 |
| Surface Roughness $R_{max}$ (μm) | 33 | 39 | 56 | — | 65 | 41 |
| Moldability | good | good | good | bad* | good | good |

*The second fiber layer was exposed in parts.

As is shown in Table 1, the heat-insulating containers of Examples 1.1 and 1.2 (products of the present invention) were proved to have a small wall thickness and excellent heat insulating properties. It was confirmed that the container of Comparative Example 1.1 the second fiber layer of which has a thickness less than 0.4 mm has poor heat insulating properties and that the container of Comparative Example 1.2 the first fiber layer of which has a thickness less than 0.2 mm suffers from partial exposure of the second fiber layer, indicating the failure to form stable layers. It was also confirmed that the container of Comparative Example 1.3 was inferior in both heat insulating properties and surface properties. The container of Comparative Example 1.4 which has no second fiber layer exhibits substantially no heat insulating properties.

EXAMPLE 2

A heat-insulating container shown in FIG. 4 having the following specifications was produced as follows.

Specifications of Container:

| | |
| --- | --- |
| Height H: | 110 mm |
| Opening inner diameter Ø10: | 88 mm |
| Bottom outer diameter Ø20: | 70 mm |
| Upper body thickness T10: | 0.8 mm |
| Middle body thickness T20: | 1.5 mm |
| Lower body thickness T30: | 2.0 mm |
| Bottom thickness T40: | 1.0 mm |
| Flange thickness T50: | 1.0 mm |

Papermaking For Inner and Outer Pulp Layers Formation:
  Male molds having a silicone rubber papermaking part shaped to an inner or an outer pulp layer of the heat-insulating container and a nylon screen (50 mesh; wire diameter: 100 μm) covering the papermaking part were immersed in the respective slurries having the following compositions to form each pulp layer.

Slurry for Outer Pulp Layer:

Pulp slurry: Pulp fiber (3:7 by weight mixture of virgin pulp and high-grade used paper; pulp concentration: 0.5 wt %)

Sizing agent (2 wt % with respect to the pulp)

Slurry for Inner Pulp Layer:

Pulp slurry: Pulp fiber (3:7 by weight mixture of virgin pulp and high-grade used paper; pulp concentration: 0.5 wt %)

Sizing agent (2 wt % with respect to the pulp)

Outer Pulp Layer Dewatering and Drying Conditions:

The outer pulp layer was fitted between the male mold and a mating female mold and dewatered and dried under the following conditions.

Mold temperature: 160° C.

Pressing force: 0.4 MPa (180 seconds)

Coating of Outer Surface of Inner Pulp Layer With Blowing Agent:

The inner pulp layer was dipped in a blowing agent-containing liquid having the following composition to impregnate the outer skin layer of the body of the inner pulp layer with the blowing agent.

Blowing Agent-containing Liquid:

An aqueous solution containing a blowing agent (Matsumoto Microsphere F82, available from Matsumoto Yushi-Seiyaku Co., Ltd.; blowing temperature: 160-170° C.) in a concentration of 1 wt %, which corresponded to 5 wt % with respect to the total weight of a molded article.

Heat Drying Conditions:

The inner and the outer pulp layers were stacked together and dried under the following conditions to expand the blowing agent and unite the pulp layers into one body.

Mold temperature: 160° C.

Pressing load: 11760 N (60 seconds)

Pressing force at flange: 1.5 MPa

Formation of Resin Film Layer:

A resin film described below was set on the unitary body with its inner layer in contact with the inner pulp layer and laminated under the following forming conditions.

Resin Film:

outer layer/inner layer=high density polyethylene/low-density polyethylene

Resin film layer thickness: 150 μm

Forming Conditions:

Vacuum forming machine: PLAVAC-FE36PHS, supplied by Sanwa Kogyo K. K.; film heating system: infrared heater (heater-to-resin film distance: 110 mm)

Film heating temperature: 250° C. (reading of the forming machine)

Film heating time: 35 seconds

Plug dimensions: 60 mm diameter×110 mm long

Plug material: aluminum (Teflon-coated)

Plug temperature: 115° C. (measured surface temperature)

Vacuum forming mold: opening diameter Ø 88 mm; bottom diameter Ø 70 mm; height 110 mm Vacuum forming mold temperature: 115° C. (measured surface temperature of cavity)

Forming time: 15 seconds

Measurement of Each Layer and Total Thicknesses:

A piece cut out of the molded article was observed under a tool microscope to measure the thickness of each layer.

Measurement of Density (Each Layer):

The density of each of the blowing agent layer and the inner pulp layer was calculated from the thicknesses measured above, the area and the weight of the piece, the total weight of the molded article, and the weight of the blowing agent.

Evaluation of Heat Insulation Characteristics:

Hot water at 95 to 100° C. was poured into a heat-insulating container 120. Three minutes later, the temperatures of the hot water in the container and the outer surface temperature of the container were measured with contact thermometers to obtain the difference between the hot water temperature and the container surface temperature.

Measurement of Inner Surface Roughness:

Surface smoothness was measured with Surfcom 120A supplied by Tokyo Seimitsu Co., Ltd. The measuring conditions were as follows. Cut-off: 2.5 mm; assessment length: 10.00 mm; filter: 2CR; measuring magnification: 500; tilt correction: straight line; and polarity: standard.

The resulting heat-insulating container was thin-walled (0.8 to 5 mm thick) and lightweight. Even when hot water was poured in, it exhibited sufficient heat insulating properties enabling a user to grasp with hands and satisfactory shape retention with hot water in. It exhibited high surface roughness, having a centerline average roughness Ra of 1 to 20 μm and a maximum height $R_{max}$ of 100 μm or smaller. It had good adhesion to a resin film to form a pinhole-free resin film layer. The outer surface of the container had satisfactory printability.

Heat-insulating containers were produced as described in Examples 3.1 and 3.2 and Comparative Examples 3.1 and 3.2 hereinafter described. The weight of the containers was measured. The strength, heat-insulating properties, and anti-delamination between the inner layer and the heat-insulating layer were evaluated as follows. The weight, thickness, density, and basis weight of each of the outer and the inner layers and the thickness and density of the heat-insulating layer of the containers were measured according to the following methods. The results obtained are shown in Table 2.

EXAMPLE 3.1

A heat-insulating container shown in FIG. 10 having the following specifications was produced as follows.

Specifications of Container:

Height H 1: 110 mm

Opening inner diameter Ø11: 88 mm

Bottom outer diameter Ø21: 70 mm

Middle body thickness T21: 1.5 mm

Bottom thickness T41: 1.0 mm

Flange thickness T51: 0.8 mm

Papermaking for Inner and Outer Layers Formation:

Male molds having a silicone rubber papermaking part shaped to an inner or an outer layer of the heat-insulating container and a nylon screen (50 mesh; wire diameter: 100 μm) covering the papermaking part were immersed in the respective slurries having the following compositions to form each layer.

Slurry for Outer Layer:

Pulp slurry: Pulp fiber (3:7 by weight mixture of virgin pulp and high-grade used paper; pulp concentration: 0.5 wt %)

Sizing agent (2 wt % with respect to the pulp)

Slurry for Inner Layer:

Pulp slurry: Pulp fiber (3:7 by weight mixture of virgin pulp and high-grade used paper; pulp concentration: 0.5 wt %)

Sizing agent (2 wt % with respect to the pulp)

Outer Layer Dewatering and Drying Conditions:

The outer layer was fitted between the male mold and a mating female mold and press dewatered and dried under the following conditions.

Mold temperature: 160° C.

Pressing force: 0.4 MPa (90 seconds)

Coating of Outer Surface of Inner Layer With Blowing Agent:

The inner layer (water content: 84%) was dipped in a blowing agent-containing liquid having the following composition to impregnate the outer skin layer of the body of the inner layer with the blowing agent.

Blowing Agent-Containing Liquid:

An aqueous solution containing a blowing agent (Matsumoto Microsphere F793, available from Matsumoto Yushi-Seiyaku Co., Ltd.; blowing temperature: 110-170° C.) in a concentration of 1 wt %, which corresponded to 5 wt % with respect to the total weight of a molded article.

Heat Drying Conditions:

The inner and the outer layers were stacked together and dried under the following conditions to expand the blowing agent and unite the two layers into one body.

Mold temperature: 160° C.

Pressing load: 11760 N (60 seconds)

Pressing force at flange: 1.5 MPa

Male mold temperature: 140° C.

Formation of Resin Layer:

A resin film described below was set on the unitary body with its inner layer in contact with the inner layer of the container and laminated under the following forming conditions.

Resin Film:

outer layer/inner layer=high density polyethylene/low-density polyethylene

Resin layer thickness: 150 µm

Forming Conditions:

Vacuum forming machine: PLAVAC-FE36PHS, supplied by Sanwa Kogyo K. K.; film heating system: infrared heater (heater-to-resin film distance: 110 mm)

Film heating temperature: 250° C. (reading of the forming machine)

Film heating time: 35 seconds

Plug dimensions: 60 mm diameter×110 mm length

Plug material: aluminum (Teflon-coated)

Plug temperature: 115° C. (measured surface temperature)

Vacuum forming mold: opening diameter Ø 88 mm; bottom diameter Ø 70 mm; height 110 mm Vacuum forming mold temperature: 115° C. (measured surface temperature of cavity)

Forming time: 15 seconds

EXAMPLE 3.2

A heat-insulating container was produced in the same manner as in Example 3.1, except that the weight of the inner layer pulp was made larger than that of the outer layer pulp.

COMPARATIVE EXAMPLE 3.1

A heat-insulating container was produced in the same manner as in Example 3.1, except that the blowing agent was not used in the heat-insulating layer.

COMPARATIVE EXAMPLE 3.2

A heat-insulating container was produced in the same manner as in Example 3.1, except that a slurry consisting of water and the blowing agent was applied to the inner surface of the dried outer layer pulp to form a heat-insulating layer made solely of the blowing agent between the outer layer and the inner layer.

Measurement of Thickness, etc. of Outer, Inner, and Heat-Insulating Layers: Outer layer: A test piece of prescribed shape and size (a disk having a diameter of about 40 mm) was cut out of the body of the resulting molded article. Only the outer layer was separated from the piece, and the thickness and the weight were measured to obtain the thickness, the basis weight, and the density of the outer layer.

Inner layer: Only the inner layer was separated from the piece, and the thickness and the weight were measured to obtain the thickness, the basis weight, and the density of the inner layer. Where there was a mixed layer between the inner layer and the heat-insulating layer, the mixed layer was removed, and the thickness and the weight of the residual inner layer were measured to obtain the thickness, the basis weight, and the density of the inner layer.

Heat-insulating layer: The thickness and the density of the heat-insulating layer (inclusive of the mixed layer) were obtained by subtracting the thicknesses or the weights of the resin layer, the outer layer, and the inner layer from the thickness or the weight of the cut piece, respectively.

Resin layer: The resin film was peeled off the cut piece, and its thickness was measured.

Measurement of Compressive Strength:

Lateral (strength against grasping): The container was laid on its side on a compressive strength meter RTA-500, supplied by Orientec Co., Ltd. The cross-head speed was set at 20 mm/min. The load causing a 10 mm displacement in the body of the container was taken as a lateral compressive strength.

Axial: The container was put on its bottom on the compressive strength meter, and a load was imposed at a cross-head speed of 20 mm/min to record a load-displacement curve. The load at two points were read: the load at yield in cases where yielding occurred due to buckling of the container bottom corner (referred to as "axial load (1)" in Table 2) and the load at buckling (the maximum load; referred to as "axial load (2)" in Table 2).

Heat Insulating Properties:

Hot water at 95 to 100° C. was poured into the heat-insulating container. Three minutes later, the temperatures of the hot water in the container and the outer surface temperature of the container were measured with contact thermometers to obtain the difference between the hot water temperature and the container surface temperature.

Anti-Delamination:

After a prescribed lateral load was imposed to the container, the inner surface of the container and the cross-section of the container were observed with the naked eye or under a microscope.

As shown in Table 2, the containers having a mixed layer between the inner layer and the heat-insulating layer (Examples 3.1 and 3.2) are thin-walled and lightweight and yet exhibit desired mechanical strength and heat insulating properties and undergo no delamination when deformed. To the contrary, the container having no heat-insulating material (Comparative Example 3.1) and the container having a heat-insulating material layer without a mixed layer (Comparative Example 3.2) had the following disadvantages. That is, where designed to have a small wall thickness and lightweight, the container of Comparative Example 3.2 fails to have sufficient lateral compressive strength (corresponding to strength against grasping). The container having no mixed layer (Comparative Example 3.2) undergoes delamination to develop wrinkles or cracks on the inner surface thereof.

The method of producing a heat-insulating container according to the present invention is suited to produce a heat-insulating container having the above-described effects.

The present invention provides a thin-walled and lightweight heat-insulating container with buckling strength and heat insulating properties.

The apparatus for producing a heat-insulating container according to the present invention is capable of producing a heat-insulating container (pulp molded article) at high production efficiency.

The invention claimed is:

1. A heat-insulating container having at least a first fiber layer having a prescribed density which is made mainly of pulp by papermaking and a second fiber layer which is formed inside said first fiber layer and has a lower density than said first fiber layer,
    wherein said first fiber layer has a thickness of 0.2 to 1 mm, said second fiber layer has a thickness of 0.4 to 3 mm, the total thickness of said first fiber layer and said second fiber layer is 0.6 to 4 mm, and the density of the body of said container varies in the vertical direction thereof.

TABLE 2

| | | Example 3.1 | Example 3.2 | Comparative Example 3.1 | Comparative Example 3.2 |
|---|---|---|---|---|---|
| Layer Structure*[1] | | O/H/M/I/R | O/H/M/I/R | O/A/I/R | O/H/I/R |
| Outer | Weight (g) | 11.8 | 7.7 | 12 | 12.5 |
| Layer | Thickness (mm) | 0.42 | 0.29 | 0.51 | 0.49 |
| | Density (g/cm$^3$) | 0.91 | 0.84 | 0.81 | 0.93 |
| | Basis Weight (g/m$^2$) | 382 | 244 | 413 | 456 |
| Inner | Weight (g) | 9 | 13 | 7.4 | 6.5 |
| Layer | Thickness (mm) | 0.36 | 0.57 | 0.39 | 0.34 |
| | Density (g/cm$^3$) | 0.73 | 0.72 | 0.6 | 0.77 |
| | Basis Weight (g/m$^2$) | 263 | 410 | 234 | 262 |
| Heat- | Thickness (mm) | 0.54 | 0.4 | 0.08 | 0.49 |
| Insulating | Density (g/cm$^3$) | 0.04 | 0.05 | — | 0.02 |
| Layer*[2] | | | | | |
| Mixed Layer | | Formed | Formed | not formed | not formed |
| Total Weight (g) | | 20.8 | 21 | 19.4 | 19 |
| Total Thickness (mm) | | 1.32 | 1.26 | 0.98 | 1.32 |
| Heat- | Water Temp. (3 mins) | 87 | 87 | 87 | 87 |
| Insulating | (° C.) | | | | |
| Properties | Surface Temp. (3 mins) | 58 | 63 | 66 | 63 |
| | Temp. Difference (° C.) | 29 | 24 | 21 | 24 |
| | Evaluation | very good | Good | poor | good |
| Lateral Load (g)*[3] | | 1050 | 1050 | 710 | 890 |
| Axial Load (1) (kg) | | 21 | — | 20 | 25 |
| Axial Load (2) (kg) | | 38 | 25 | 37 | 37 |
| Delamination between Inner Layer and Heat-insulating Layer | | No delamination | No delamination | — | delamination |
| Overall Judgement | | very good | Good | poor | poor |

*[1]: Layer structure in the body and bottom except the flange. O stands for outer layer, H, heat-insulating layer, M, mixed layer, A, air layer, I, inner layer, and R, resin layer.
*[2]: Inclusive of the mixed layer.
*[3]: Load at 10 mm displacement of the container.

INDUSTRIAL APPLICABILITY

The heat-insulating container according to the present invention is thin-walled and excellent in heat insulating properties. The method of producing a heat-insulating container according to the present invention is suited to produce a heat-insulating container having the above-described effects.

2. The heat-insulating container according to claim 1, wherein said container has a blowing agent layer in place of said second fiber layer.

3. The heat-insulating container according to claim 1, wherein said total thickness varies in the body of said container in the vertical direction.

4. A heat-insulating container comprising:
    at least a first fiber layer with a prescribed density which is made substantially of pulp by papermaking, a second fiber layer which is formed inside said first fiber layer and made of a material containing a blowing agent and has a lower density than said first fiber layer; and a third fiber layer which is formed inside said second fiber layer and has a higher density than said second fiber layer, said container having a flange on the periphery of the opening thereof, and said first and said third fiber layers being joined together to form a unitary body at the periphery of said flange.

5. The heat-insulating container according to claim 4, wherein a mixed layer comprising said pulp and said blowing agent exists between said third fiber layer and said second fiber layer, and said third fiber layer and said second fiber layer are fixed together via said mixed layer.

6. The heat-insulating container according to claim 4, wherein the density of said third fiber layer is equal to or lower than that of said first fiber layer.

7. The heat-insulating container according to claim 4, wherein said container has a blowing agent layer in place of said second fiber layer.

8. The heat-insulating container according to claim 4, wherein the first and third fiber layers are, at the location of the flange, disposed parallel to each other and in contact with each other.

9. The heat-insulating container according to claim 4, wherein the first and third fiber layers are adhered to each other with an adhesive to form the flange.

* * * * *